United States Patent [19]
Tomonaga et al.

[11] Patent Number: 5,878,025
[45] Date of Patent: Mar. 2, 1999

[54] ATM SWITCH AND METHOD FOR SWITCHING PATH BY ATM SWITCH

[75] Inventors: Hiroshi Tomonaga; Naoki Matsuoka; Masaaki Kawai; Masafumi Katoh; Yoshimi Watanabe; Hidenao Nakajima, all of Kawasaki, Japan

[73] Assignee: Fujitsu Limited, Kanagawa, Japan

[21] Appl. No.: 795,297

[22] Filed: Feb. 4, 1997

Related U.S. Application Data

[63] Continuation of Ser. No. 495,119, Jun. 27, 1995, abandoned.

[30] Foreign Application Priority Data

Aug. 2, 1994 [JP] Japan ..................................... 6-181203
May 22, 1995 [JP] Japan ..................................... 7-122704

[51] Int. Cl.$^6$ .............................. H04L 1/22; H04L 12/56
[52] U.S. Cl. .......................... 370/219; 370/395; 340/826
[58] Field of Search .................................... 370/219, 395; 340/826

[56] References Cited

U.S. PATENT DOCUMENTS

| | | | |
|---|---|---|---|
| 3,649,768 | 3/1972 | Curtis | 340/826 |
| 4,038,638 | 7/1977 | Hwang | 370/54 |
| 5,091,903 | 2/1992 | Schrodi | 370/58.1 |
| 5,179,551 | 1/1993 | Turner | 370/60 |
| 5,325,090 | 6/1994 | Goeldner | 340/825.8 |

FOREIGN PATENT DOCUMENTS 5-130130  5/1993  Japan .

OTHER PUBLICATIONS

Kim, H.S. et al., "Design of a Multistage Switching Network for ATM", IEEE International Conference on Communications ICC'90 (Cat. No. 90CH2829–0), pp. 742–746, vol. 2, Apr. 1990.

A. Day, "International Standardization of BISDN", IEEE LTS, Aug. 1991, pp. 7, 13–20.

B.E. Basch et al., "VISTAnet: A BISDN Field Trial", IEEE LTS, Aug. 1991, pp. 22, 25–30.

A. Takahashi et al. "A Broadband Switching System for Public Network" ISS, May 1990, vol. V, pp. 103–109.

K. Hajikano et al., "Asynchronous Transfer Mode Switching Architecture for Broadband ISDN", ICC, Jun. 1988, pp. 0911–0915.

Y. Kato et al, "A VLSIC for the ATM Switching System", ISS, May 1990, vol. 111, pp. 27–32.

K. Chipman et al., "High Performance Applications Development for B–LSDN", ISS, Oct., 1992, pp. 22–26.

H. Tomonaga et al., "High–Speed Switching Module for a Large Capacity ATM System", IEEE, Dec., 1992, pp. 123–127.

Y. Doi et al., "A 160 Gbit/s Large–Capacity ATM Switching System using a Dynamic Link Speed Controlled Switch Architecture", IEEE, 1993, pp. 24–28.

(List continued on next page.)

*Primary Examiner*—Melvin Marcelo
*Attorney, Agent, or Firm*—Helfgott & Karas, PC.

[57] ABSTRACT

A plurality of switching modules arrayed in a plurality of columns and in at least one row switch over paths in accordance with path data contained in cells to transfer inputted data to a target line on the cell-unit. One or more path switching units are provided between two adjacent columns of switching modules among plural columns of switching modules and switch paths between the respective switching modules, disposed in a side-by-side relationship in a row direction, of one column of switching modules of the two adjacent columns of switching modules and the respective switching modules, disposed in the side-by-side relationship in the row direction, of the other column of the two adjacent columns of switching modules.

50 Claims, 65 Drawing Sheets

OTHER PUBLICATIONS

2Y. Doi et al., "An ATM Switch using Multichip Module Technology", SSE, Nov., 22, 1991, Abstract.

K. Endo et al, "a Full–matrix Large ATM Switch constructed by Small Size Switch Elements with Control Point Switching Scheme", SSE, 1993 Spring Intro.

S. Sasaki et al., "Multi–chip Module Packaging Technology for Communication Switching Systems", SSE, Nov., 22, 1991, Abstract.

H. Tomonaga et al., "A Structure of Ultrahigh–Speed ATM Switch", SSE, Nov., 1993, Abstract.

H. Tomonaga et al., "A Line Interface Structure for a Large Capacity ATM Switching System", SSE, Apr. 4, 1994, pp. 1–13, cover sheet, 1–6.

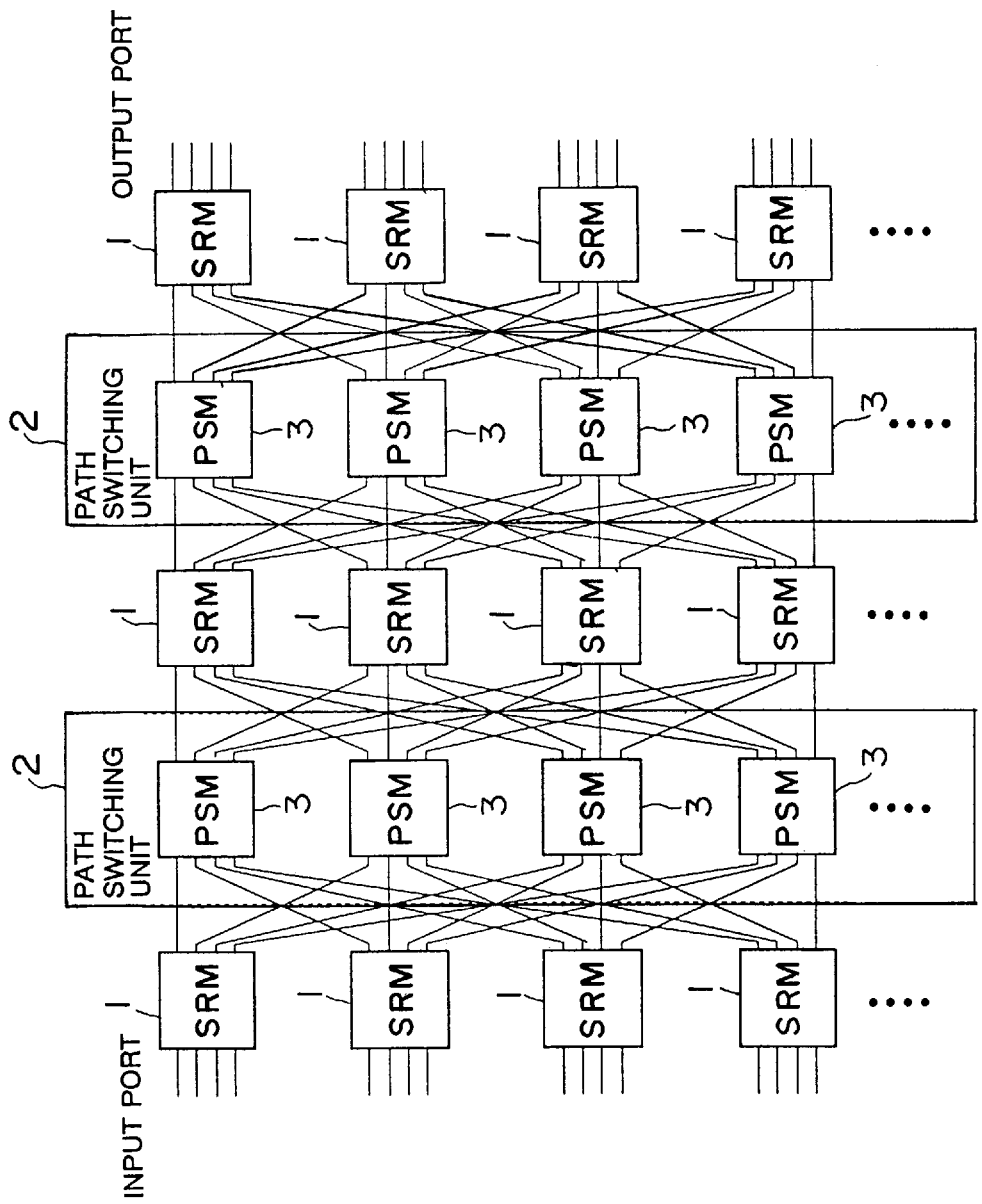

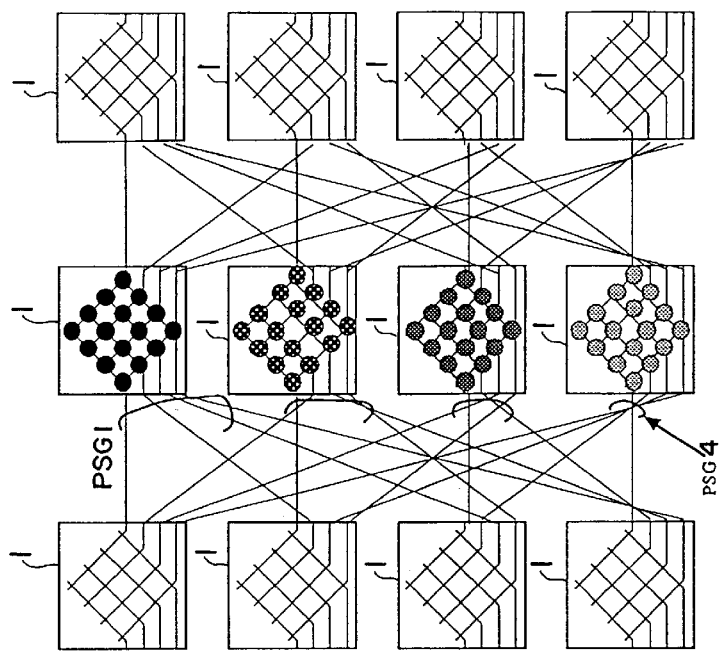
FIG. 2C
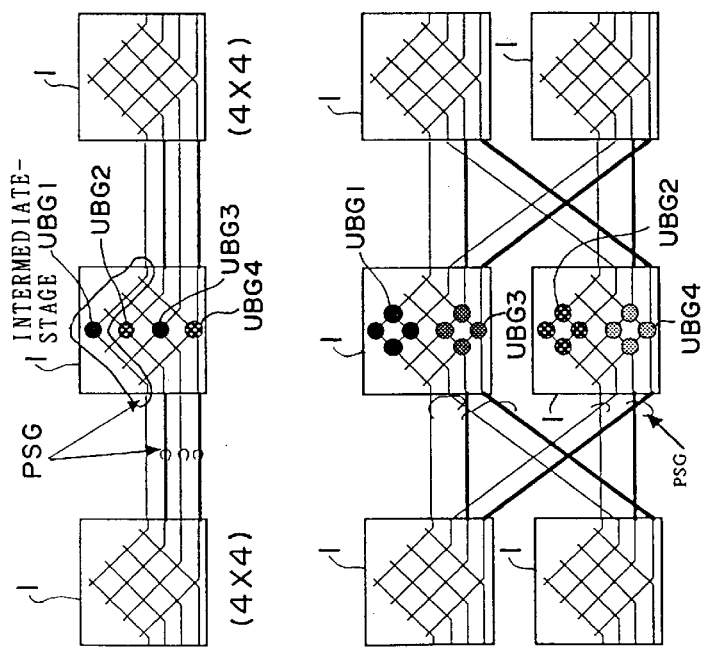
FIG. 2A
FIG. 2B

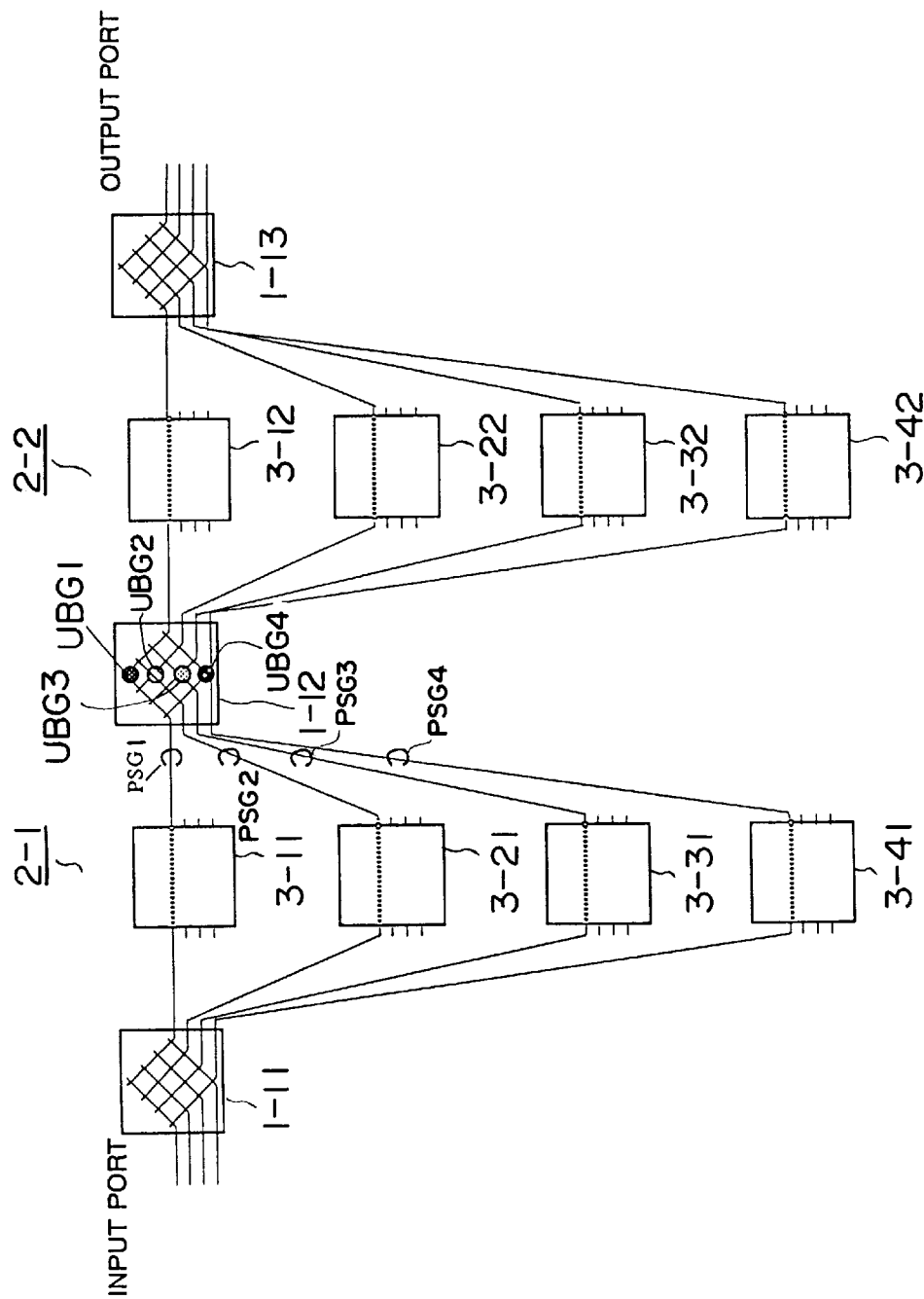

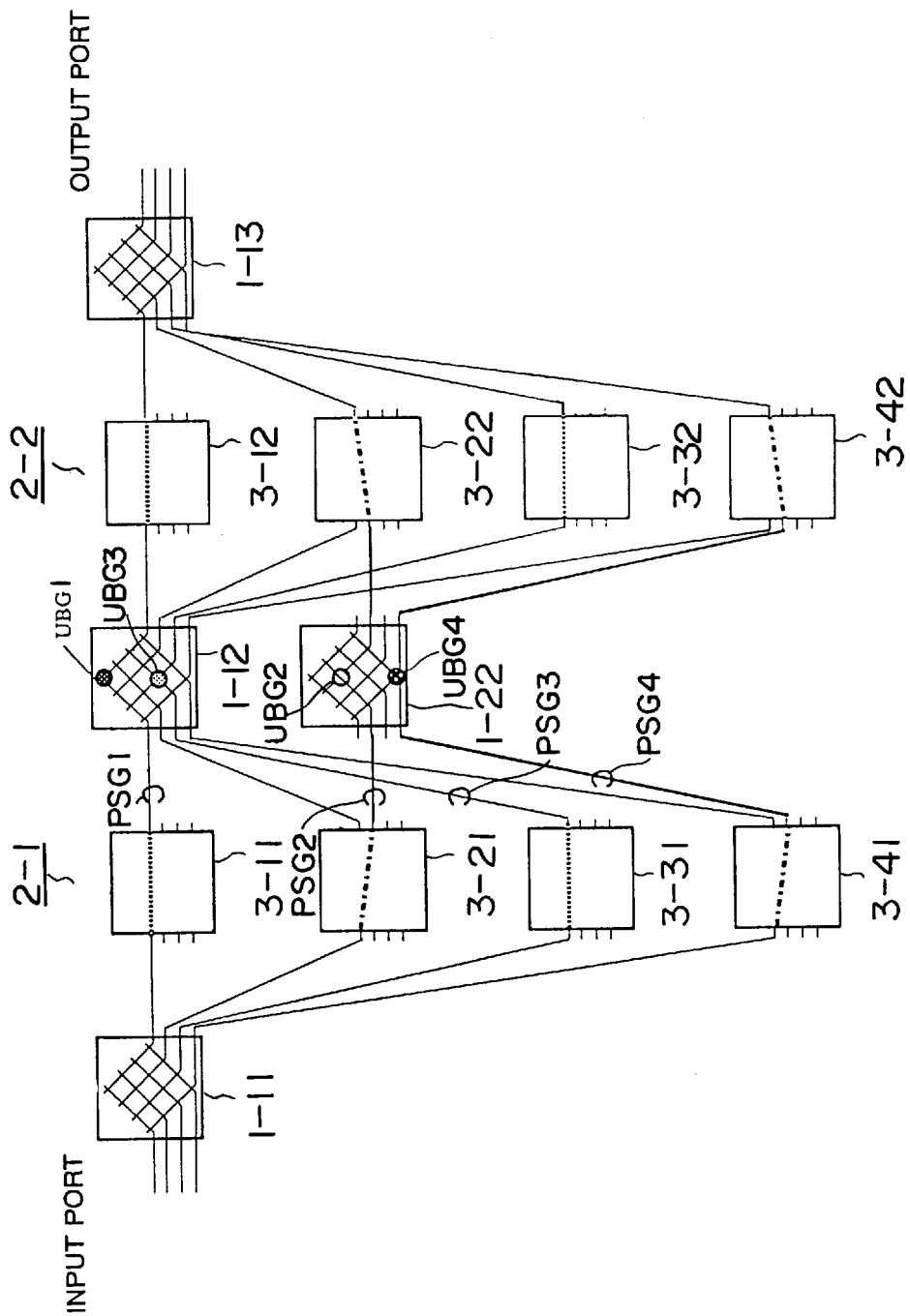

5,878,025

ATM SWITCH AND METHOD FOR SWITCHING PATH BY ATM SWITCH

This is a continuation of application Ser. No. 08/495,119, filed Jun. 27, 1995 now abandoned.

BACKGROUND OF THE INVENTION

The present invention relates generally to an ATM (asynchronous transfer mode) switch and a method for switching a path by the ATM switch. The present invention relates more particularly to an ATM switch and a method for switching a path by the ATM switch within an ATM switching equipment used for a broadband ISDN (Integrated Services Digital Network).

The broad ISDN is capable of offering a variety of media ranging from voices to moving pictures. Further, the ATM switching equipment transfers data on a cell-unit in an asynchronous transfer mode and is applicable to communications in a broad range from a low speed to a high speed.

Constructing a network for this broadband ISDN entails the use of the above ATM switching equipment. At an early stage of introducing the ATM switching equipment, there are small number of subscribers, and a small capacity of the switching equipment may suffice.

At a spread stage of the ATM switching equipment, however, the number of subscribers increases, and, hence the switching equipment is demanded of a large capacity. In this case, for the purpose of using the same switching equipment from the early stage to the spread stage, the switching equipment has to be expanded up to a large-scale switching equipment.

A method for expanding the ATM switch involves the use of an MSSR (Multi-Stage Self-Routing Unit). The MSSR is constructed by performing multi-stage connections of the SRMs (Self-Routing Modules) composed of small-scale switching modules for switching over paths on a cell-unit. Two methods for expanding the ATM switch exist.

According to a first method, all intermediate-stage SRMs of the switch are prepared from the beginning. For example, referring to FIG. 75, four pieces of intermediate-stage SRMs 1-12 to 1-42 are prepared from the beginning with respect to one first-stage SRM 1-11 and one rear-stage SRM 1-13. Further, in FIG. 76, the four intermediate-stage SRMs 1-12 to 1-42 from the beginning with respect to two first-stage SRMs 1-11, 1-21 and two rear-stage SRMs 1-13, 1-23.

Referring to FIG. 77, the four intermediate-stage SRMs are prepared with respect to the three first-stage SRMs and the three rear-stage SRMs. Turning to FIG. 78, the four intermediate-stage SRMs are prepared with respect to the four first-stage SRMs and the four rear-stage SRMs.

Next, according to the second method, a necessary minimum number of SRMs 1 of the first- and intermediate-stages as in the case of the rear-stage SRM 1 are prepared. For example, in FIG. 79, a single piece of SRM 1 is provided at each stage. Referring to FIG. 80, two pieces of SRMs are provided at each stage. Turning to FIG. 81, four pieces of SRMs 1 are provided at each stage.

Based on the first method, however, all the intermediate-stage SRMs are prepared from the beginning. Therefore, a hardware quantity increases even when a small-scale switch is constructed.

Further, according to the second method, an SRM-to-SRM path is switched when the SRM is expanded. This path switching operation is manually done and therefore very time-consuming.

SUMMARY OF THE INVENTION

It is a primary object of the present invention to provide an ATM switch and a method for switching a path by an ATM switch that are capable of reducing a hardware quantity when downsized but readily expanding SRMs.

An ATM switch according to the present invention includes a plurality of SRMs and one or more path switching units. The SRMs arrayed in a plurality of columns and in at least one row switch the paths in accordance with path data contained in cells in order to transfer inputted data to a target line on a cell-unit.

One or more path switching units switch are provided between two adjacent columns of the switching modules among plural columns of the switching modules. The path switching units switch paths between the respective switching modules, disposed in a side-by-side relationship in a row direction, of one column of the switching modules of the two adjacent columns of the switching modules and the respective switching modules, disposed in the side-by-side relationship in the row direction, of the other column of the two adjacent columns of the switching modules.

The ATM switch according to a first invention is to be established also in a case where the constructive elements thereof are specifically as follows.

The path switching unit is constructed of the same number of the path switching modules (hereinafter abbreviated to PSMs) as the number of all the switching modules arranged in the side-by-side relationship in the row direction.

The PSM has substantially the same size as a size of each SRM.

Further, the plurality of SRMs are constructed of SRMs of three stages, i.e., a first-stage, an intermediate-stage and a rear-stage in the column direction. The number of the intermediate-stage SRMs is incremented by a power of a predetermined value in the row direction. All the paths to the intermediate-stage SRMs are divided according to every path switching group having a corresponding number of paths to the number of the intermediate-stage SRMs. Each path switching unit switches the paths according to every path switching group so that the paths to all the SRMs of the next stage are evenly switched from the respective SRMs.

Moreover, the path switching unit includes a wavelength multiplexing unit for demultiplexing a plurality of multiplexed photo signals into respective photo signals and transmitting the photo signals to the SRMs after multiplexing the demultiplexed photo signals. The path switching unit further includes an optical switch for performing path switching with respect to the individual demultiplexed photo signals.

Each SRM includes a photoelectric converting unit for converting a cell output of an electric signal into a photo signal and also converting the photo signal into the electric signal. The SRM further includes a wavelength multiplexing unit for multiplexing the plurality of converted photo signals having wavelength different from each other, outputting the multiplexed photo signals to the path switching unit and demultiplexing the multiplexed photo signals from the path switching unit into respective photo signals.

The path switching unit is constructed of a wavelength allocation type switch for changing an output destination per wavelength of the photo signal.

Each SRM includes a cell buffer, a buffer quantity monitoring unit and a buffer control unit. The cell buffer has a plurality of input ports and a plurality of output ports and stores the cells inputted from the input ports. The buffer quantity monitoring unit monitors the number of cells stored in the cell buffer per output port and determines whether or not the cell buffer is empty. The buffer control unit controls a write and a read of the cells to and from the cell buffer and halts the cell output of the first-stage SRM when the cell buffer becomes empty. The path switching unit performs the path switching after the buffer control unit has halted the cell output.

Further, the buffer control unit halts the cell output of the first-stage SRM. The path switching unit between the first-stage SRM and the intermediate-stage SRM switches over an old path to a new path after halting the cell output. The buffer control unit halts the cell output by flowing the cells stored in the cell buffer of the first-stage SRM to the new path and causing the cell buffer to store the cells of the intermediate-stage SRM. The buffer quantity monitoring unit determines whether or not the cell buffer becomes empty by transmitting the remaining cells flowed to the old path to the rear-stage SRM. The path switching unit between the intermediate-stage SRM and the rear-stage SRM switches the path after the cell buffer has become empty.

Further, The SRM of each stage includes a flag tacking unit for tacking a flag indicating a last cell to the last cell after halting the cell output. The buffer control unit of each SRM determines whether or not the last cell containing the flag reaches from the flag tacking unit within the SRM of the stage disposed one before and gives, when the last cell reaches, an indication to the path switching unit to switch over the old path to the new path.

Moreover, the SRM of each stage includes a notifying cell inserting unit for inserting a notifying cell indicating the last cell into an area posterior to the last cell after halting the cell output. The buffer control unit of the SRM of each stage determines whether or not the notifying cell reaches from the notifying cell inserting unit within the SRM of the stage disposed one before and gives, when the notifying cell reaches, an indication to the path switching unit to switch over the old path to the new path.

The notifying cell inserting unit, when the notifying cell is inserted, adds the same number as an output port number of the preceding-stage SRM to a cell header as route data of the next-stage SRM and thereby equalizes an SRM route of the notifying cell between the first stage and the intermediate stage to an SRM route of the notifying cell between the intermediate stage and the rear stage. The buffer control unit of each SRM does not dispose of the notifying cell even after switching the path.

Additionally, the buffer control unit of the SRM of each stage determines whether or not a predetermined number of empty cells indicating the arrival of the last cell consecutively reach from the SRM of the stage disposed one before and gives, when the empty cells consecutively reach, an indication to the path switching unit to switch over the old path to the new path.

Furthermore, each SRM includes a cell buffer connected to a plurality of input highways and a plurality of output highways. The SRM also includes a write address managing unit for managing a write address in which the cell from each input highway is written to the cell buffer and a plurality of read address managing units, each provided per output highway, for managing a read address of the cell buffer. The SRM further includes a plurality of buffer quantity monitoring units for monitoring the empty of the cell of the cell buffer per output highway.

The intermediate-stage SRM is expanded, and, when the path switching unit switches the path, the construction of the cell buffer is the same before and after switching the path.

Further, an ATM switch according to a second invention comprises a plurality of SRMs, arrayed in a plurality of columns and in at least one row, for switching over paths in accordance with path data contained in cells in order to transfer inputted data to a target line on the cell-unit. The plurality of SRMs are constructed of SRMs of three stages, i.e., a first stage, an intermediate stage and a rear stage in the column direction. The number of the intermediate-stage SRMs is incremented by a power of a predetermined value in the row direction. All the paths to the intermediate-stage SRMs are divided according to every path switching group having a corresponding number of paths to the number of the intermediate-stage SRMs. The paths are switched according to every path switching group so that the paths to all the SRMs of the next stage are evenly switched from the respective SRMs.

An ATM switch according to the second invention is also established in a case where the constructive elements thereof are specifically as follows. The ATM switch may further comprise a connector module in which the same number of connectors are disposed as the number of output ports, the connectors each having a plurality of input ports a plurality of output ports and also accommodating one high way.

Further, each SRM includes a cell buffer, a buffer control unit and a buffer quantity monitoring unit. The cell buffer has a plurality of I/O ports allocated with different items of tag data and a path switching port and stores the cells inputted from the input ports.

The buffer control unit controls a write and a read of the cells, previously switches a new path to the SRM expanded from the path switching port, switches over an old path to the new path with a switchover of the allocated tag data and thereby halts reading the cells stored in the cell buffer. The buffer quantity monitoring unit determines whether or not the cell buffer becomes empty after transmitting all the cells remaining in the cell buffer of the SRM to the old path. The buffer control unit transmits the cells to the cell buffer of the SRM expanded with respect to the new path when the cell buffer to the old path becomes empty.

The allocated tag data may be switched over by changing the setting of a switch or by changing cell path data.

Also, the buffer quantity monitoring unit determines whether or not all the cells of the first-stage SRM to the old path are transmitted when the old path is switched over to the new path. The buffer control unit transmits the cells of the first-stage SRM to the new path when all the cells of the first-stage SRM to the old path are transmitted. The buffer quantity monitoring unit determines whether or not all the cells of the intermediate-stage SRM to the old path are transmitted. The buffer control unit transmits, when all the cells of the intermediate-stage SRM to the old path are transmitted, the cells of the intermediate-stage SRM to the new path.

Further, the SRM of each stage may include a flag tacking unit, and the buffer control unit may determine whether or not the last cell reaches from the flag tacking unit. The SRM of each stage may include a notifying cell inserting unit, and the buffer control unit may determine whether or not the notifying cell reaches from the notifying cell inserting unit.

The notifying cell inserting unit, as stated above, when the notifying cell is inserted, may add the same number as an output port number of the preceding-stage SRM to a cell header as route data of the next-stage SRM. The buffer control unit may determine whether or not a predetermined number of empty cells reach.

Each SRM may include the cell buffer, the write address managing unit for managing the write address, the plurality of read address managing units and the plurality of buffer quantity monitoring units. The intermediate-stage SRM is expanded, and, when the old path is switched over to the new path, the construction of the cell buffer is the same before and after switching the path.

Further, the plurality of SRMs constitutes an active ATM switch, and the ATM switch further comprises a standby ATM switch having the SRMs that are more expanded than the plurality of SRMs of the active ATM switch a switchover unit, connected to the active ATM switch and the standby ATM switch, for performing a switchover from the active ATM switch to the standby ATM switch.

Further, the SRM having a plurality of input terminal, a plurality of output terminals and a cross point buffer for storing the cells is divided into a plurality of packages, and the input terminals and the output terminals may be so laid out as to be evenly allocated to the respective packages. Moreover, a first rack houses the plurality of switching modules arranged in a side-by-side relationship in a column direction. There may be provided a corresponding number of the first racks to a plural number of the SRMs arranged in the side-by-side relationship in a row direction, and one or more path switching units may be mounted in a second rack different from the first rack.

Additionally, with respect to mutual connections between the SRMs having a plurality of input ports and a plurality of output ports, there may be further provided a port connection determining unit for determining which input port of the next-stage SRM to connect the output port of the preceding-stage SRM.

The port connection determining unit includes an exclusive OR circuit for obtaining an exclusive OR of a row number of the SRM with an output port number of the SRM and an AND circuit for obtaining an AND of an output of the exclusive OR circuit with exponent data about the number of rows of the SRMs as a next-stage input port number to be connected.

Moreover, a method for switching a path by an ATM switch according to the present invention comprises a switchover step and a path switching step. The switchover step is to switch over paths in accordance with path data contained in cells by a plurality of SRMs arrayed in a plurality of columns and in at least one row in order to transfer inputted data to a target line on the cell-unit. The path switching step is to switch the paths between the respective SRMs, disposed in a side-by-side relationship in a row direction, of one column of the SRMs of the two adjacent columns of the SRMs and the respective SRMs, disposed in the side-by-side relationship in the row direction, of the other column of the two adjacent columns of the SRMs.

The method of switching the path by the ATM switch according to a third invention is established in a case where the steps thereof are specifically as below.

The plurality of SRMs are constructed of SRMs of three stages, i.e., a first stage, an intermediate stage and a rear stage in the column direction. The number of the intermediate-stage SRMs is incremented by a power of a predetermined value in the row direction. All the paths to the intermediate-stage SRMs are divided according to every path switching group having a corresponding number of paths to the number of the intermediate-stage SRMs. The path switching step is to switch the paths according to every path switching group so that the path to all the SRMs of the next stage are evenly switched from the respective SRMs.

Moreover, the path switching method further comprises a storing step, a monitoring step and a control step. The storing is to cause a cell buffer to store the cells inputted from the input ports. The monitoring step is to monitor the number of cells stored in the cell buffer per output port and to determine whether or not the cell buffer is empty. The control step is to control a write and a read of the cells to and from the cell buffer and to halt the cell output when the cell buffer becomes empty. The path switching step is to perform the path switching after halting the cell output.

The control step is to halt the cell output of the first-stage SRM, and the path switching step is to switch over an old path to a new path after halting the cell output between the first-stage SRM and the intermediate-stage SRM. The control step is to halt the cell output by flowing the cells stored in the cell buffer of the first-stage SRM to the new path and to cause the cell buffer of the intermediate-stage SRM to store the cells.

The monitoring step is to determine whether or not the cell buffer of the intermediate-stage SRM becomes empty by transmitting the remaining cells in the old path that are flowed to the intermediate-stage SRM to the rear-stage SRM. The path switching step is to switch the paths after the cell buffer has become empty between the intermediate-stage SRM and the rear-stage SRM.

Further, the path switching method comprises a flag tacking step of tacking a flag indicating a last cell to the last cell after the cell output was halted. The control step is to determine whether or not the last cell containing the flag reaches from the SRM of the stage disposed one before. The path switching step is to switch over the old path to the new path when the last cell reaches.

The path switching method comprises a notifying cell inserting step of inserting a notifying cell indicating the last cell into an area posterior to the last cell after halting the cell output. The control step is to determine whether or not the notifying cell reaches from the SRM of the stage disposed one before. The path switching step is to switch over the old path to the new path when the notifying cell reaches.

The notifying cell inserting step is, when the notifying cell is inserted, to add the same number as an output port number of the preceding-stage SRM to a cell header as route data of the next-stage SRM and thereby equalize a switching module route of the notifying cell between the first stage and the intermediate stage to a SRM route of the notifying cell between the intermediate stage and the rear stage.

The control step is to dispose of no notifying cell even after switching the path. The control step is to determine whether or not a predetermined number of empty cells indicating the arrival of the last cell consecutively reach from the SRM of the stage disposed one before. The path switching step is to switch over, when the empty cells consecutively reach, the old path to the new path.

Furthermore, the path switching method comprises a storing step, a write address managing step, a read address managing step and a monitoring step. The storing step is to store said cell buffer with the cells inputted from the plurality of input highways. The write address managing step is to manage a write address in which the cell from each input highway is written to the cell buffer.

The read address managing step is to manage a read address of the cell buffer per output highway. The monitoring step is to monitor the empty of the cell of the cell buffer per output highway. The intermediate-stage SRM is expanded, and, when the path switching unit switches the path, the construction of the cell buffer is the same before and after switching the path.

Further, a method for switching a path by an ATM switch according to a fourth invention comprises a switchover step of switching over the paths in accordance with path data contained in cells by a plurality of SRMs arrayed in a plurality of columns and in at least one row in order to transfer inputted data to a target line on the cell-unit. The plurality of SRMs are constructed of SRMs of three stages, i.e., a first-stage, an intermediate-stage and a rear-stage in the column direction. The number of the intermediate-stage SRMs is incremented by a power of a predetermined value in the row direction. All the paths to the intermediate-stage SRMs are divided according to every path switching group having a corresponding number of paths to the number of the intermediate-stage SRMs. The switchover step is to switch the paths according to every path switching group so that the path to all the SRMs of the next stage are evenly switched from the respective SRMs.

The path switching method by the ATM switch according to the fourth invention is established in a case where the steps thereof are specifically as below. Moreover, the comprises a storing step, a control step and a monitoring step.

The storing step is to store the cell buffer with the cells inputted from input ports by allocating different items of tag data to a plurality of I/O ports and a path switching port. The control step is to control a write and a read of the cells and to halt reading the cells stored in the cell buffer by previously switching a new path to the SRM expanded from the path switching port and switching over an old path to the new path with a switchover of the allocated tag data. The monitoring step is to determine whether or not the cell buffer becomes empty after transmitting all the cells remaining in the cell buffer of the SRM to the old path. The control step is to transmit the cells to the cell buffer of the SRM expanded with respect to the new path when the cell buffer to the old path becomes empty.

The allocated tag data may be switched over by changing the setting of a switch or by changing the cell path data.

The monitoring step is to determine whether or not all the cells of the first-stage SRM to the old path are transmitted when the old path is switched over to the new path. The control step is to transmit the cells of the first-stage SRM to the new path when all the cells of the first-stage SRM to the old path are transmitted. The monitoring step is to determine whether or not all the cells of the intermediate-stage SRM to the old path are transmitted. The control step is to transmit, when all the cells of the intermediate-stage SRM to the old path are transmitted, the cells of the intermediate-stage switching module to the new path.

The above method further comprises a flag tacking step. The control step is to determine whether or not the last cell containing the flag reaches. The above method further comprises a notifying cell inserting step. The control step is to determine whether or not the notifying cell reaches. The control step is to determine whether or not the notifying cell reaches. The notifying cell inserting step is to, when the notifying cell is inserted, add the same number as an output port number of the preceding-stage SRM to a cell header as route data of the next-stage SRM. The control step may be to determine whether or not a predetermined number of empty cells indicating the arrival of the last cell consecutively reach.

Further, the path switching method may include the storing step, the write address managing step, the read address managing step and the monitoring step. The intermediate-stage SRM is expanded, and, when the old path is switched over to the new path, the construction of the cell buffer is the same before and after the path is switched. The above method may include the determining step with respect to SRM-to-SRM connections.

According to the ATM switch of the present invention, the path switching unit provided between the SRMs switches the SRM-to-SRM path when expanding the SRM. Therefore, the path switching operation can be relieved, and, besides, the path can be switched online.

Further, the path switching unit is divided into the plurality of small-scale PSMs the number of which is the same as the number of SRMs in the row direction, and, hence, the hardware quantity of the path switching unit can be reduced.

Moreover, the number of the intermediate-stage SRMs is incremented by the power of the predetermined value. Each path switching unit switches the paths according to every path switching group so that the paths to all the SRMs of the next stage are evenly switched from the respective SRMs, and hence the construction of the ATM switch is equivalent before and after expanding the SRM. Accordingly, there is no necessity for re-performing a complicated band calculation for CAC (call accept control) as well as for rewriting the cell path data before and after switching the path.

An electric signal and a photo signal are converted each other between the path switching unit and each SRM, and the wavelength multiplexing unit multiplexes and demultiplexes the plurality of photo signals. It is therefore possible to transmit the signals at a high speed an reduce the number of signal transmission lines.

The wavelength allocation type switch changes an output destination per wavelength, and, hence, the number of the intra path switching unit switches can be decreased.

Further, The buffer quantity monitoring unit monitors the number of cells stored in the cell buffer and determines whether or not the cell buffer is empty. When the cell buffer is emptied, the buffer control unit halts the cell output of the first-stage SRMs. The path switching unit switches the path after the cell output was halted, and therefore the SRM can be expanded during the operation of the switch without disposing of the cells.

Moreover, the cell output of the first-stage SRM is halted, and the old path is switched over to the new path between the first- and intermediate-stage SRMs. The cells of the first-stage SRM are flowed to the new path and stored in the intermediate-stage SRM. The cells remaining in the old path are transmitted to the rear-stage SRM, and it is determined whether or not the cell buffer of the intermediate-stage SRM becomes empty. The path is switched between the intermediate- and rear-stage SRMs after the cell buffer has been emptied. It is therefore feasible to expand the SRM during the operation of the switch without disposing of the cells.

Further, the path switching unit switches the path when the last cell containing the flag reaches, and hence no effective cell exists between the SRMs. The path can be switched without any disposal of the cells. Even if the path switching unit switches the path when the notifying cell reaches after the last cell, the same effects are to be obtained. Even if the path switching unit switches the path when the empty cells consecutively reach, the same effects are to be obtained.

Furthermore, when inserting the notifying cell, the same number as the output port number of the preceding-stage SRM is added to the cell header as the route data of the next-stage SRM, and hence the SRM route of the notifying cell between the first- and intermediate-stages is the same as the SRM route between the intermediate- and rear-stages. That is, since the notifying cell reaches the rear-stage SRM input port with the same number, it is possible to confirm that all the cells finally accumulated in the intermediate-stage SRM reach the rear-stage SRM.

Moreover, the read address is monitored per output highway, and the cell empty is detected per output highway. It is therefore possible to switch the path without depending on the buffer construction of the SRM.

Further, when the intermediate-stage SRM is expanded, the paths for the new expansion are not required to be switched. As the construction of the buffer does not change before and after switching the path, there is no necessity for executing the recalculation for the CAC.

Furthermore, the path can be easily switched simply by replacing the connectors of the connector module.

Also, the new path after the switching is extended from the path switching port provided in each SRM, and the old path is switched over to the new path with the switchover of the allocated tag data. It is determined whether or not each cell buffer is empty after transmitting all the cells remaining the cell buffer of the SRM to the old path. Since there are transmitted the cells stored in the cell buffer of the SRM expanded through the new path are transmitted when the cell buffer of the old path becomes empty, the SRM can be expanded during the operation of the switch without reversing the cell order.

Further, all the cells of the first-stage SRM to the old path are transmitted, and then the cells of the first-stage to the new path are also transmitted. All the cells of the intermediate-stage SRM to the old path are transmitted, and the cells of the intermediate-stage SRM to the new path are transmitted. Therefore, the SRM can be expanded during the operation of the switch without reversing the cell order.

Moreover, the construction of the ATM switch is equivalent before and after the SRM is expanded, whereby the active system can be switched over to the standby system.

The SRM having the cross point buffer is divided into the plurality of packages. The I/O terminals are so laid out as to be evenly allocated to the respective packages, and therefore the SRM can be constructed of one kind of packages.

The plurality of SRMs and one or more path switching units can be sorted and packaged into the separate racks.

In addition, the exclusive OR circuit obtains the exclusive OR of the row number of the SRM with the output port number of the SRM. The AND circuit obtains the AND of the output of the exclusive OR circuit with the exponent data about the number of rows of the SRM as the next-stage input port number to be connected. Accordingly, when the path was switched after the SRM was expanded, the next-stage SRM to be connected can be easily confirmed.

BRIEF DESCRIPTION OF THE DRAWINGS

Other objects and advantages of the present invention will become apparent during the following discussion in conjunction with the accompanying drawings, in which:

FIG. 1 is a diagram showing an example 1 of a basic construction of an ATM switch;

FIG. 2, comprising FIGS. 2A to 2C, is a diagram illustrating an example 2 of the basic construction of the ATM switch; FIG. 2A is a diagram illustrating the ATM switch based on one-row SRMs; FIG. 2B is a diagram illustrating the ATM switch based on two-row SRMs;. FIG. 2C is a diagram showing the ATM switch based on three-row SRMs;

FIG. 3 is a constructive diagram illustrating the ATM switch before the SRM is expanded in an embodiment 1 of the present invention;

FIG. 4 is a constructive diagram illustrating the ATM switch after the SRM was expanded in the embodiment 1 of the present invention;

DETAILED DESCRIPTION OF THE PREFERRED EMBODIMENTS

Figure 5:
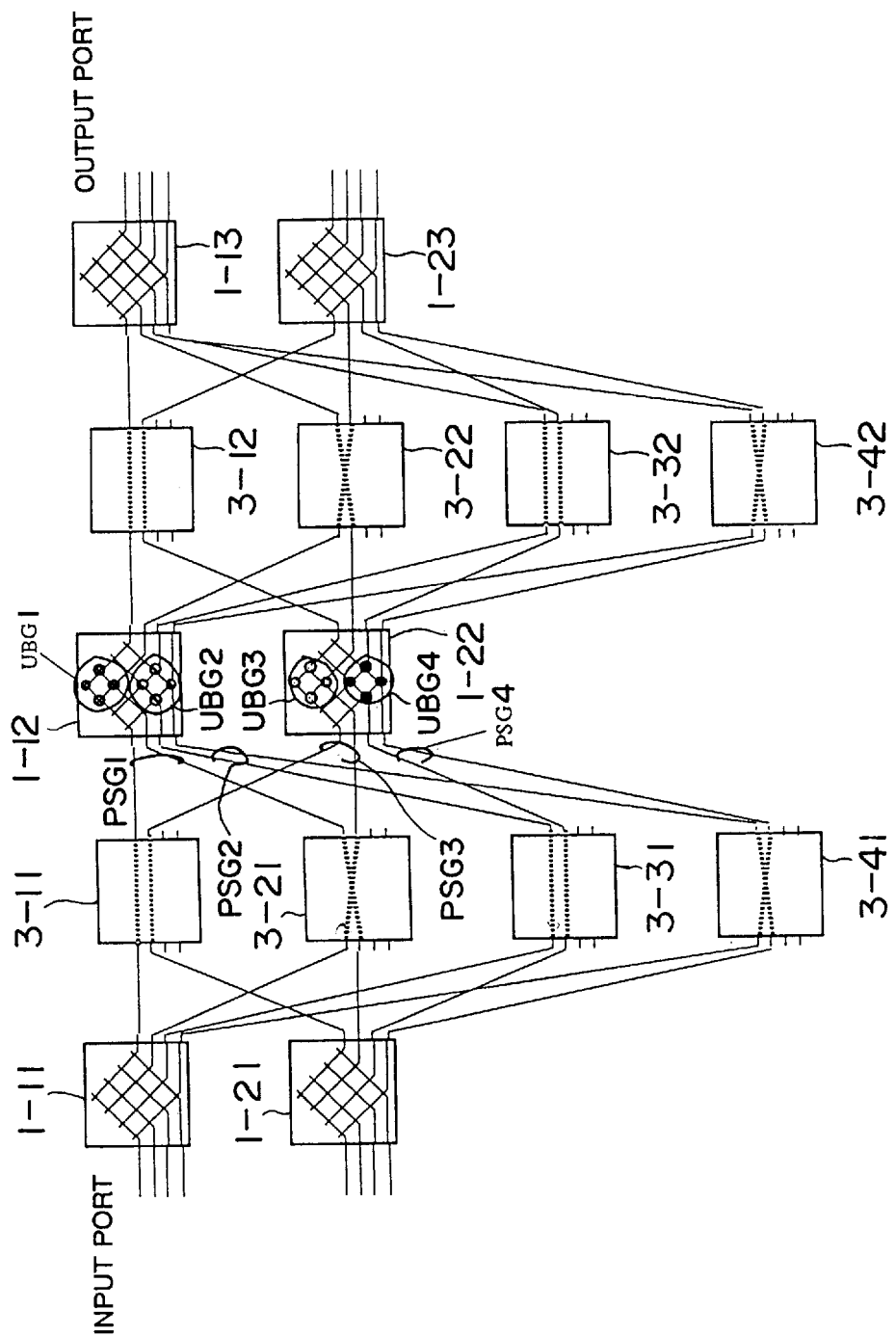
FIG. 5 is a constructive diagram showing the ATM switch before the SRM is expanded in an embodiment 2.

An ATM switch and a method for switching a path by the ATM switch according to the present invention will hereinafter be discussed with reference to the accompanying drawings. To start with, examples of a basic construction of the ATM switch will be explained.

<EXAMPLE 1 OF BASIC CONSTRUCTION OF ATM SWITCH>

FIG. 1 is a diagram illustrating an example 1 of a basic construction of the ATM switch. The ATM switch includes a plurality of SRMs 1 and one or more path switching units 2. Each of the multi-stage SRMs 1 arrayed in three columns and in a plurality of rows switches paths in accordance with an item of path data imparted to a cell in order to transfer inputted data on a cell-unit to a target circuit.

Each of the one or more path switching units 2 is provided between two adjacent columns of SRMs arranged in two adjacent columns among the plural columns of SRMs. The path switching unit 2 switches paths between one column of SRMs of the two adjacent columns of SRMs which are arranged in a side-by-side relationship in the row direction and the other column of SRMs of the two adjacent columns of SRMs which are arranged in the side-by-side relationship in the row direction. For example, the path switching unit 2 is capable of switching the paths in accordance with a command given from an unillustrated central processing unit (CPU).

The path switching unit 2 consists of a plurality of PSMs 3 the number of which is the same as the number of all the SRMs arranged in the side-by-side relationship in the row direction. The PSM 3 is formed substantially in the same size as a size of each SRM 1. Arranged herein in the row direction are the plurality of PSMs 3 the number of which is the same as the number of SRMs when constructed at the maximum.

Further, the plurality of SRMs 1 are composed of the three-stage SRMs, i.e., the SRMs at a first stage, the SRMS at an intermediate stage and the SRMs at a rear stage in the column direction. The number of SRMs of the intermediate stage is incremented by a power of a predetermined value in the row direction, and all the paths to the intermediate-stage SRMs are divided into path switching groups having the same number of paths as the number of the intermediate-stage SRMs. The respective path switching units 2 switch the paths according to every path switching group so that the paths are evenly switched from the respective SRMs 1 to all the SRMs of the next stage.

According to the ATM switch, when the SRMs 1 are expanded, the path switching units 2 switch the inter-SRM paths in accordance with a command issued from the CPU. It is therefore possible to relieve the operation of switching the paths and switch the paths online.

Further, the path switching units 2 are divided into a plurality of small-scale PSMs the number of which is the same as the number of the SRMs arranged in the row direction, and, hence, the intermediate-stage SRMs can be expanded without making an initial preparation, with the result that a hardware quantity of the path switching units 2 can be reduced.

Moreover, the number of the intermediate-stage SRMs is incremented by a power of a predetermined value in the row direction. Then, the respective path switching units switch the paths according to every path switching group so that the paths are evenly switched from the respective SRMs to all the SRMs at the next stage, and therefore the construction of the ATM switch is equivalent before and after expanding the SRMs. For this reason, there is no necessity for rewriting an item of cell path data before and after switching the path and re-performing a complicated band calculation for CAC (Call Accept Control).

<EXAMPLE 2 OF BASIC CONSTRUCTION OF ATM SWITCH>

Next, an example 2 of the basic construction of the ATM switch will be explained. The ATM switch includes, as illustrated in FIGS. 2A–2C, multi-stage SRMs 1. Each SRM 1 switches the paths in accordance with the path data imparted to the cell in order to transfer the inputted data to a target circuit on the cell-unit.

The plurality of SRMs are constructed of the first-stage SRMs, the intermediate-stage SRMs and the rear-stage SRMs in the column direction. The number of the intermediate-stage SRMs is incremented by a power of a predetermined value in the row direction, and all the paths to the intermediate-stage SRMs are divided into the path switching groups having the same number of paths as the number of the intermediate-stage SRMs. The paths are switched according to every path switching group so that the paths are evenly switched from the respective SRMs 1 to all the SRMs at the next stage.

Referring to FIGS. 2A–2C, the SRM 1 is based on, e.g., a (4×4) construction. As illustrated in FIGS. 2A–2C, the number of the intermediate-stage SRMs 1 is incremented on the unit such as 1, 2, 4. As shown in FIG. 2A, if the number of the intermediate-stage SRMs is 1, one path is provided.

As depicted in FIG. 2B, if the number of the intermediate-stage SRMs is 2, two paths are bundled into one PSG (Path Switching Group). As illustrated in FIG. 2C, if the number of the intermediate-stage SRMs is 4, four paths are bundled into one PSG. The intermediate-stage SRM 1 performs switching within the PSG.

As described above, the number of the intermediate-stage SRMs is incremented by a power of a predetermined value in the row direction, and the paths are switched according to every path switching group so that the paths are evenly switched from the respective SRMs to all the SRMs at the next stage.

Accordingly, the hardware quantity is decreased when the SRMs are prepared on the small scale. Further, the construction of the ATM switch is equivalent before and after expanding the SRMs. For this reason, there is no necessity for rewriting the cell path data before and after the patch switching, and, hence, the cells can be correctly routed. Further, there is no necessity for reperforming the complicated band calculation for the CAC.

<EMBODIMENT 1>

Next, a specific embodiment of the ATM switch according to the present invention will be explained. FIG. 3 is a diagram illustrating the ATM switch before expanding the SRMs in an embodiment 1. FIG. 4 is a diagram illustrating a construction of the ATM switch after SRMs were expanded in the embodiment 1. In the embodiment 1, the number of the intermediate SRMs is incremented from 1 to 2.

Given first is an explanation of the ATM switch before the SRMs were expanded with reference to FIG. 3. The ATM switch includes one first-stage SRM 1-11 connected to an input port, one intermediate-stage SRM 1-12 and one rear-stage SRM 1-13 connected to an output port.

Each of the SRMS 1-11 through 1-13 is composed of a (4 input ports×4 output ports) cross point buffer. These SRMs work to store the respective cells inputted and switch the paths in accordance with the path data given to the cells in order to transfer the cells to the target circuits on the cell-unit.

A path switching unit 2-1 is provided between the SRM 1-11 and SRM 1-12 and works to switch the paths between these SRMs. A path switching unit 2-2 is provided between SRM 1-12 and SRM 1-13.

The path switching unit 2-1 is constructed of four pieces of PSM 3-11 to 3-41 arranged in the vertical (column) direction. The path switching unit 2-2 is constructed of four pieces of PSMs 3-12 to 3-42 arranged in the vertical direction.

Each PSM is based on the (4 input ports×4 output ports) construction having the same size as the size of the above-mentioned PSM and arbitrarily switches the paths between the individual input ports and the individual output ports. The number of ports of each SRM is equal to the number of PSMs arranged in the vertical direction. Each port of the SRM is connected to one PSM corresponding to this port.

In the ATM switch including the thus multi-staged SRMs, if the paths are switched from respective SRMs 1-1m (m=1–3) to all the SRMs at the next stage, these paths are required to be evenly switched to the respective SRMs at the next stage. For this reason, the PSM 3-ji, 3-j2 (j=1–4) switch the proper paths, whereby the paths are evenly switched from the respective SRMs 1-1m to the individual SRMs at the next stage.

According to the example shown in FIG. 3, only one SRM 1-12 is provided at the intermediate stage, and, hence, each PSM switches the intermediate-stage paths in such a way that all the ports of the first-stage SRM 1-11 are connected to the intermediate-stage SRM 1-12. In this case, all the intermediate-stage paths are divided into four switching groups PSG1–PSG4.

The cross point buffers corresponding to switching within the PSMs 3-j1, 3-j2 are set as using buffer groups UBG1–UBG4. Referring to FIG. 3, each of the switching groups PSG1–PSG4 contains only one path. Hence, the intermediate-stage SRM 1-12 does not perform switching. Each of the UBG1–UBG4 corresponds to a (1×1) cross point.

Next, the ATM switch after expanding the SRMs will be described with reference to FIG. 4. In the ATM switch shown in FIG. 4, as compared with the ATM switch illustrated in FIG. 3, an intermediate-stage SRM 1-22 is expanded. Each of intermediate-stage SRMs 1-i2 (i=1–2) has j-pieces (j=1–4) of input ports and j-pieces of output ports.

The i-th port of each of the j-th PSMs 3-j1, 3-j2 is connected to the j-th port of the i-th SRM 1-i2 between the two intermediate-stage SRMs 1-12, 1-22 and the respective PSMs 3-j1, 3-j2.

For instance, the fourth port of the second intermediate-stage SRM 1-22 is connected to the second port of each of the fourth PSMs 3-41, 3-42. That is, the PSMs 3-j1, 3-j2 are connected to the same ports of the respective SRMs 1. The ports of the same order are connected to each other between the first-stage SRM 1-11, the rear-stage SRM 1-13 and the two intermediate-stage SRMs 1-12, 1-22.

The two sets of PSMs 3-21, 3-41 and 3-22, 3-42 switch the paths so as to pass through the newly expanded intermediate-stage SRM 1-22 on the basis of a command issued from the unillustrated CPU.

For example, the PSM 3-21 switches the path to connect the second port to the second port of the SRM 1-22. The PSM 3-41 switches the path to connect the second port to the fourth port of the SRM 1-22.

The four paths extending from the SRM 1-11 are switched evenly by twos to the two SRMs 1-12, 1-22 at the next stage. The PSM 3 is connected to the same port of each SRM 1, and, therefore, the switched paths are arranged to pass through the UBG located in the same position as the position before being switched.

For instance, in the SRM 1-12, the cells are stored in the UBGs 1, 3 through the PSGs 1, 3. In the SRM 1-22, the cells are stored in the UBGs 2, 4 through the PSGs 2, 4.

Accordingly, the construction of the ATM switch is equivalent before and after expanding the intermediate-stage SRM 1-22 is expanded.

<EMBODIMENT 2>

Figure 6:
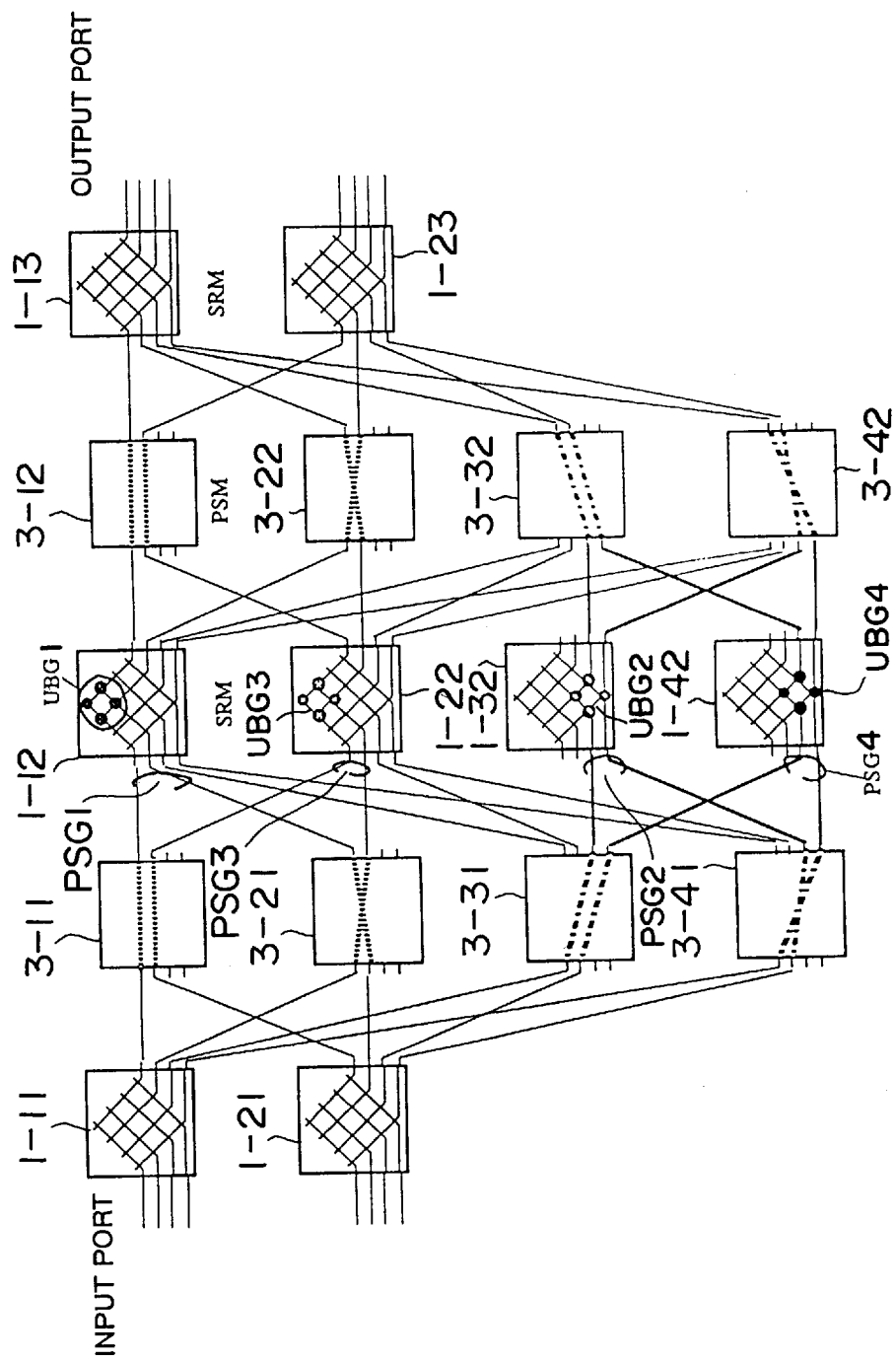
FIG. 6 is a constructive diagram illustrating the ATM switch after the SRM was expanded in the embodiment 2.

Next, an embodiment 2 of the present invention will be discussed. FIG. 5 is a diagram illustrating a construction of the ATM switch before the SRMs are expanded in the embodiment 2. FIG. 6 is a diagram showing a construction of the ATM switch after the SRMs were expanded in the embodiment 2. In accordance with the embodiment 2, the number of the intermediate-stage SRMs is incremented from 2 to 4.

The ATM switch before expanding the SRMs as illustrated in FIG. 5 includes the first-stage SRMs 1-11, 1-21, the intermediate-stage SRMs 1-12, 1-22 and the rear-stage SRMs 1-13, 1-23 that are arrayed in matrix. PSMs 3-11–3-41 are provided between the first-stage SRMs and the intermediate-stage SRMs. PSMs 3-12–3-42 are provided between the intermediate-stage SRMs and the rear-stage SRMs.

All the intermediate-stage paths are divided into four path switching groups PSG1–PSG4. Each of the path switching groups PSG1–PSG4 consists of two paths. The SRM 1-12 includes a (2×2) UBG1 and (2×2) UBG2 that have the cross point buffers. The SRM 1-22 includes a (2×2) UGB3 and a (2×2) UGB4.

The PSMs 3-11, 3-21 switch the paths to connect the (2×2) UBG1 to a port 1 of the SRM 1-11 and a port 2 of the SRM 1-21 through the PSG 1. The PSMs 3-11, 3-21 switch the paths to connect the (2×2) UBG3 to a port 2 of the SRM 1-11 and a port 1 of the SRM 1-21 through the PSG 3.

The PSMs 3-31, 3-41 switch the paths to connect the (2×2) UBG2 to a port 3 of the SRM 1-11 and a port 4 of the SRM 1-21 through the PSG 2. The PSMs 3-31, 3-41 switch the paths to connect the (2×2) UBG4 to a port 3 of the SRM 1-11 and a port 4 of the SRM 1-21 through the PSG 4. Note that the configurations of the PSMs 3-12, 3-42 are the same as those of the PSMs 3-11, 3-41.

Next, the ATM switch after expanding the SRMs will be explained with reference to FIG. 6. Herein, intermediate-stage SRMs 1-32, 1-42 are expanded.

The embodiment 2 is also carried out in the same procedures as those in the embodiment 1. The PSMs 3-31, 3-41 switch the paths to pass through the (2×2) UBG2 within the newly expanded intermediate-stage SRM 1-32. The PSMs 3-31, 3-41 switch the paths to pass through the (2×2) UBG4 within the newly expanded intermediate-stage SRM 1-42.

That is, one of the two path switching groups PSG passing through the respective intermediate-stage SRMs is switched. With this switching, the paths are switched evenly by ones from the respective SRMs to all the SRMs at the next stage.

Figure 7:
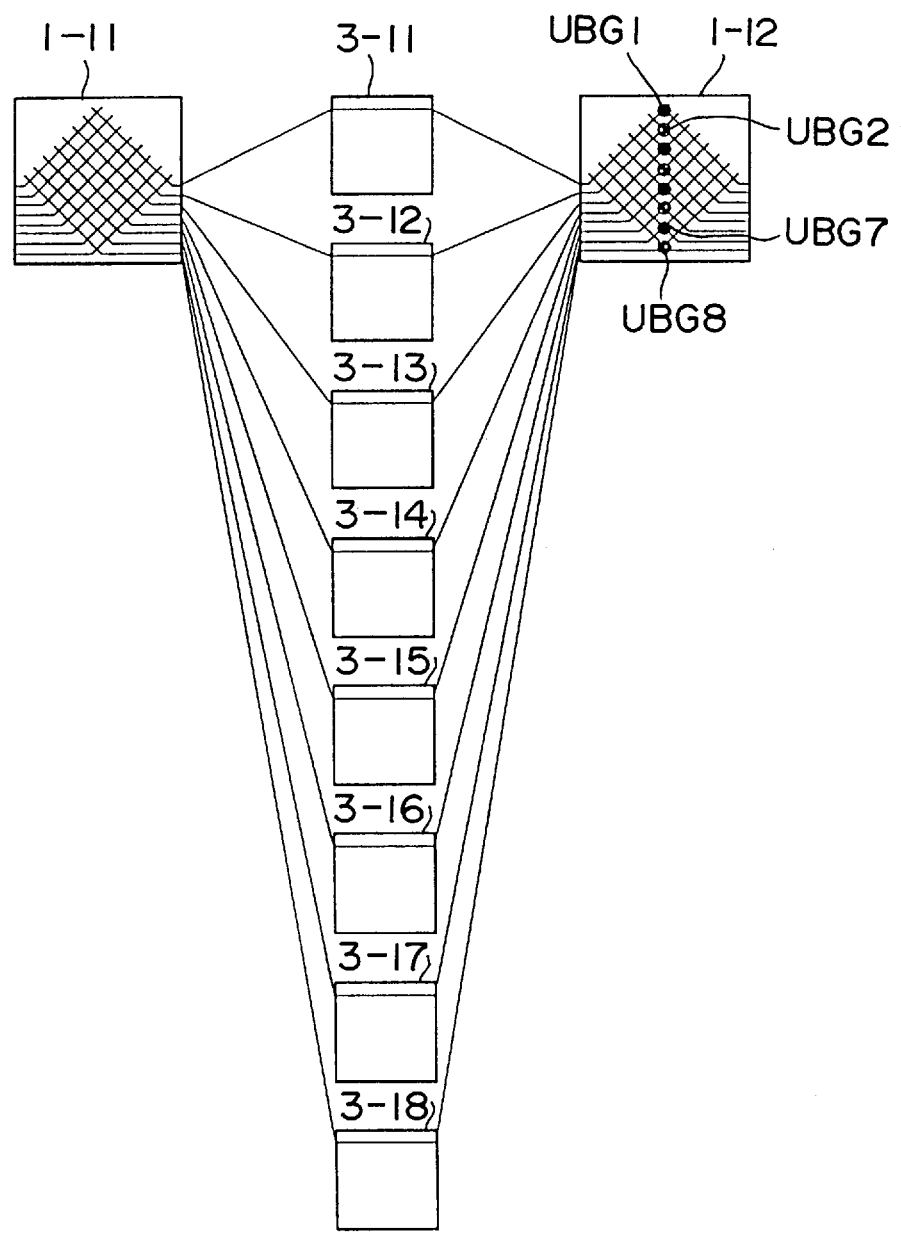
FIG. 7 is a constructive diagram showing a path switching example 1 using an (8×8) SRM.
Figure 8:
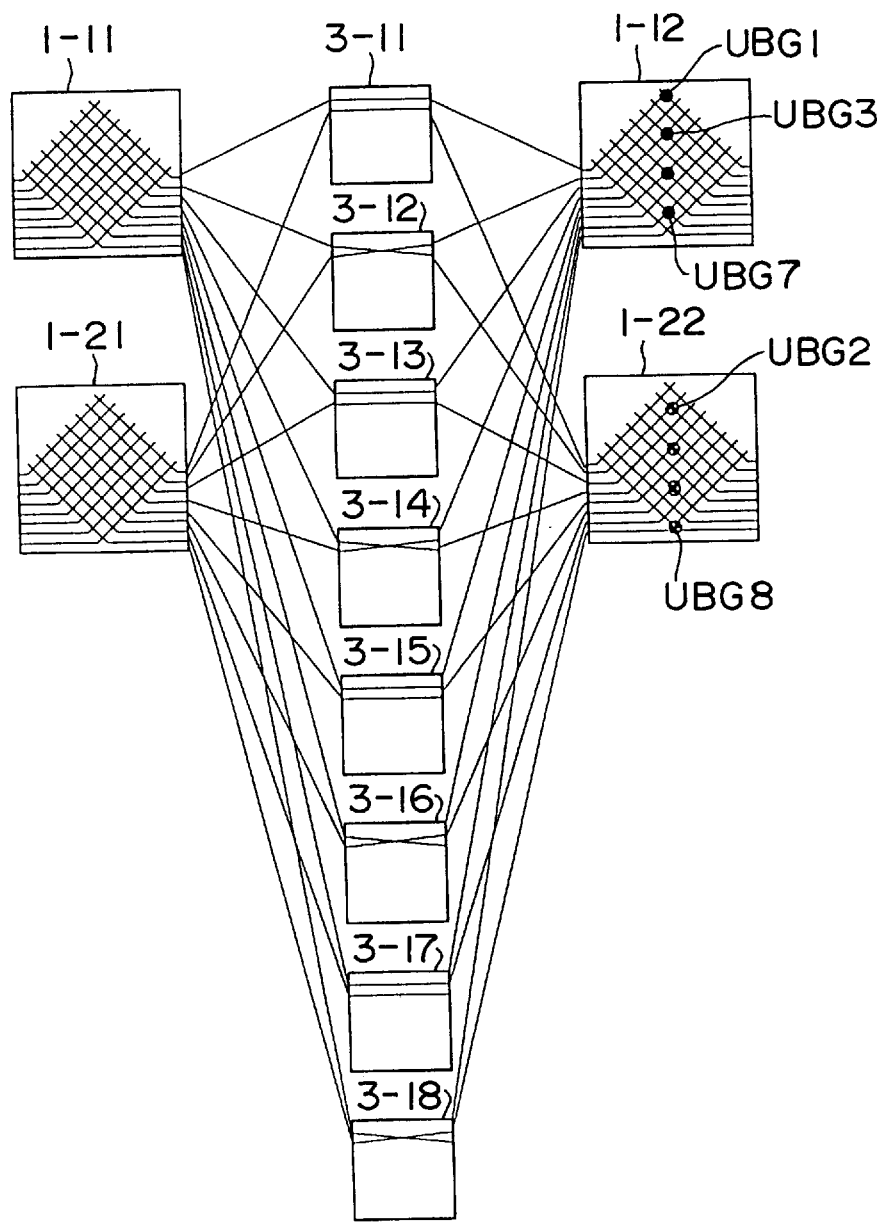
FIG. 8 is a constructive diagram illustrating a path switching example 2 using the (8×8) SRM.

Note that the SRMs are applicable to those other than the (4×4) SRMs. For instance, the SRM shown in FIGS. 7 and 8 is constructed of an (8×8) SRM. Referring to FIG. 7, eight pieces of PSMs 3-11 through 3-18 are connected to the single piece of first-stage SRM 1-11 and the intermediate-stage SRM 1-12.

As illustrated in FIG. 8, when the first-stage SRM 1-21 and the intermediate-stage SRM 1-22 are expanded, the UGB1, the UGB3, the UGB5 and the UGB7 are allocated to the intermediate-stage SRM 1-12.

Figure 9:
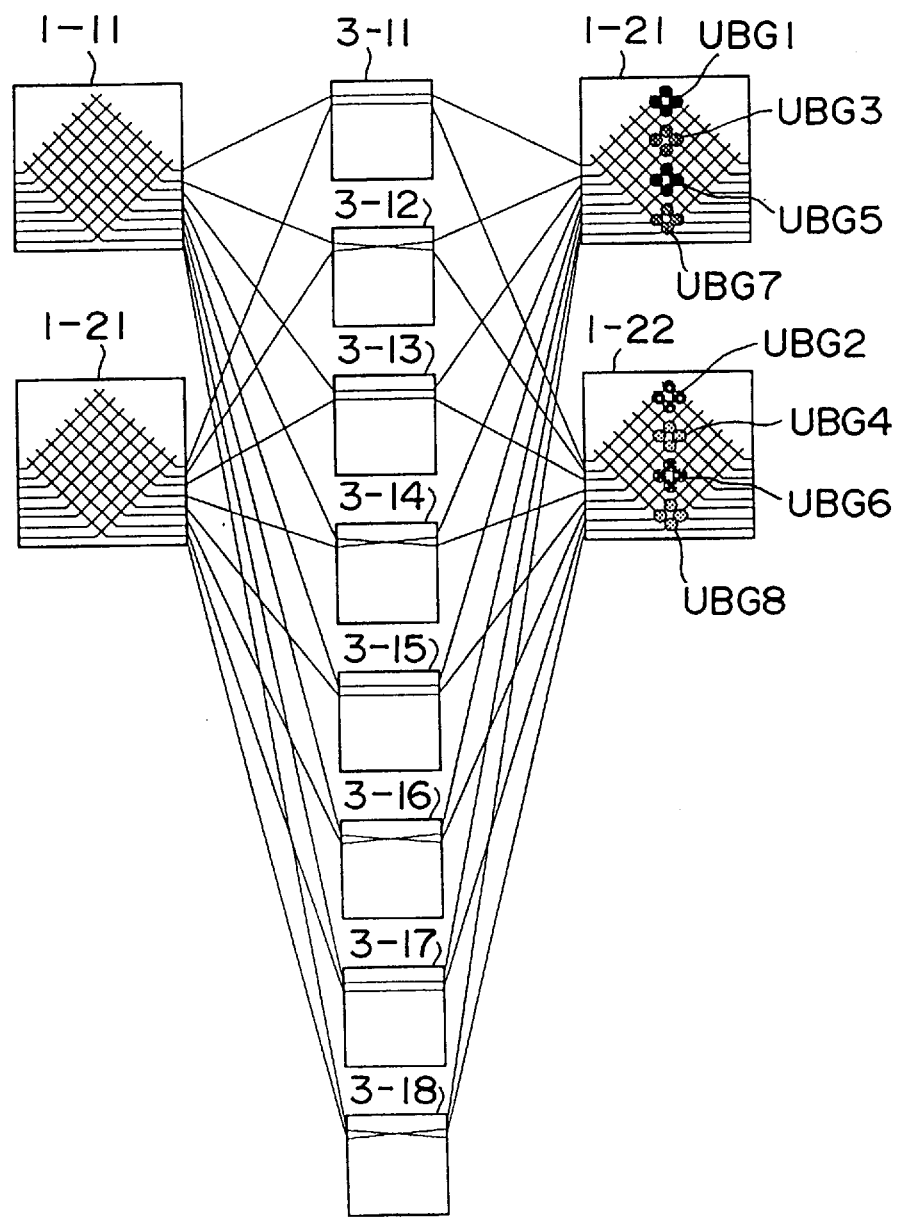
FIG. 9 is a constructive diagram illustrating a path switching example 3 using the (8×8) SRM.
Figure 10:
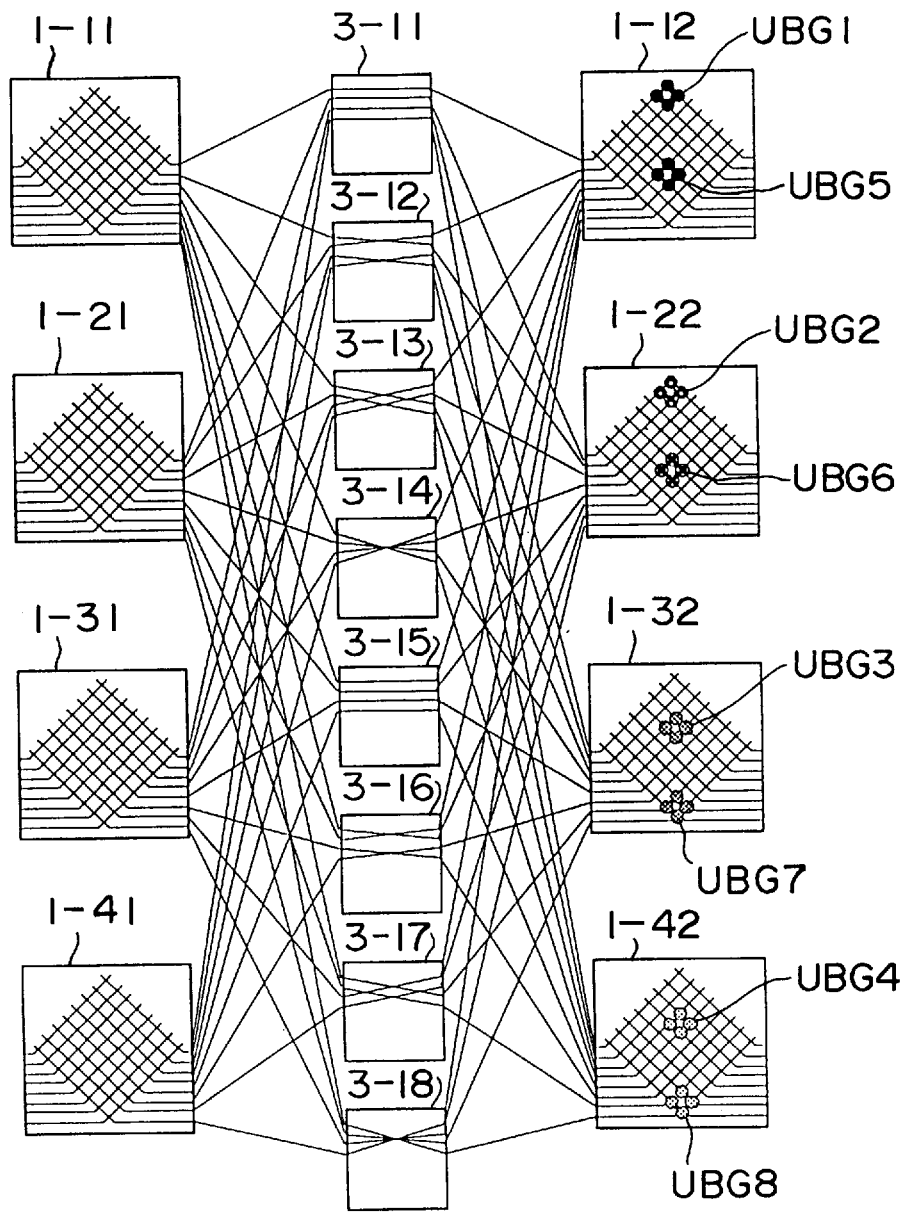
FIG. 10 is a constructive diagram illustrating a path switching example 4 using the (8×8) SRM.

Further, the SRM shown in FIGS. 9 and 10 is constructed of the (8×8) SRM. Referring to FIG. 9, the eight PSMs 3-11 through 3-18 are connected to the two first-stage SRMs 1-11, 1-21 and the two intermediate-stage SRMs 1-12, 1-22.

As illustrated in FIG. 10, when the two first-stage SRMs 1-31, 1-41 and the two intermediate-stage SRMs 1-32, 1-42 are expanded, the UGB1 and the UGB5 are allocated to the intermediate-stage SRM 1-12. The UGB2 and a UBG6 are allocated to the intermediate-stage SRM 1-22. The UBG3 and the UBG7 are allocated to the intermediate-stage SRM 1-32. The UGB4 and the UGB8 are allocated to the intermediate-stage SRM 1-42.

Thus, the construction of the ATM switch is equivalent before and after the SRMs are expanded, Hence, there is no necessity for rewriting the cell path data before and after the paths are switched. Further, the cells can be routed by the same TAG.

Also, when the SRMs are expanded without using the methods in the embodiments discussed above, new paths are switched, and therefore a configuration of the using buffer changes. For this reason, after the paths were switched, a complicated calculation has to be executed by a CAC (Call Accept Control) algorithm.

On the other hand, in the embodiment discussed above, when the SRMs were expanded online, the buffer configuration does not change before and after the intermediate-stage SRMs (before and after the paths are swithced)are expanded. Therefore, when the intermediate-stage SRMs are expanded, the complicated band calculation for the CAC does not have to be performed.

According to the discussion given above, the SRM is constructed of the cross point buffer. There may be applicable an SRM in which the buffer is composed of an output buffer or some other equivalent element. For example, the SRM is a common type buffer. The common buffer type SRM will hereinafter be explained in greater detail.

<EMBODIMENT 3>

Figure 11:
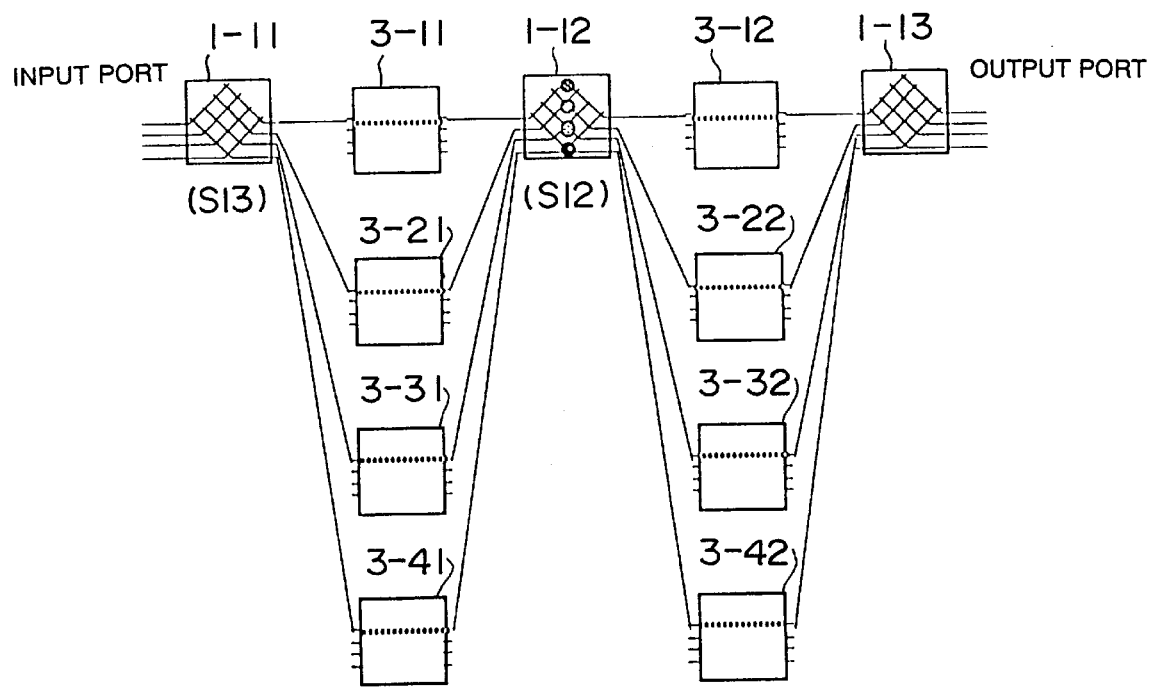
FIG. 11 is a constructive diagram showing a path switching method before the SRM is expanded in an embodiment 3.
Figure 12:
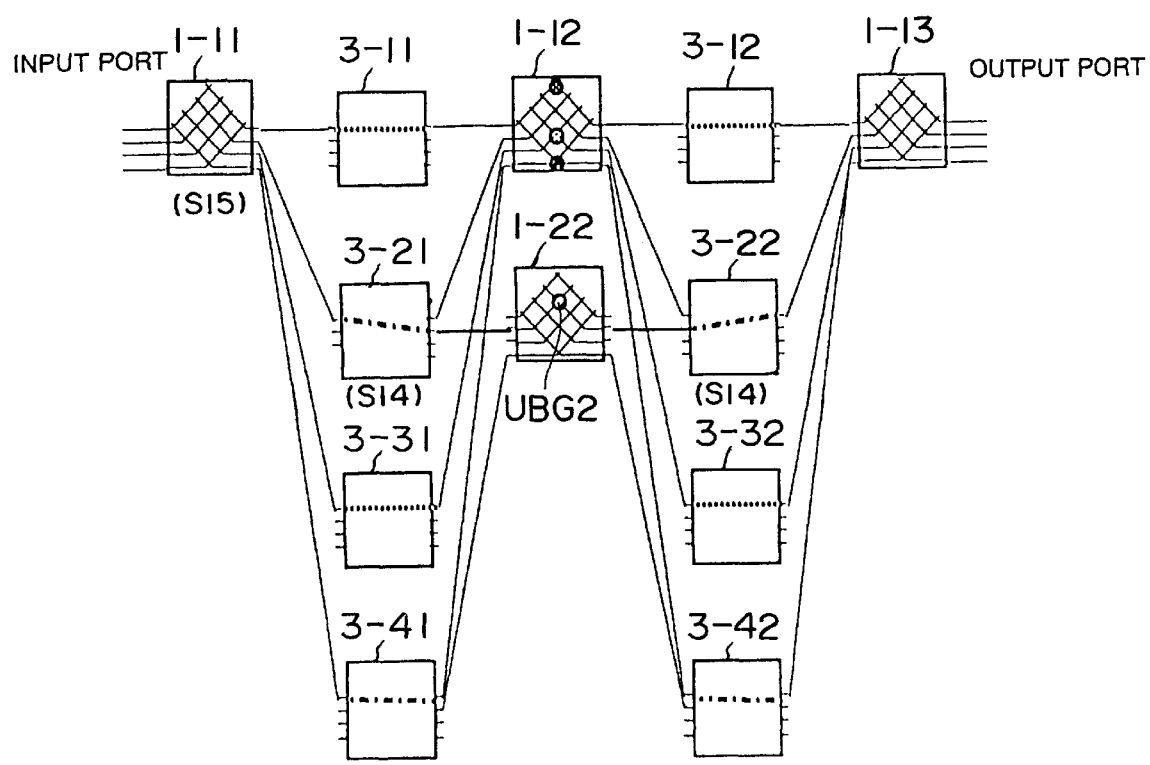
FIG. 12 is a constructive diagram showing the path switching method after the SRM was expanded in the embodiment 3.

Next, an embodiment 3 of the present invention will be described. FIG. 11 is a diagram illustrating a path switching method before the SRMs are expanded in the embodiment 3. FIG. 12 is a diagram showing a path switching method after the SRMs are expanded in the embodiment 3.

Referring to FIG. 11, first-stage PSMs 3-11 through 3-41 are connected to the first-stage SRM 1-11 and the intermediate-stage SRM 1-12. Second-stage PSMs 3-12 through 3-42 are connected to the intermediate-stage SRM 1-12 and the rear-stage SRM 1-13. Referring to FIG. 12, the intermediate-stage SRM 1-22 is expanded.

Figure 13:
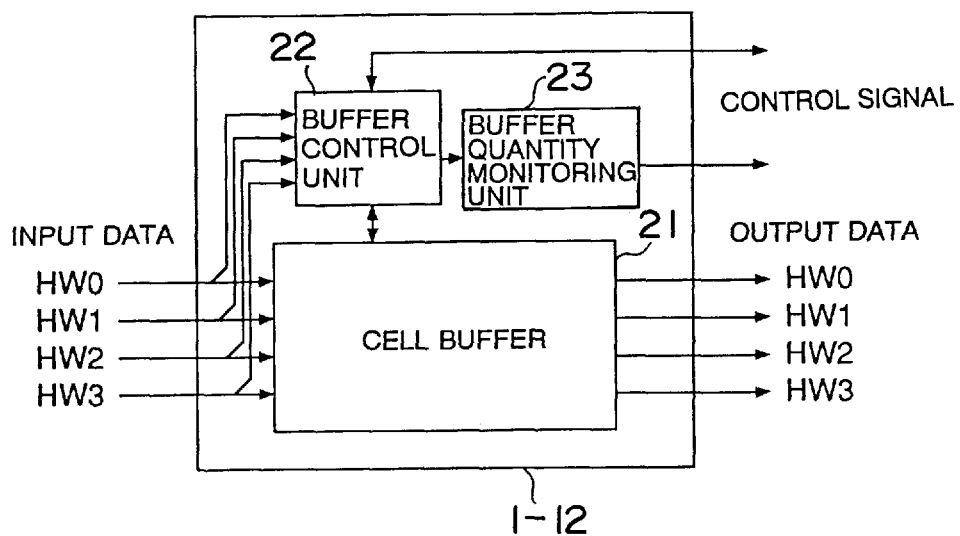
FIG. 13 is a constructive block diagram showing the SRM in the embodiment 3.

FIG. 13 is a block diagram showing the SRM. Referring to FIG. 13, each SRM includes a cell buffer 21, a buffer control unit 22 and a buffer quantity monitoring unit 23. The cell buffer 21 stores the inputted cells for a predetermined period. The buffer control unit 22 writes the cells to the cell buffer 21 in accordance with a control signal and reads the cells stored in the cell buffer 21. The buffer quantity monitoring unit 23 is connected to the buffer control unit 22, monitors the number of cells stored in the cell buffer 21 per output highway HW and gives a notice as to whether or not the cell buffer 21 is empty in its interior.

Figure 14:
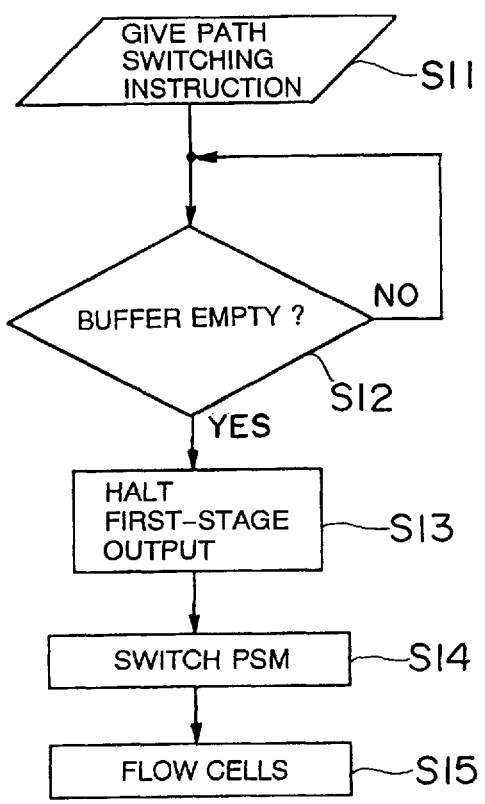
FIG. 14 is a flowchart showing operation in the embodiment 3.

FIG. 14 is a flowchart showing the path switching method in the embodiment 3. The path switching method in the embodiment 3 will be discussed in conjunction with FIG. 14. To start with, the buffer control unit 22 outputs a path switching instruction to the buffer quantity monitoring unit 23 (step S11). The buffer quantity monitoring unit 23 within the intermediate-stage SRM 1-12 determines whether or not the cell buffer 21 is empty per output highway and notifies the first-stage SRM 1-11 of a result thereof (step S12, this being shown in FIG. 11). If the cell remains in the intermediate-stage buffer immediately before the path is switched, the cell is to be mistakenly outputted to other outward path after the path was switched.

Herein, if the cell buffer 21 is empty, the buffer control unit 22 halts the cell output of the first-stage SRM 1-11 (step S13, this being shown in FIG. 11). That is, with respect to the path switching, the cells on the respective paths passing through the same path switching group are not necessarily synchronized.

For this reason, the PSM does not switch the path at a discontinuity of the cells in accordance with the embodiment 3. After the buffer control unit 22 temporarily halts the cell output of the first-stage SRM, the PSM switches the path as mentioned later.

Next, if the intermediate-stage SRM 1-22 is expanded, the PSM executes the switching of the path (step S14). Namely, when the intermediate-stage buffer becomes empty, the path is switched. Herein, the UBG becomes empty, and hence the PSMs 3-21, 3-22 which relate to the UBG2 switch the paths. The PSMS 3-21, 3-22 are thereby connected to the UBG2 of the intermediate-stage SRM 1-22.

Further, the buffer control unit 22 flows the cells of the first-stage SRM 1-11 to the cell buffer 21 via the PSM 1-22 (step S15).

Thus, when the intermediate-stage buffer becomes empty, the cell outputting of the first-stage SRM is temporarily halted, and the path is switched. Accordingly, a possibility in which the cells are mistakenly outputted to other outward path after the path is switched eliminates.

There is a first method for switching the path after the cell buffer of every path switching group has been emptied. There is also a second method for switching the paths after the cell buffers of the path switching groups for all the paths to be switched has become empty.

A probability at which the cell buffer is emptied is 0.1 per path when a duty ratio is, e.g., 0.9. The switch is constructed of 3-stage (8×8) SRMs in which a throughput of the highway HW is 2.4 Gbps. Considered is a case where the number of the intermediate-stage SRMs is incremented from 4 to 8.

To begin with, according to the first method, when the path is switched per PSM, it is required that all the buffers passing through the path switching groups are emptied. The PSM consists of four paths, and, therefore, the probability at which the buffers for the four paths are simultaneously emptied is $10^{-4}$. That is, the buffer empty probability is once for every $10^4$ cells.

A time needed for a passage of the $10^4$ cells is approximately 2 ms, and hence the path can be switched for 8 ms on the average.

On the other hand, if all the path switching groups are to be switched at one time, it is required that all the buffers passing through the four path switching groups be emptied.

The probability at which the buffers for sixteen paths are simultaneously emptied is $10^{-16}$. The buffer empty probability is once for every $10^{16}$ cells. A time needed for a passage of the $10^{16}$ cells is approximately 50 years. This is not realistic. Accordingly, a better method is the first method for switching the path per path switching group.

<EMBODIMENT 4>

Figure 15:
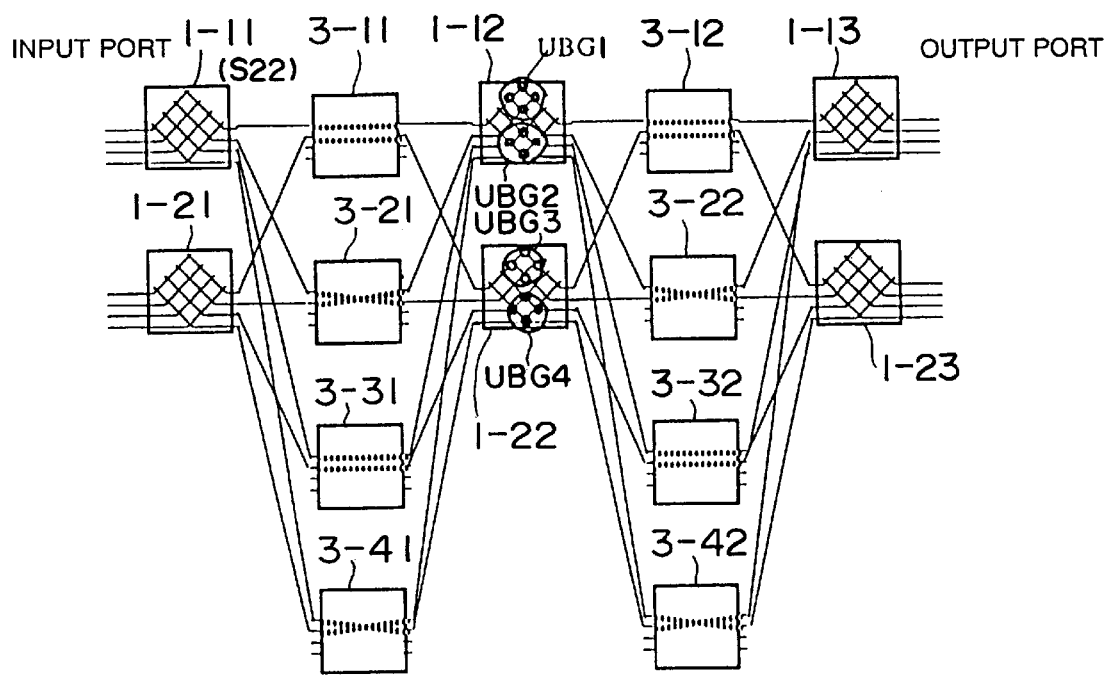
FIG. 15 is a constructive diagram showing the path switching method before the SRM is expanded in an embodiment 4.
Figure 16:
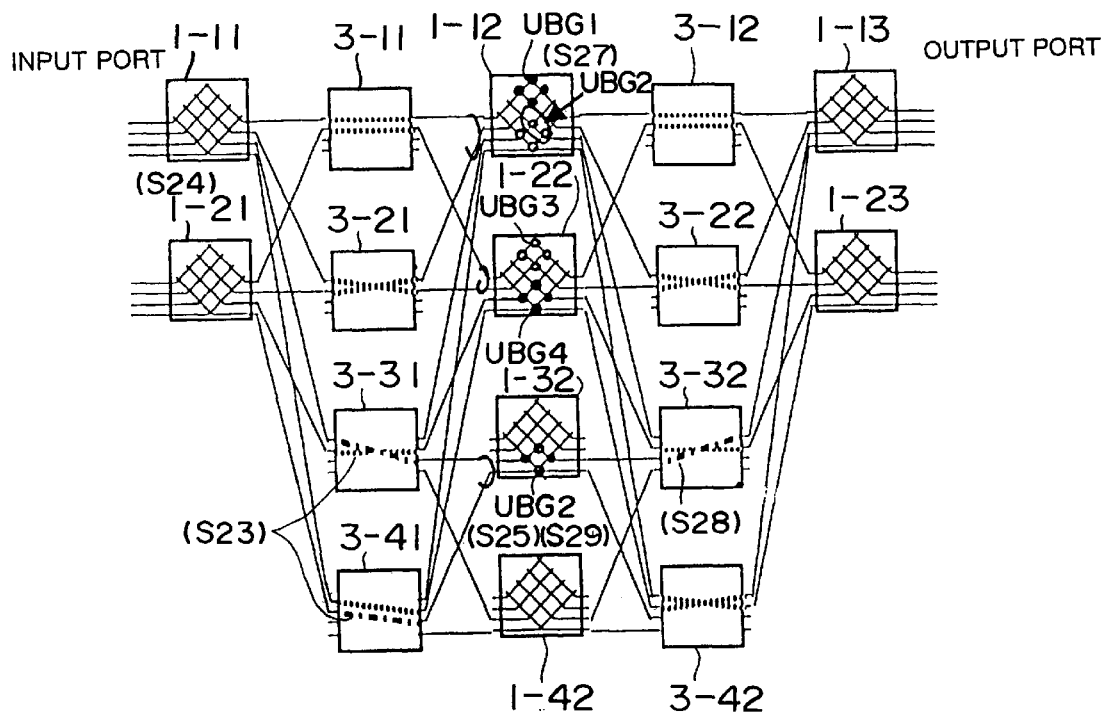
FIG. 16 is a constructive diagram showing the path switching method after the SRM was expanded in the embodiment 4.

Next, an embodiment 4 of the present invention will be described. FIG. 15 is a diagram illustrating the path switching method before the SRMs are expanded in the embodiment 4. FIG. 16 is a diagram showing the path switching method after the SRMs were expanded in the embodiment 4.

Referring to FIG. 15, the first-stage PSMs 3-11 through 3-41 are connected to the two first-stage SRMs 1-11, 1-21 and the two intermediate-stage SRMs 1-12, 1-22. The second-stage PSMs 3-12 through 3-42 are connected to the two intermediate-stage SRMs 1-12, 1-22 and the two rear-stage SRMs 1-13, 1-23. Referring to FIG. 16, the intermediate-stage SRMs 1-32, 1-42 are expanded.

Figure 17:
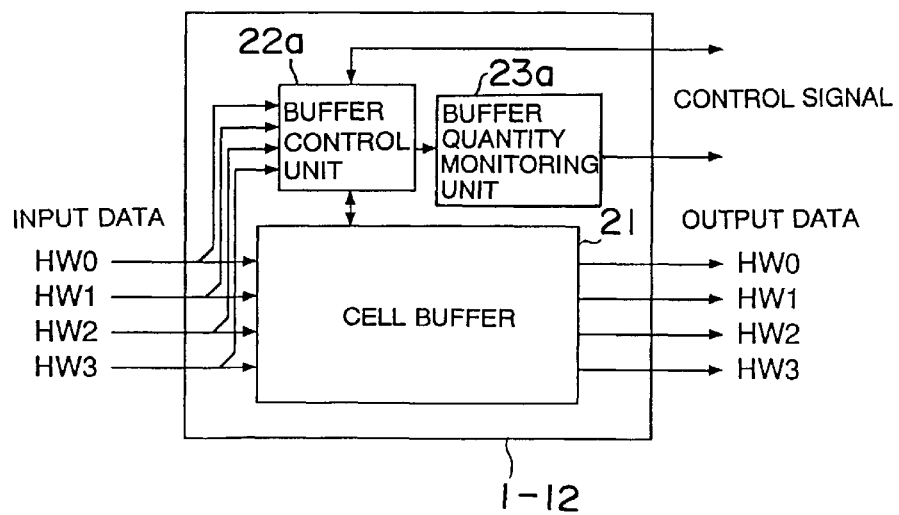
FIG. 17 is a constructive block diagram showing the SRM in the embodiment 4.

FIG. 17 is a constructive block diagram showing the SRM. Referring to FIG. 17, each SRM includes the cell buffer 21, a buffer control unit 22a and a buffer quantity monitoring unit 23a. The cell buffer 21 stores the inputted cells for a predetermined period.

The buffer control unit 22a writes the cells to the cell buffer 21 in accordance with the control signal and reads the cells stored in the cell buffer 21. The buffer quantity monitoring unit 23a is connected to the buffer control unit 22a, monitors the number of cells stored in the cell buffer 21 per output highway HW and gives a notice as to whether or not the cell buffer 21 is empty.

Figure 18:
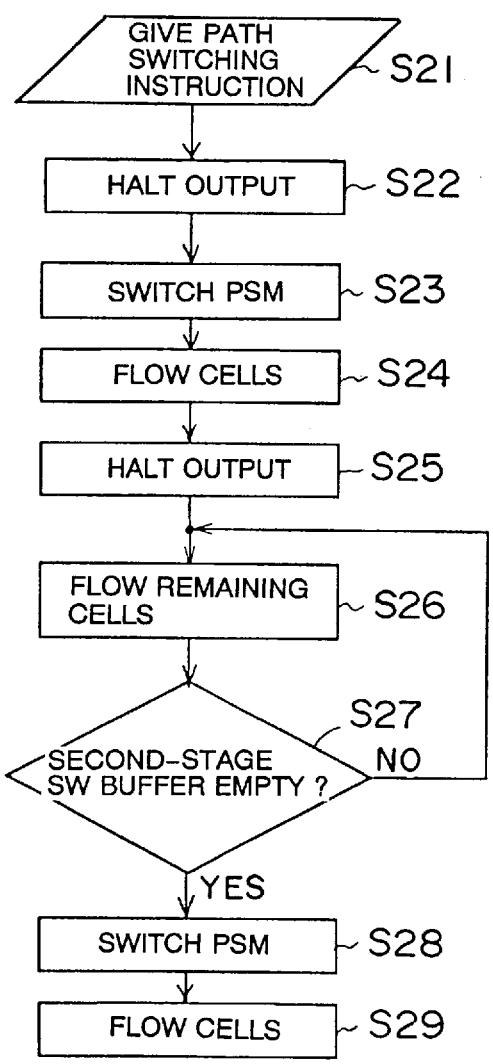
FIG. 18 is a flowchart showing operations in the embodiment 4.

FIG. 18 is a flowchart showing the path switching method in the embodiment 4. The path switching method in the embodiment 4 will be discussed with reference to FIG. 18. First, the buffer control unit 22a outputs the path switching instruction to the buffer quantity monitoring unit 23a (step S21). Then, the buffer control unit 22a halts the cell output of the first-stage SRM 1-11 (step S22, this being shown in FIG. 15). Next, the PSMs 3-31, 3-41 switch the paths to the SRM 1-32 (step S23, this being shown in FIG. 16).

Further, the buffer control unit 22a flows the cells of the SRM 1-11 to the SRM 1-32 via the PSMs 3-31, 3-41 (step S24). Then, the buffer control unit 22a makes the cell buffer 21 stop the cells (step S25). Furthermore, the buffer control unit 22a flows the remaining cells to the cell buffer 21 (step S26).

Next, the buffer quantity monitoring unit 23a within the intermediate-stage SRM 1-12 determines whether or not the cell buffer in the UGB2 is empty (step S27). Herein, if the cell buffer 21 in the UBG2 is empty, the PSM 3-32 switches the path to the SRM 1-32 (step S28).

Further, the buffer control unit 22a flows the cells stored in the intermediate-stage SRM 1-32 to the PSM 3-32 (step S29).

As discussed above, in accordance with the embodiment 4, the first- and intermediate-stage paths are switched, and, after the intermediate-stage cells have run out, the intermediate- and rear-stage paths are switched. Herein, for the duration of the non-existence of the cells passing through the paths before the intermediate-stage switching, the cell buffer 21 through which the switched path is extended makes the cells wait, these cells having reached after the path switching. It is possible to switch the paths from the path relative to the cell buffer 21 which has been emptied without a disposal of the cells.

<MODIFIED EXAMPLE 1 OF EMBODIMENT 4>

Figure 19:
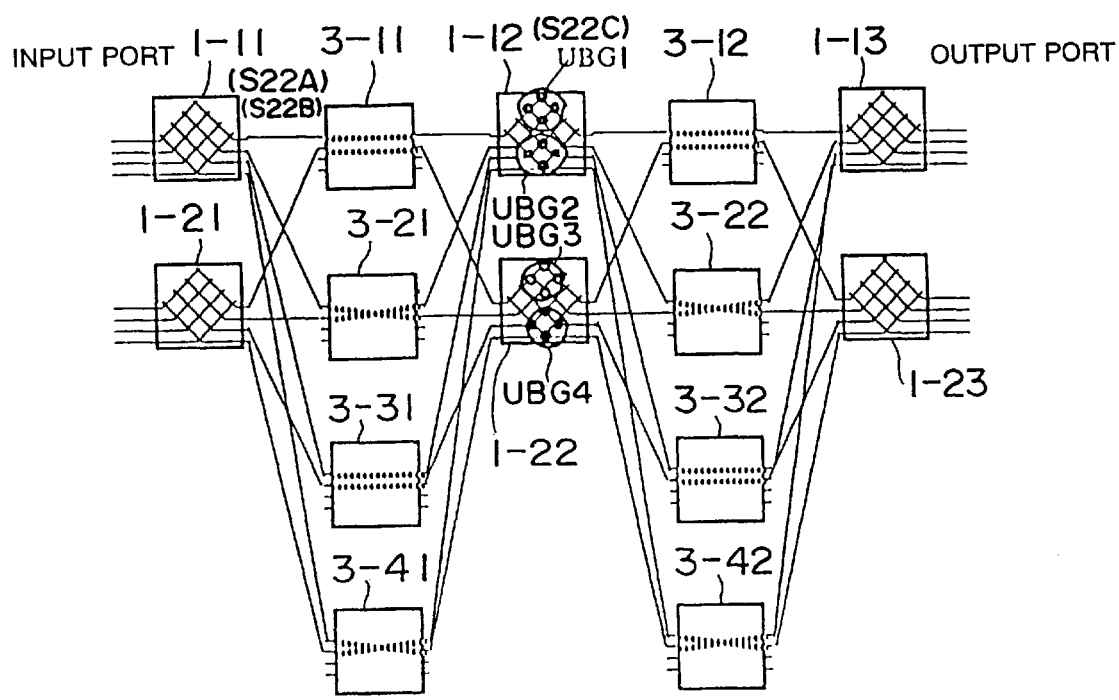
FIG. 19 is a constructive diagram showing the path switching method before the SRM is expanded in a modified example 1 of the embodiment 4.
Figure 20:
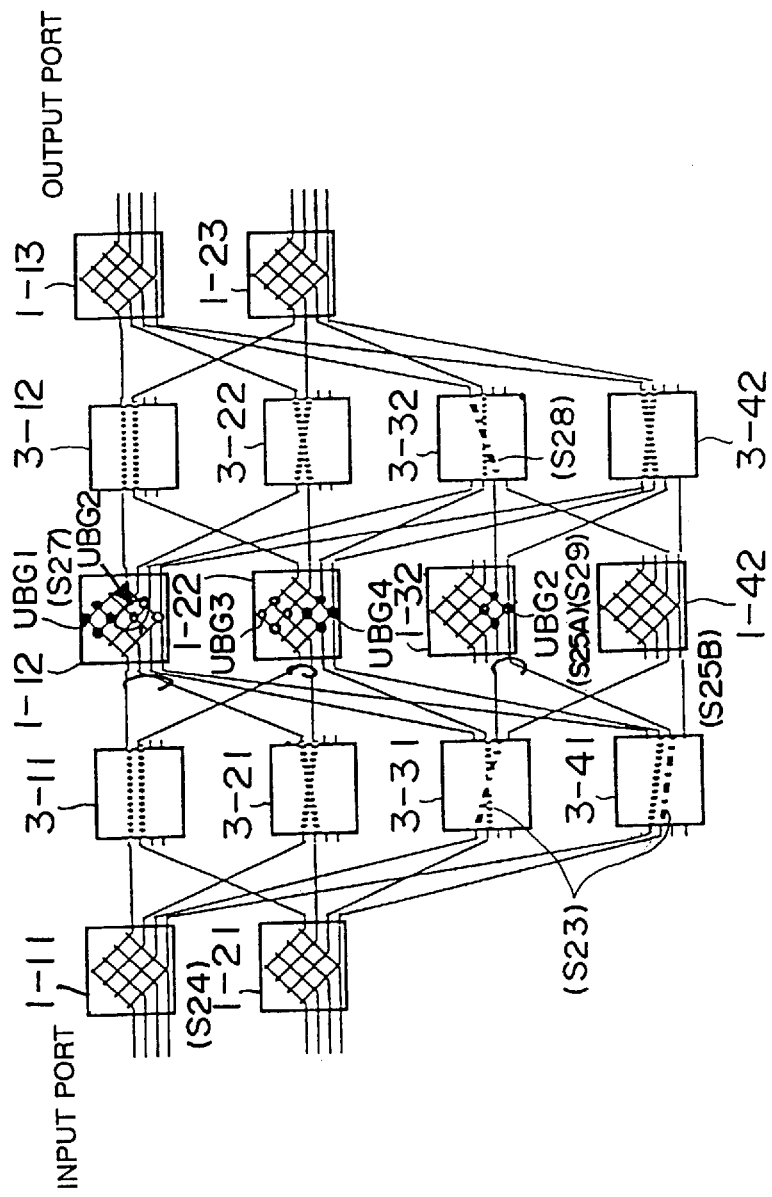
FIG. 20 is a constructive diagram showing the path switching method after the SRM was expanded in the modified example 1 of the embodiment 4.
Figure 21:
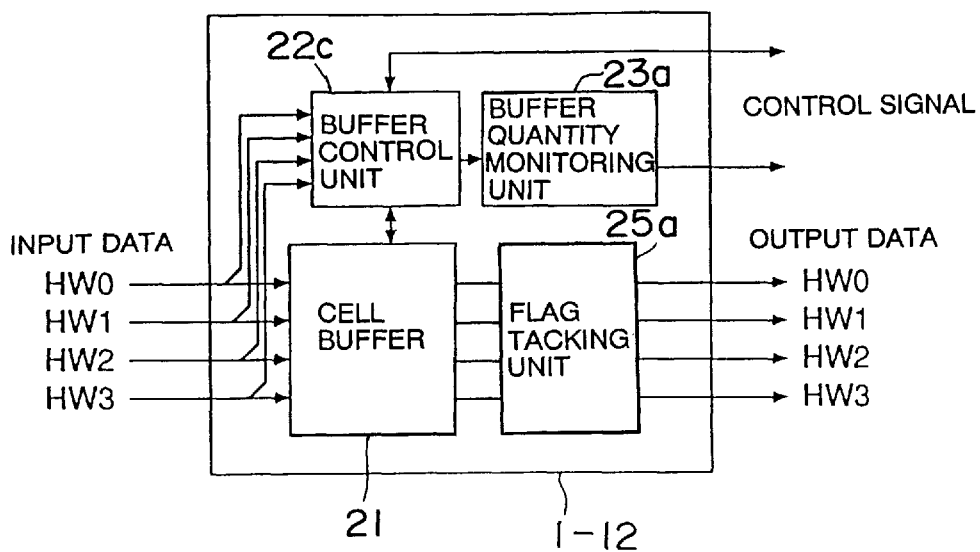
FIG. 21 is a constructive block diagram showing the SRM in the modified example 1 of the embodiment 4.

Next, a modified example 1 of the embodiment 4 of the present invention will be described with reference to FIGS. 19 through 23. FIG. 19 is a constructive diagram showing the path switching method before expanding the SRMs are expanded in the modified example 1 of the embodiment 4. FIG. 20 is a constructive diagram showing the path switching method after the SRMs were expanded in the modified example 1 of the embodiment 4. FIG. 21 is a constructive block diagram illustrating the SRM in the modified example 1 of the embodiment 4.

Referring to FIG. 21, each SRM includes the cell buffer 21, a buffer control unit 22c, the buffer quantity monitoring unit 23a and a flag tacking unit 25a connected to the cell buffer 21. The flag tacking unit 25a tacks a flag giving an indication of being the last cell to a cell header of the cell that has been read last.

Figure 22:
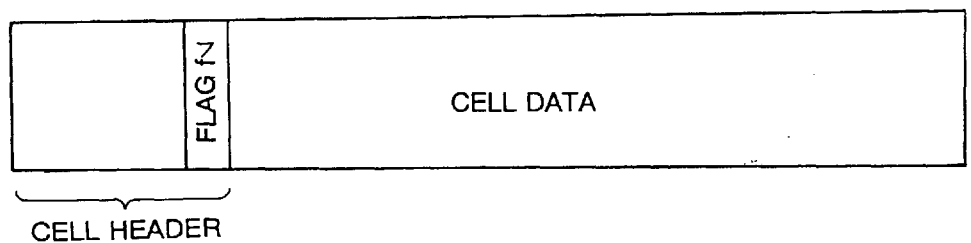
FIG. 22 is a diagram showing a cell format in the modified example 1 of the embodiment 4.

The cell is, as illustrated in FIG. 22, composed of cell data and the cell header. A flag f is tacked to the cell header. If the cell is conceived as a last readout cell, for instance, "1" is set in the flag f.

Further, buffer control unit 22c within the SRM determines whether the cell (last readout cell) including the flag f set with "1" reaches or not. If the flag f reaches, the PSM switches the path. Also, the buffer control unit 22c, after the path was switched, changes the flag f from "1" to "0".

Figure 23:
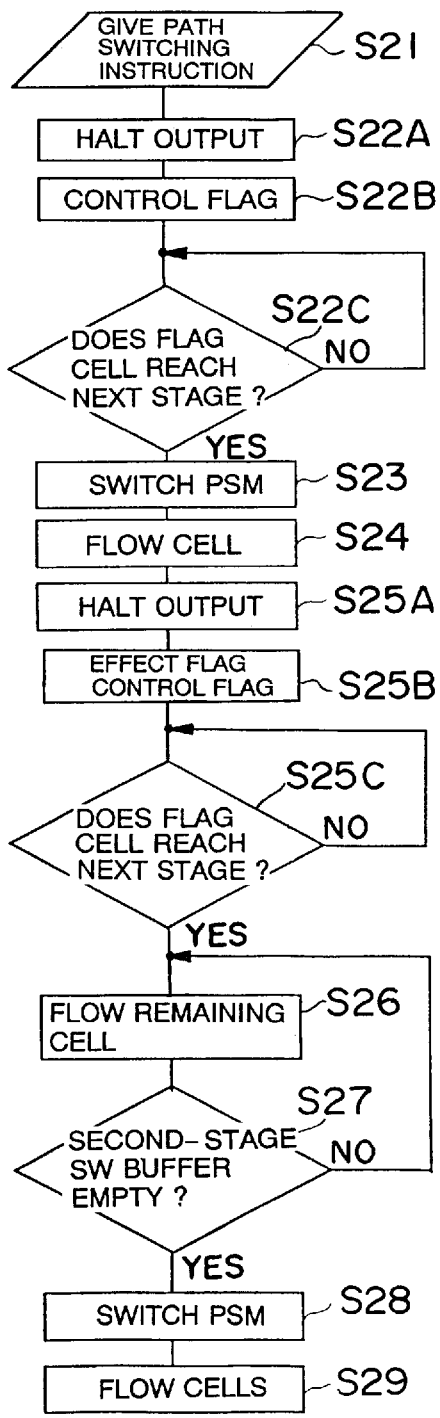
FIG. 23 is a flowchart showing operations in the modified example 1 of the embodiment 4.

FIG. 23 is a flowchart showing the path switching method in the modified example 1 of the embodiment 4. Given is an explanation of the path switching method in the modified example 1 of the embodiment 4 in conjunction with FIGS. 19 to 23.

First, the buffer control unit 22c outputs the path switching instruction to the buffer quantity monitoring unit 23a (step S21). Then, the buffer control unit 22c of the SRM 1-11 halts reading out the cells to the relevant output highway (step S22A, FIG. 19). Subsequently, the flag tacking unit 25a of the SRM 1-11 tacks the flag "1" indicating the last cell to the cell that has been read last (step S22B, FIG. 19).

Next, the buffer control unit 22c of the SRM 1-12 determines whether or not the cell (last readout cell) including the flag f set with "1" reaches (step S22C, FIG. 19).

Then, when the buffer control unit 22c confirms that the last readout cell tacked with the flag has reached, the PSM between the first-stage SRM and the second-stage SRM switches the path (step S23, FIG. 20). For example, the PSMs 3-31, 3-41 switch the paths to the SRM 1-32.

With this operation, the buffer control unit 22c is capable of confirming that no effective cell exists in the path between the first-stage SRM and the second-stage SRM. Therefore, the PSM is capable of switching the path without any disposal of the cells.

Next, after the paths have been switched, the buffer control unit 22c changes the flag f from "1" to "0".

The buffer control unit 22c of the SRM 1-11 flows the cells to the SRM 1-32 via the PSMs 3-31, 3-41 (step S24). Then, the buffer control unit 22c of the SRM 1-32 makes the cell buffer 21 stop the cells (step S25A, FIG. 20).

Next, the flag tacking unit 25a of the SRM 1-32 tacks the flag "1" indicating the last cell to the cell that has been read last (step S25B, FIG. 20).

Subsequently, the buffer control unit 22c of the SRM 1-13 determines whether or not the cell (last readout cell) including the flag f set with "1" reaches (step S25C, FIG. 20).

Then, when the buffer control unit 22c of the SRM 1-13 confirms that the last readout cell tacked with the flag has reached, the buffer control unit 22c of the SRM1-12 flows the remained cell (step S26). Next, the buffer quantity monitoring unit 23a of the SRM1-12 determines whether or not the cell buffer is empty (step S27). When the cell buffer 21 is empty, the PSM3-32 swithches the paths to the SRM1-32 (step S28). The buffer control unit 22c flows the cells stored in the SRM 1-32 to the PSM 3-32 (step 29).

Owing to this operation, the buffer configuration does not change before and after the SRMs are expanded. Further, the SRM can be expanded online without disposing of the cells.

<MODIFIED EXAMPLE 2 OF EMBODIMENT 4>

Figure 24:
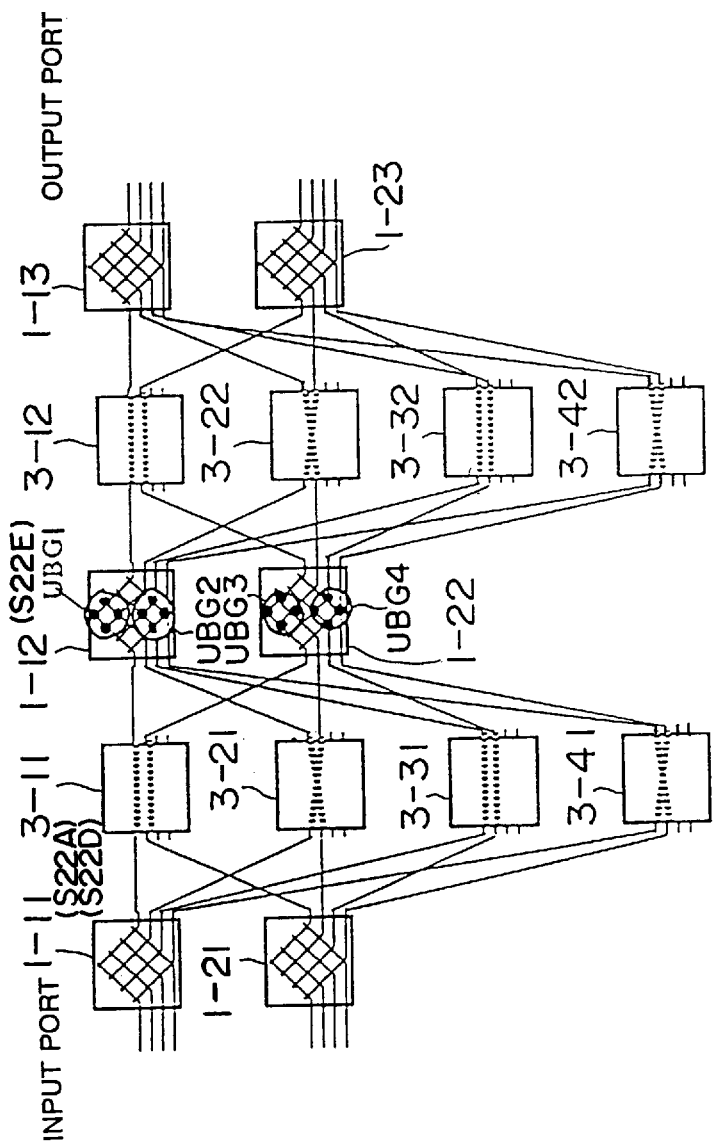
FIG. 24 is a constructive diagram showing the path switching method before the SRM is expanded in a modified example 2 of the embodiment 4.
Figure 25:
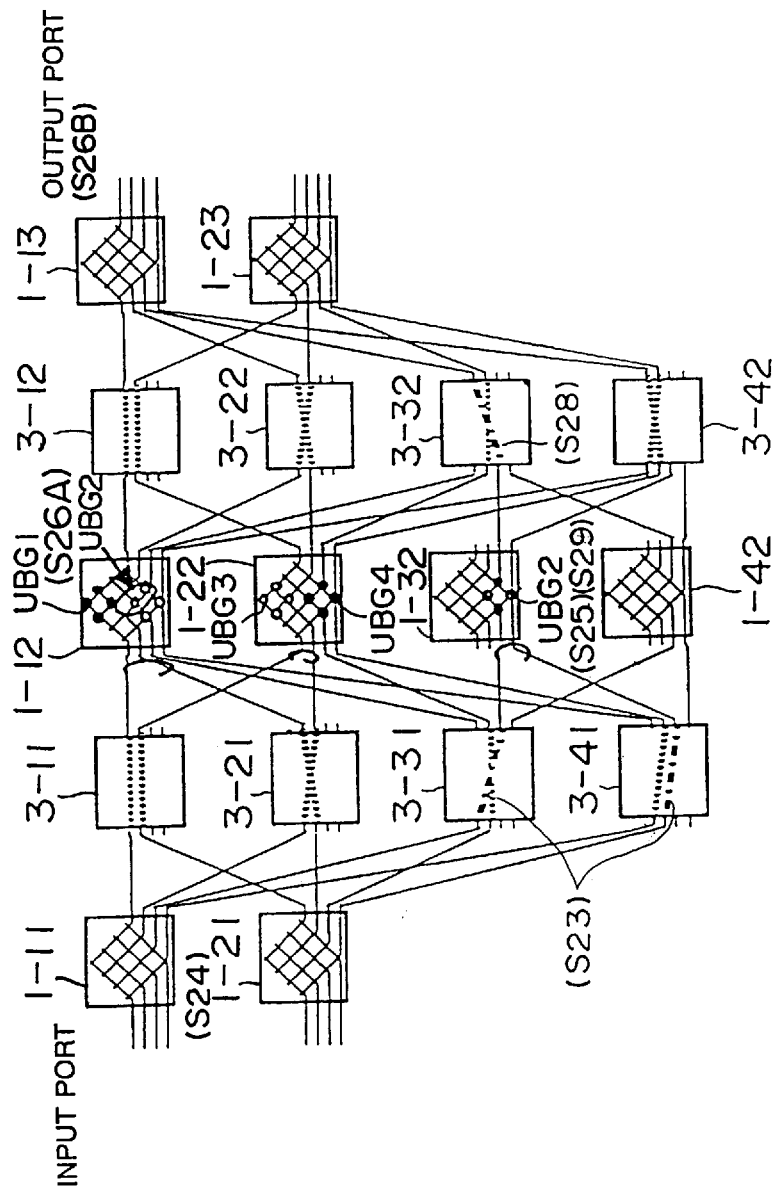
FIG. 25 is a constructive diagram showing the path switching method after the SRM was expanded in a modified example 2 of the embodiment 4.

Next, a modified example 2 of the embodiment 4 of the present invention will be described with reference to FIGS. 24 through 28. According to the modified example 1, the flag is tacked to the last cell. FIG. 24 is a constructive diagram showing the path switching method before the SRMs are expanded in the modified example 2 of the embodiment 4. FIG. 25 is a constructive diagram showing the path switching method after the SRMs are expanded in the modified example 2 of the embodiment 4.

Figure 26:
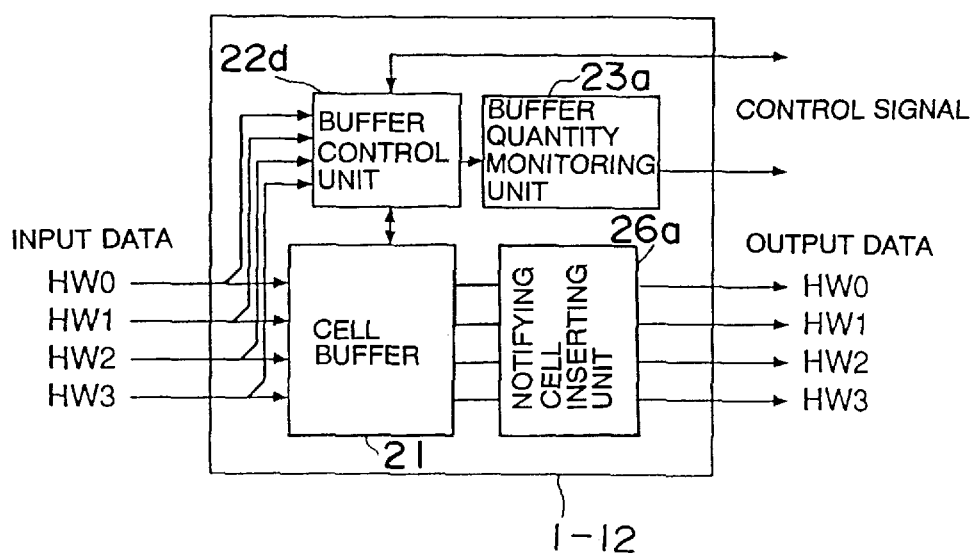
FIG. 26 is a constructive diagram illustrating the SRM in the modified example 2 of the embodiment 4.

FIG. 26 is a constructive block diagram illustrating the SRM in the modified example 2 of the embodiment 4. Referring to FIG. 26, each SRM includes the cell buffer 21, a buffer control unit 22d, the buffer quantity monitoring unit 23a and a notifying cell insertion unit 26a connected to the cell buffer 21. The notifying cell insertion unit 26a inserts a notifying cell for giving a notice of switching the path into an area posterior to the last readout cell.

Figure 27:
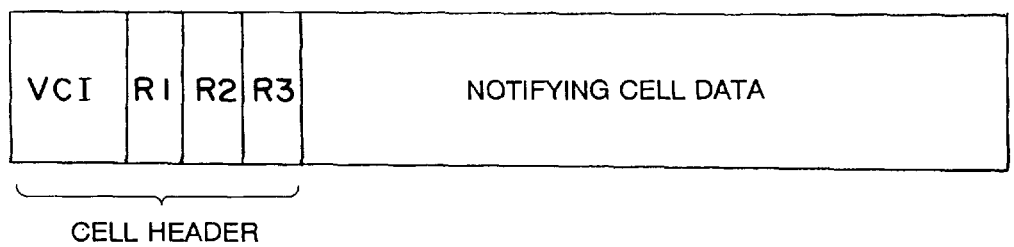
FIG. 27 is a diagram showing a notifying cell format in the modified example 2 of the embodiment 4.

The notifying cell is, as illustrated in FIG. 27, composed of notifying cell data and the cell header. The cell header includes a virtual channel identifier (VCI) and pieces of route data R1–R3. The route data R1 indicates an output port number of the first-stage SRM. The route data R2 represents an output port number of the intermediate-stage SRM. The route data R3 shows an output port number of the rear-stage SRM.

Further, the respective output ports of the first-, intermediate- and rear-stages are set to the same number. A notifying cell switching route between the first- and second-stages is the same as a notifying cell switching route between second- and third stages. The switching notifying cell thereby reaches the same third-stage input highway.

Further, the buffer control unit 22d in the SRM determines whether or not the notifying cell reaches. When the notifying cell has reached, the PSM switches the path. The buffer control unit 22d does not dispose of the notifying cell even after the path is switched.

Figure 28:
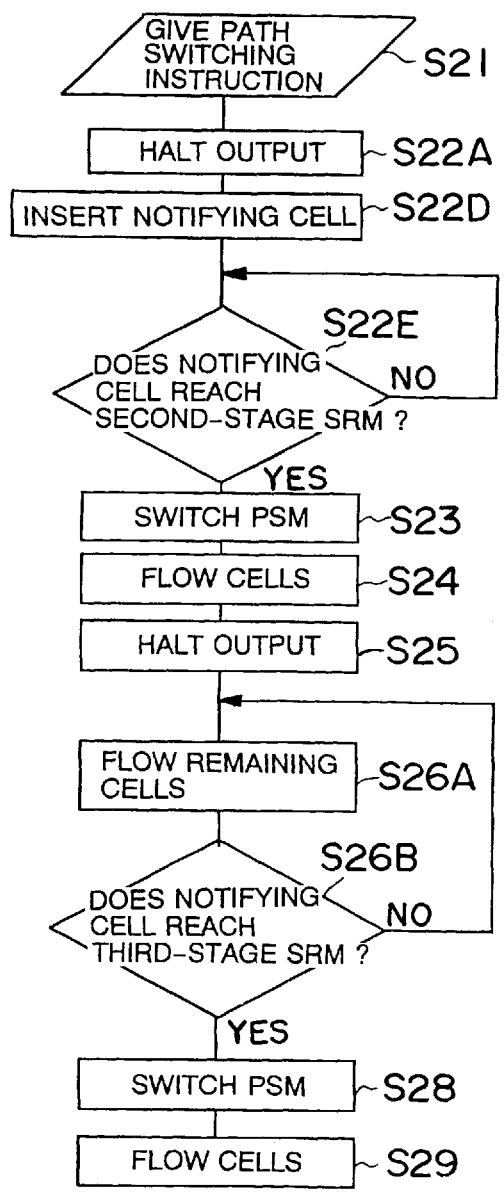
FIG. 28 is a flowchart showing the operations in the modified example of the embodiment 4.

FIG. 28 is a flowchart showing the path switching method in the modified example 2 of the embodiment 4. The path switching method in the modified example 2 of the embodiment 4 will be explained.

To start with, the buffer control unit 22d outputs the path switching instruction to the buffer quantity monitoring unit 23a (step S21). The buffer control unit 22d of the SRM 1-11 halts reading out the cells to the relevant output highway (step S22A, FIG. 24).

The notifying cell insertion unit 26a of the SRM 1-11 inserts the notifying cell into an area posterior to the last readout cell (step S22D, FIG. 20D). At this time, all the route data R1, R2, R3 of the notifying cell are set to, e.g., an output port number P3.

Next, the buffer control unit 22d of the SRM 1-12 determines whether the notifying cell from the output port P3 of the SRM 1-11 reaches or not (step S22E, FIG. 24).

When the buffer control unit 22d of the SRM 1-12 confirms that the notifying cell has reached, the PSM between the first-stage SRM and the second-stage SRM switches the path (step S23, FIG. 25). For instance, the PSMS 3-31, 3-41 switch the paths to the SRM 1-32.

With this confirmation of the notifying cell, the buffer control unit 22d is capable of confirming that no effective cell exists in the path between the first-stage SRM and the second-stage SRM. Therefore, the PSM is capable of switching the path without disposing of the cells.

Further, the buffer control unit 22d of the SRM 1-12 does not dispose of the notifying cell even after the paths have been switched.

The buffer control unit 22d of the SRM 1-11 flows the cells to the SRM 1-32 via the PSMs 3-31, 3-41 (step S24). The buffer control unit 22d of the SRM 1-32 makes the cell buffer 21 stop of the cells (step S25).

The buffer control unit 22d of the SRM 1-12 flows the remaining cells (step S26A).

Next, the buffer control unit 22d of the SRM 1-13 determines whether the notifying cell from the output port P3 of the SRM 1-12 reaches or not (step S26B). When the buffer control unit 22d confirms that the notifying cell has reached, the PSM 3-32 switches the path to the SRM 1-32 (step S28).

Further, the buffer control unit 22d flows the cells stored in the SRM 1-32 to the PSM 3-32 (step S29).

Thus, the switching route of the switching notifying cell between the first- and second-stages is set the same as the switching route of the switching notifying cell between the second- and third-stages. Accordingly, the switching notifying cell reaches the same third-stage input highway.

That is, it is possible to confirm that all the cells finally accumulated in the second-stage SRM have reached the third-stage SRM.

Note that the present invention is not limited to the modified examples 1 and 2. For example, the last cell does not reach the next-stage SRM due to some trouble as the case may be. In such an instance, free cells are employed. If a predetermined number of free cells continuously reach after the path switching instruction issued, it is feasible to confirm that no effective cell remains in the path between the first- and second-stages. Further, the modified examples 1 and 2 may be combined.

<EMBODIMENT 5>

Figure 29:
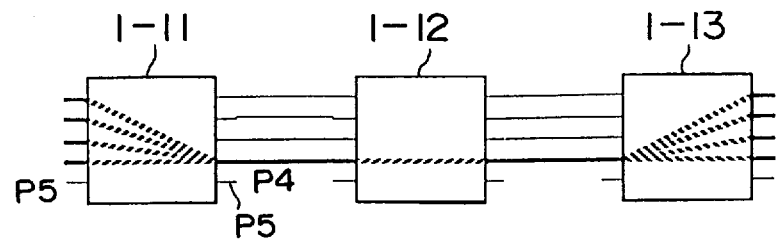
FIG. 29 is a constructive diagram illustrating the ATM switch before the SRM is expanded in an embodiment 5.
Figure 30:
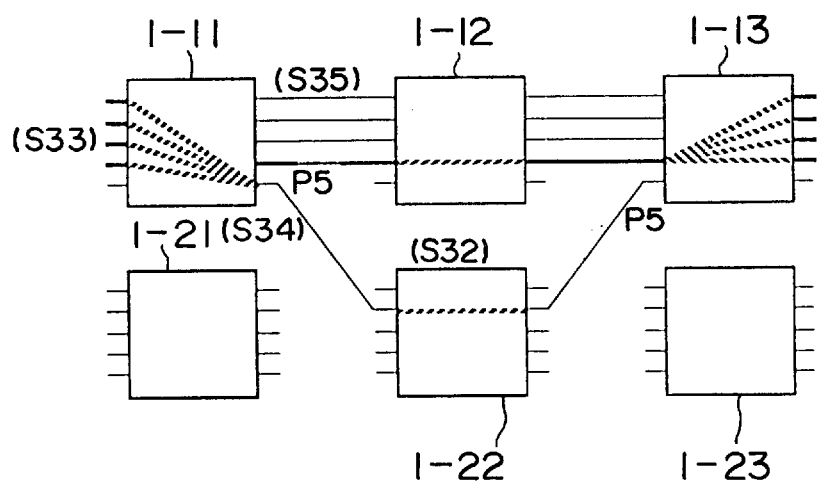
FIG. 30 is a constructive diagram illustrating the ATM switch in a first step after the SRM was expanded in the embodiment 5.
Figure 31:
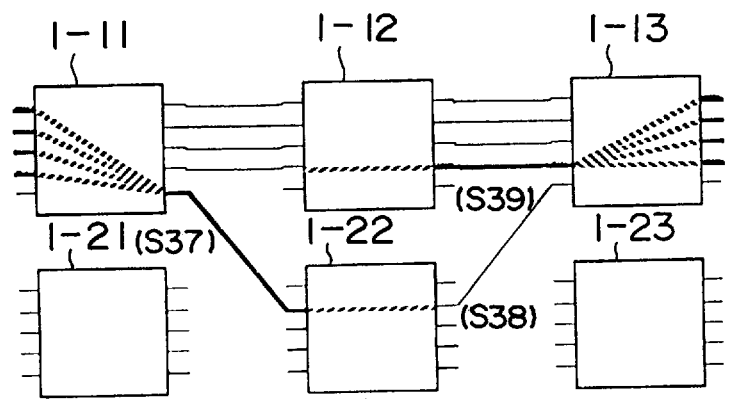
FIG. 31 is a constructive diagram illustrating the ATM switch in a second step after the SRM was expanded in the embodiment 5.
Figure 32:
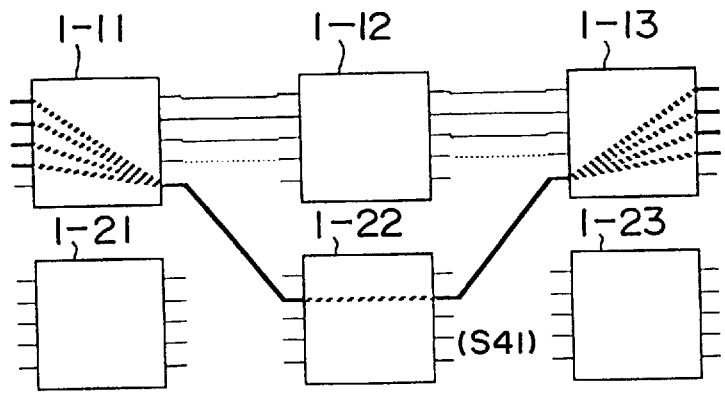
FIG. 32 is a constructive diagram illustrating the ATM switch in a third step after the SRM was expanded in the embodiment 5.
Figure 33:
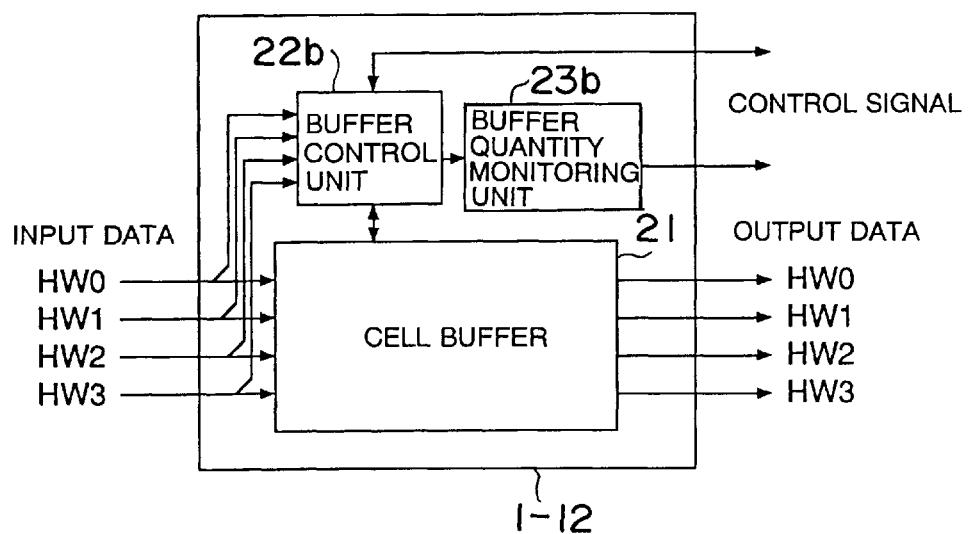
FIG. 33 is a constructive block diagram showing the SRM in the embodiment 5.
Figure 34:
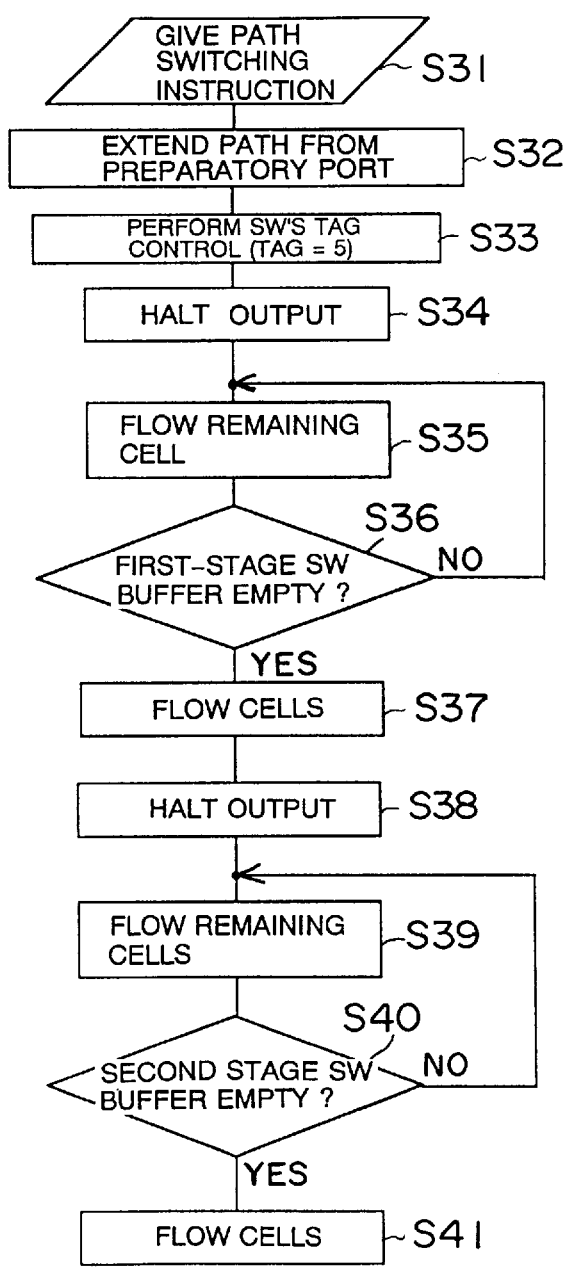
FIG. 34 is a flowchart showing operations in the embodiment 5.

Next, an embodiment 5 of the present invention will be described. FIG. 29 is a diagram illustrating a construction of the ATM switch before the SRMs are expanded in the embodiment 5. FIGS. 30 to 32 are diagrams each showing a construction of the ATM switch after the SRMs are expanded in the embodiment 5. FIG. 33 is a block diagram showing a configuration of the SRM in the embodiment 5. FIG. 34 is a flowchart showing operations in the embodiment 5. According to the embodiment 5, the SRMs are expanded from one stage to two stages.

In accordance with the embodiment 5, as illustrated in FIG. 29, (5×5) SRMs 1-11 to 1-13 are employed. The switch is based on a (4 ports×4 ports) structure. One remaining preparatory port P5 is used for switching the path.

Referring to FIG. 33, each SRM includes the cell buffer 21, a buffer control unit 22b and a buffer quantity monitoring unit 23b. The cell buffer 21 includes a plurality of I/O ports to which different items of tag data are allocated and a path switching port P5 and stores the cells inputted from the input ports.

The buffer control unit 22b controls writing and reading the cell and switches an old path to a new path by previously extending a new path to an expanded SRM from the path switching port P5 and by changing over the allocated tag data. The allocated tag data is changed over by changing the setting of the switch. Alternatively, the allocated tag data may be changed over by changing an item of cell path data.

The buffer quantity monitoring unit 23b determines whether or not the respective cell buffers are emptied by sending all the cells remaining in the cell buffer of the SRM to the old path. The buffer control unit 22b, when the cell buffer to the old path is emptied, transmits the cells stored in the cell buffer of the expanded SRM to the new path.

A path switching method in the embodiment 5 will be discussed with reference to FIG. 34. At the first onset, the buffer control 22b outputs the path switching instruction to the buffer quantity monitoring unit 23b (step S31).

In this case, as depicted in FIG. 29, one path is extended from each SRM to the path switching group. Therefore, if each SRM has one path switching port P5, the buffer control unit 22b previously extends a path after switching one path switching group to the expanded intermediate-stage SRM 1-22 from the path switching port P5 (step S32, FIG. 30).

Then, the buffer control unit 22b changes the old path to the new path by re-tacking the input cell tag data, i.e., TAG (herein, TAG is 5), thus the route is switched (step S33, FIG. 30).

Herein, the output port P4 of the SRM 1-11 is switched over to the output port P5 shown in FIG. 30. At this time, the cells in the before-switching paths at the first- and intermediate-stages remains. Hence, when the cells passing through the new path are sended before all the cells from the output port P4 are transmitted, the cell order is to be reversed.

The buffer control unit 22b halts the transmission of the cells of the new path till all the cells of the first- and intermediate-stage old paths are transmitted in order to prevent the cell reversion (step S34, FIG. 30). At this time, buffers causing the cells of the new path to wait are the cell buffer 21 of the first-stage SRM 1-11 and the cell buffer 21 of the intermediate-stage SRM 1-12. The two cell buffers are utilized for restraining the cell disposal.

Next, the buffer control unit 22b halts the cell outputs of the first- and intermediate-stage SRMs. The buffer control unit 22b flows the remaining cells of the port P4 of the SRM 1-11 (step S35, FIG. 30).

Next, the buffer quantity monitoring unit 23b determines whether or not the cell buffer 21 of the first-stage SRM 1-11 is empty (step S36). If the cell buffer 21 is empty, the cells are flowed to the SRM 1-22 (step S37, FIG. 31). The buffer control unit 22b halts the cell output of th e SRM 1-22 (step S38, FIG. 31) and flows the remaining cells of the SRM 1-12 (step S39, FIG. 31).

Next, the buffer quantity monitoring unit 23b determines whether or not the cell buffer 21 of the intermediate-stage SRM 1-12 is empty (step S40). If the interior of this cell buffer 21 is emptied, the cells of the intermediate-stage SRM 1-22 are flowed (step S41, FIG. 32).

That is, after all the cells of the first-stage SRM 1-11a to the old path were sended, the first-stage cells of the new path are transmitted. Then, after all the cells of the intermediate-stage SRM 1-12 to the old path have been sent, the cells of the intermediate-stage SRM 1-22 to the new path are sent.

With this operation, the path can be switched without reversing the cell order as well as without disposing of the cells. Switching the path thus goes on according to every PSM. Further, if a plurality of preparatory ports exist, the path can be switched according to each of the same number of path switching groups as the number of the preparatory ports.

<MODIFIED EXAMPLE 1 OF EMBODIMENT 5>

Figure 39:
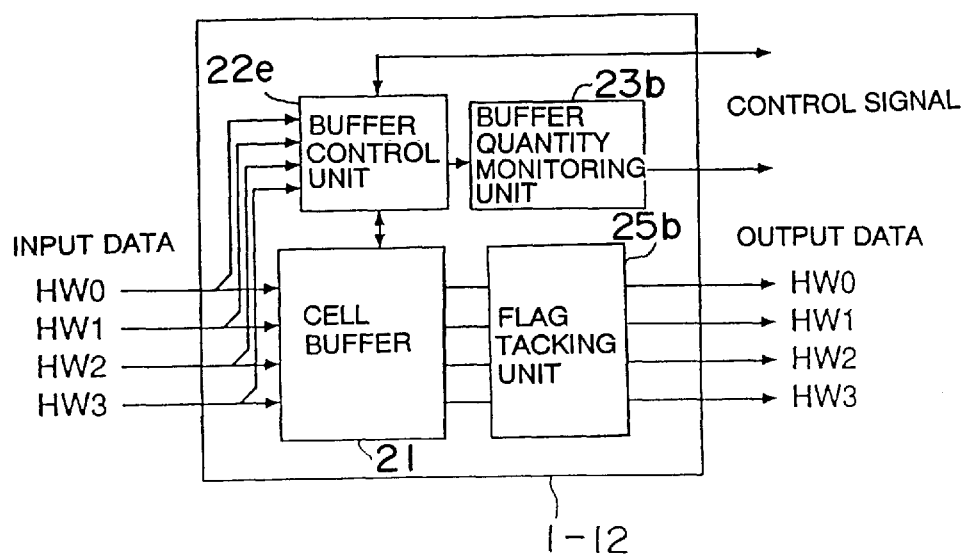
FIG. 39 is a constructive block diagram showing the SRM in the modified example 1 of the embodiment 5.
Figure 40:
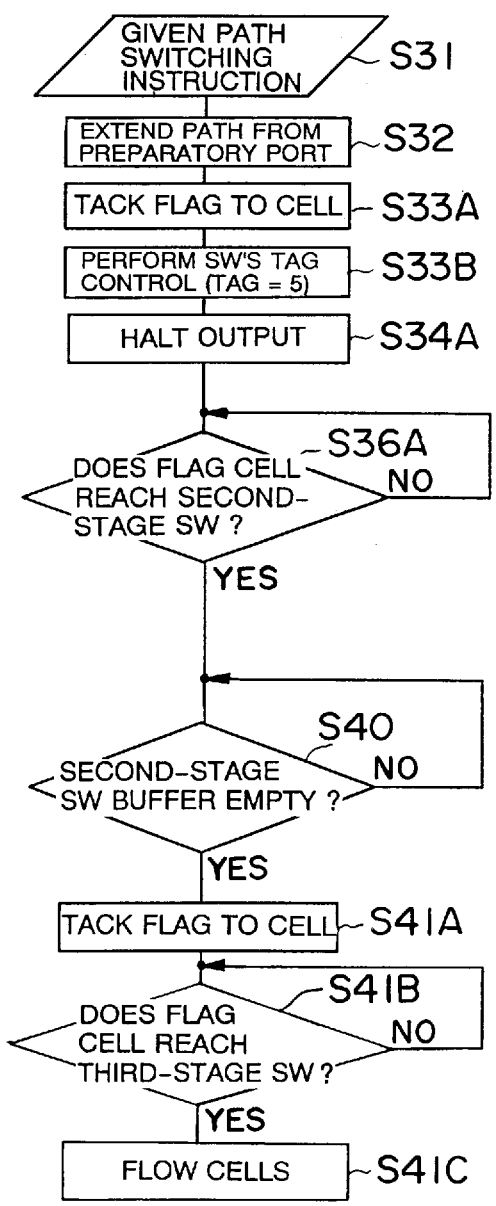
FIG. 40 is a flowchart showing operations in the modified example 1 of the embodiment 5.

Next, a modified example 1 of the embodiment 5 of the present invention will be described with reference to FIGS. 35 through 40. Referring to FIG. 39, each SRM includes the cell buffer 21, a buffer control unit 22e, a buffer quantity monitoring unit 23b and a flag tacking unit 25b. The flag tacking unit 25b tacks a flag giving an indication of being the last cell to a cell header of the cell that has been read last.

Further, the intra-SRM buffer control unit 22e determines whether the cell (last readout cell) including the flag f set with "1" reaches or not. If the flag f reaches, the PSM switches the path. The buffer control unit 22e, after the path was switched, changes the flag f from "1" to "0".

Given is an explanation of the path switching method in the modified example 1 of the embodiment 5 with reference to the drawings. First, the buffer control unit 22e outputs the path switching instruction to the buffer quantity monitoring unit 23b (step S31).

Figure 35:
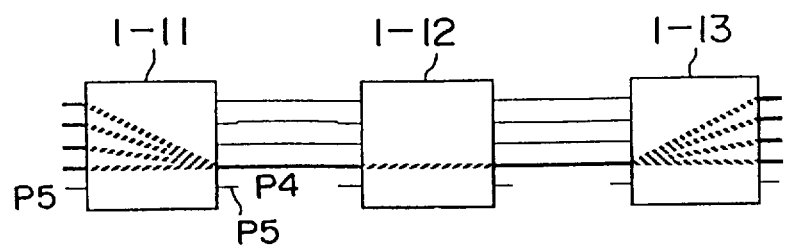
FIG. 35 is a constructive diagram illustrating the ATM switch before the SRM is expanded in a modified example 1 of the embodiment 5.
Figure 36:
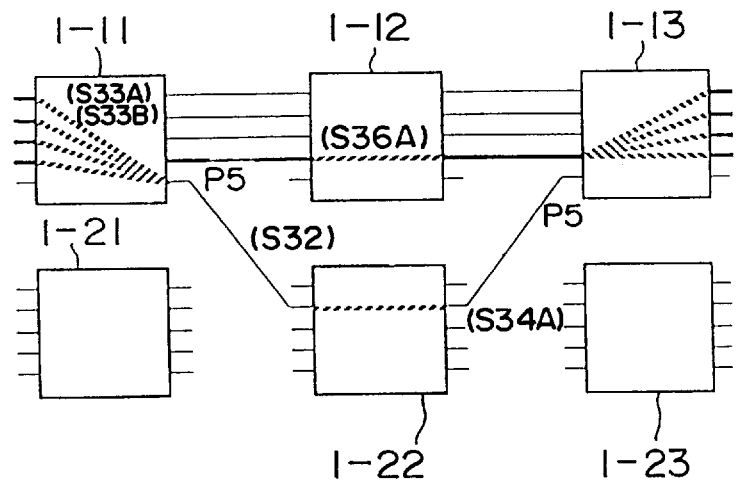
FIG. 36 is a constructive diagram illustrating the ATM switch in a first step after the SRM was expanded in a modified example 1 of the embodiment 5.
Figure 37:
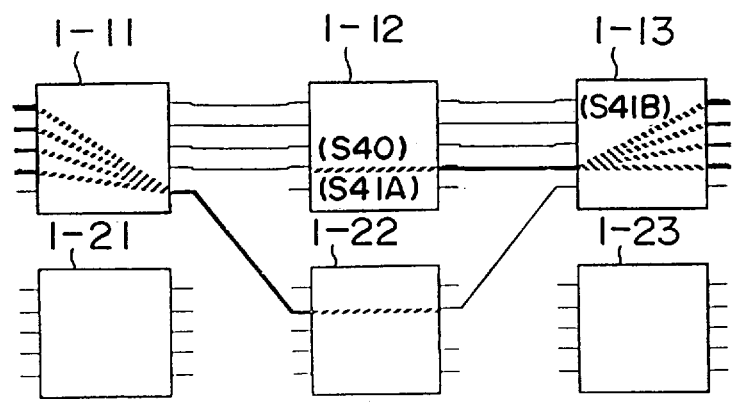
FIG. 37 is a constructive diagram illustrating the ATM switch in a second step after expanding the SRM in a modified example 2 of the embodiment 5.
Figure 38:
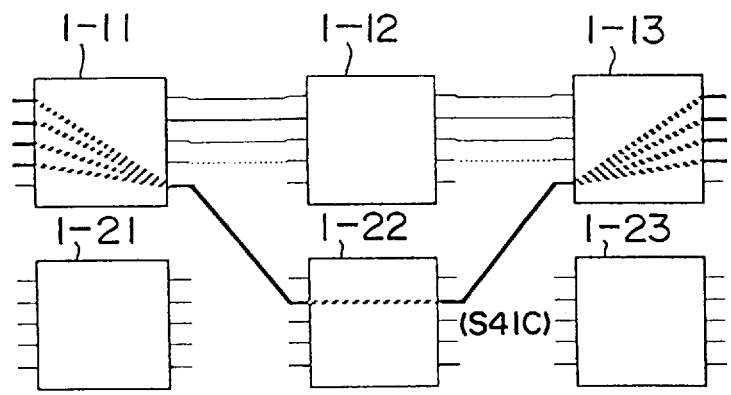
FIG. 38 is a constructive diagram illustrating the ATM switch in a third step after the SRM was expanded in a modified example 3 of the embodiment 5.

The buffer control unit 22e extends beforehand the after-switching path to the SRM 1-22 from the path switching port P5 (step S32, FIG. 36). The flag tacking unit 25b tacks a flag for identifying the last cell to the last readout cell (step S33A). The first-stage buffer control unit 22e converts the TAG so that the cell outputted to the relevant output highway is to be outputted the extension port P5 (step S33B). The output port P4 of the SRM 1-11 shown in FIG. 35 is changed over to the output port P5 illustrated in FIG. 36.

The readout cells pass through the newly extended path and are then accumulated in the cell buffer 21 of the expanded SRM 1-22.

Note that the buffer control unit 22e of the SRM 1-22 halts the cell reading from the cell buffer 21 in order to prevent the cell reversing phenomenon (step S34A).

On the other hand, the last readout cell tacked with the flag is, as usual, outputted to the second-stage SRM 1-12. The buffer control unit 22e of the SRM 1-12 determines whether the cell including the flag f set with "1" reaches or not (step S36A).

Then, the buffer control unit 22e is capable of confirming that no effective cell exists in the path between the first-stage SRM and the second-stage SRM from the fact that the last readout cell tacked with the flag reaches. The buffer control unit 22e of the SRM 1-12 changes the flag f from "1" to "0".

Next, the buffer quantity monitoring unit 23b of the SRM 1-12 determines whether or not the cell buffer 21 is empty (step S40). If the cell buffer 21 is empty, the flag tacking unit 25b of the SRM 1-12 tacks the flag "1" indicating the last cell to the last readout cell (step S41A)

Next, the buffer control unit 22e of the SRM 1-13 determines whether or not the cell including the flag f set with "1" reaches (step S41B).

Then, when the buffer control unit 22e of the SRM 1-13, confirms that the last readout cell tacked with the flag has reached, the buffer control unit 22e of the SRM1-22 flows the cells (step S41C).

That is, after all the cells of the first-stage SRM 1-11 to the old path were transmitted, the first-stage cells of the new path are sent. After all the cells of the intermediate-stage SRM 1-12 to the old path have been transmitted, the cells of the intermediate-stage SRM 1-22 to the new path are transmitted. Further, the flag is tacked to the last readout cell, thereby it is possible to confirm that no effective cell exists between the SRMs.

With this operation, it is feasible to switch the path without disposing of the cell as well as without reversing the cell order.

<MODIFIED EXAMPLE 2 OF EMBODIMENT 5>

Figure 45:
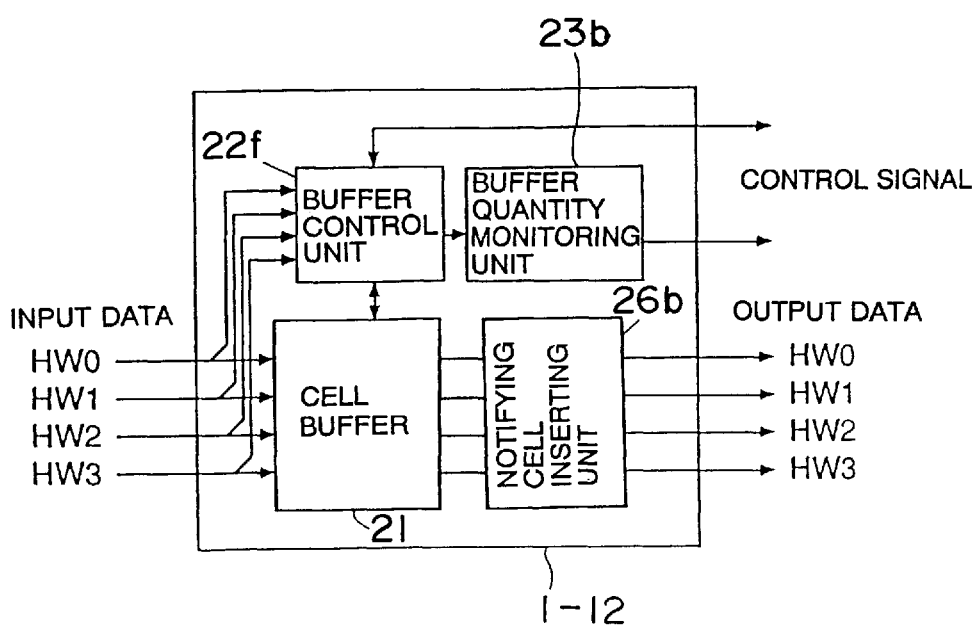
FIG. 45 is a constructive block diagram showing the SRM in the modified example 2 of the embodiment 5.

Next, a modified example 2 of the embodiment 5 of the present invention will be described with reference to FIGS. 41 through 46. Referring to FIG. 45, each SRM includes the cell buffer 21, a buffer control unit 22f, the buffer quantity monitoring unit 23b and a notifying cell insertion unit 26b. The notifying cell insertion unit 26b inserts a notifying cell for giving a notice of switching the path into an area posterior to the last readout cell.

The notifying cell is formatted as shown in FIG. 27. The buffer control unit 22f determines whether the notifying cell reaches or not. The buffer control unit 22e does not dispose of the notifying cell even after the path was switched.

Figure 46:
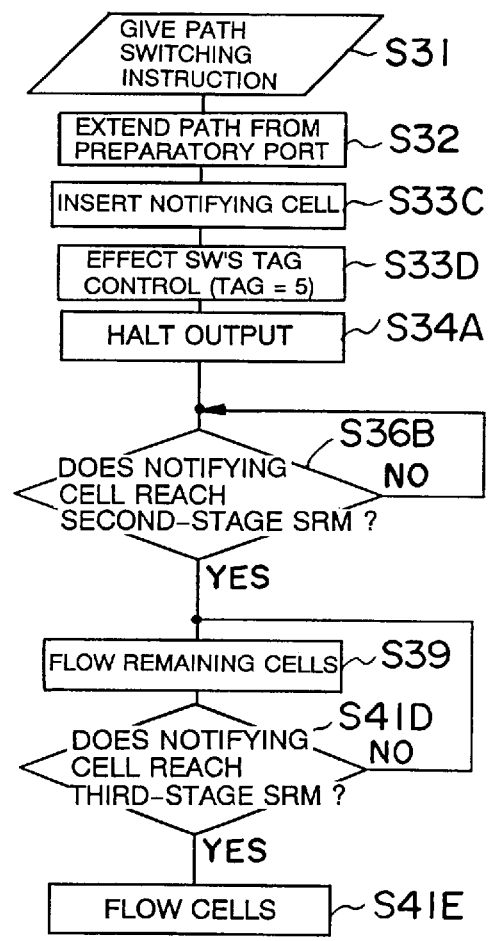
FIG. 46 is a flowchart showing operations in the modified example 2 of the embodiment 5.

FIG. 46 is a flowchart showing the path switching method in the modified example 2 of the embodiment 5.

To start with, the buffer control unit 22f outputs the path switching instruction to the buffer quantity monitoring unit 23b (step S31). The buffer control unit 22f previously extends a path to the SRM 1-22 from the path switching port P5 (step S32).

Figure 41:
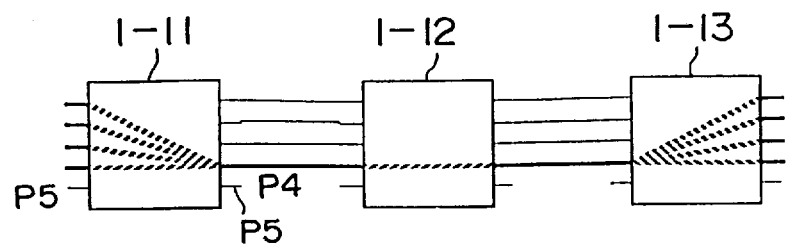
FIG. 41 is a constructive diagram illustrating the ATM switch before the SRM is expanded in the modified example 2 of the embodiment 5.
Figure 42:
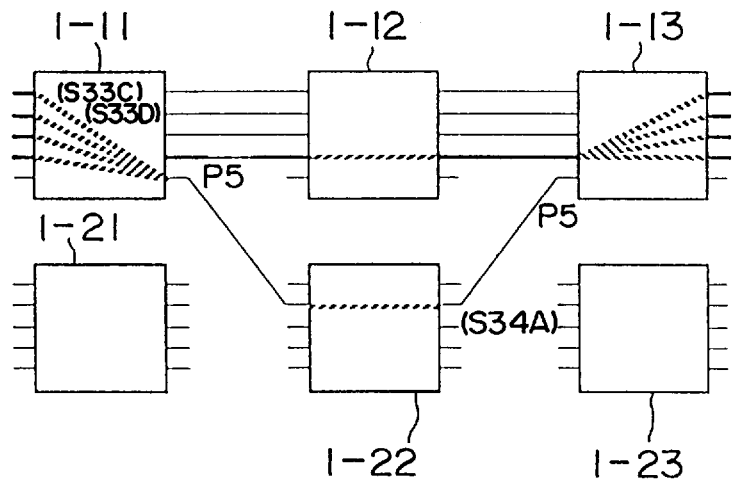
FIG. 42 is a constructive diagram illustrating the ATM switch in the first step after the SRM was expanded in the modified example 2 of the embodiment 5.
Figure 43:
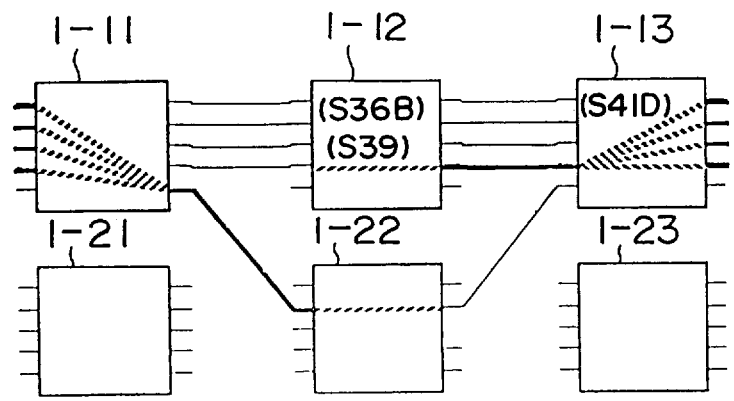
FIG. 43 is a constructive diagram illustrating the ATM switch in the second step after the SRM was expanded in the modified example 2 of the embodiment 5.
Figure 44:
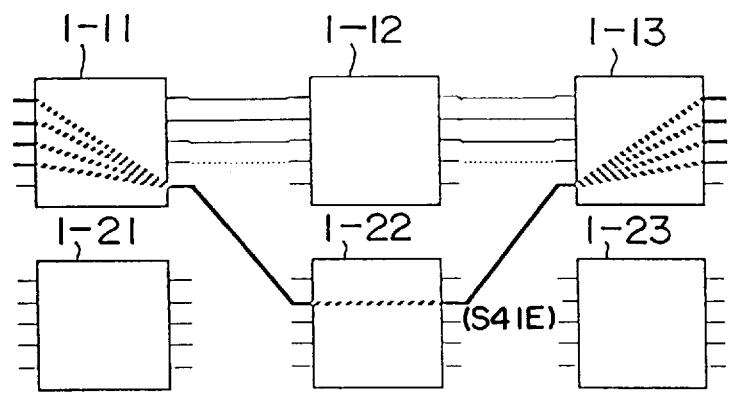
FIG. 44 is a constructive diagram illustrating the ATM switch in the third step after expanding the SRM in the modified example 2 of the embodiment 5.

The notifying cell insertion unit 26b of the SRM 1-11 inserts the notifying cell into the area after the last readout cell (step S33C). The first-stage buffer control unit 22f converts the TAG so that the cells outputted to the relevant output highway are outputted to the extension port P5 (step S33D). The output port P4 of the SRM 1-11 shown in FIG. 41 is changed over to the output port P5 illustrated in FIG. 42.

The readout cells pass through the newly extended path and are then accumulated in the cell buffer 21 of the expanded SRM 1-22.

Note that the buffer control unit 22f of the SRM 1-22 halts the cell reading from the cell buffer 21 in order to prevent the cell reversing phenomenon (step S34A).

Next, the buffer control unit 22f of the SRM 1-12 determines whether the notifying cell from the output port P3 of the SRM 1-11 reaches or not (step S36B).

Then, the buffer control unit 22f of the SRM 1-12 confirms that the notifying cell has reached. With this confirmation of the notifying cell, the buffer control unit 22f is capable of confirming that no effective cell exists in the path between the first-stage SRM and the second-stage SRM. Therefore, the PSM is capable of switching the path without disposing of the cells.

Further, the buffer control unit 22f of the SRM 1-12 does not dispose of the notifying cell even after the paths have been switched. The buffer control unit 22f of the SRM 1-11 flows the remaining cells (step S39).

Next, the buffer control unit 22f of the SRM 1-13 determines whether the notifying cell from the SRM 1-12 reaches or not (step S41D).

The SRM 1-22, when confirming that the notifying cell has reached, flows the cells to the SRM 1-13 (step S41E).

Thus, it is possible to confirm that no effective cell exists between the SRMs by confirming the notifying cell. The paths can be therefore switched without disposing of the cells. Further, the switching route between the first- and second-stages is set the same as the switching route between the second- and third-stages. Accordingly, the switching notifying cell reaches the same third-stage input highway.

That is, it is possible to confirm that all the cells finally accumulated in the second-stage SRM have reached the third-stage SRM.

Note that the present invention is not confined to the modified examples 1 and 2 described above. For example, the last cell does not reach the next-stage SRM due to some trouble as the case may be. In such an instance, the free cells are employed. If a predetermined number of free cells continuously reach after the path switching instruction issued, it is feasible to confirm that no effective cell remains in the path between the first- and second-stages. Further, the modified examples 1 and 2 may be combined.

Figure 47:
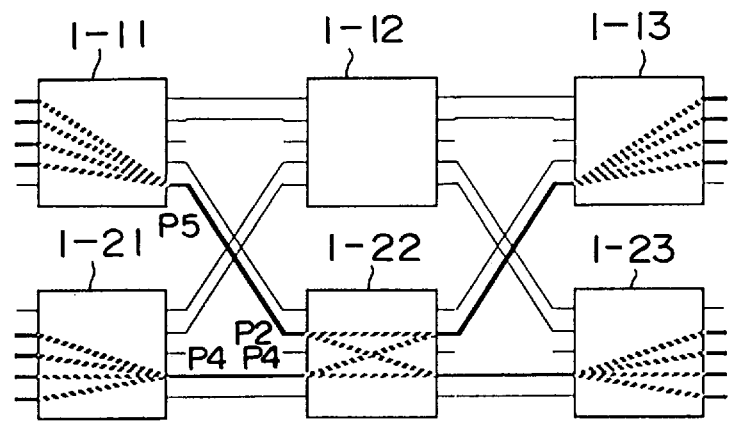
FIG. 47 is a constructive diagram illustrating the ATM switch before the SRM is expanded in an embodiment 6.
Figure 48:
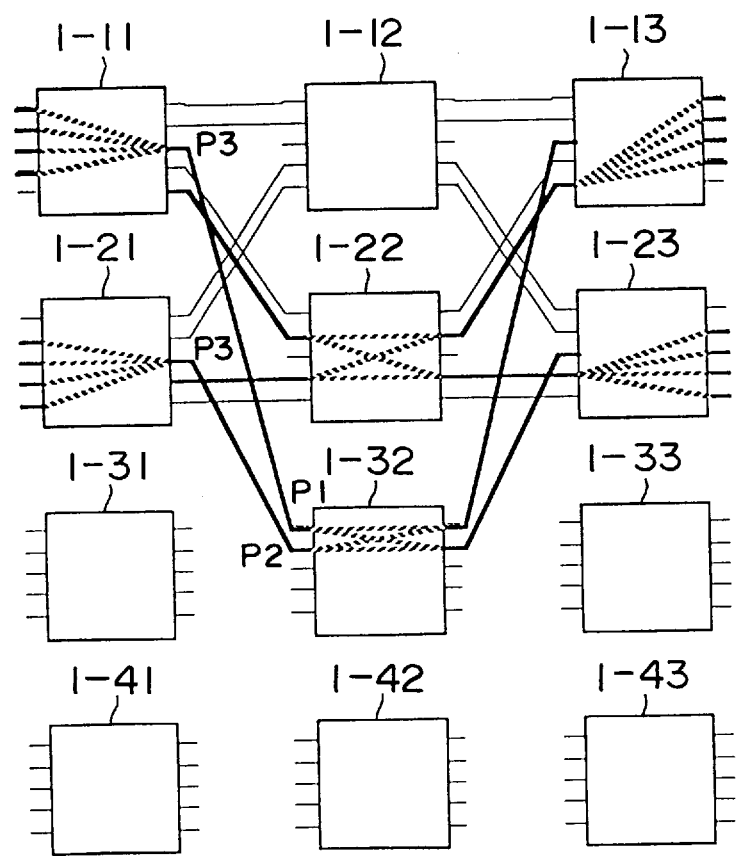
FIG. 48 is a constructive diagram illustrating the ATM switch in the first step after the SRM was expanded in the embodiment 6.
Figure 49:
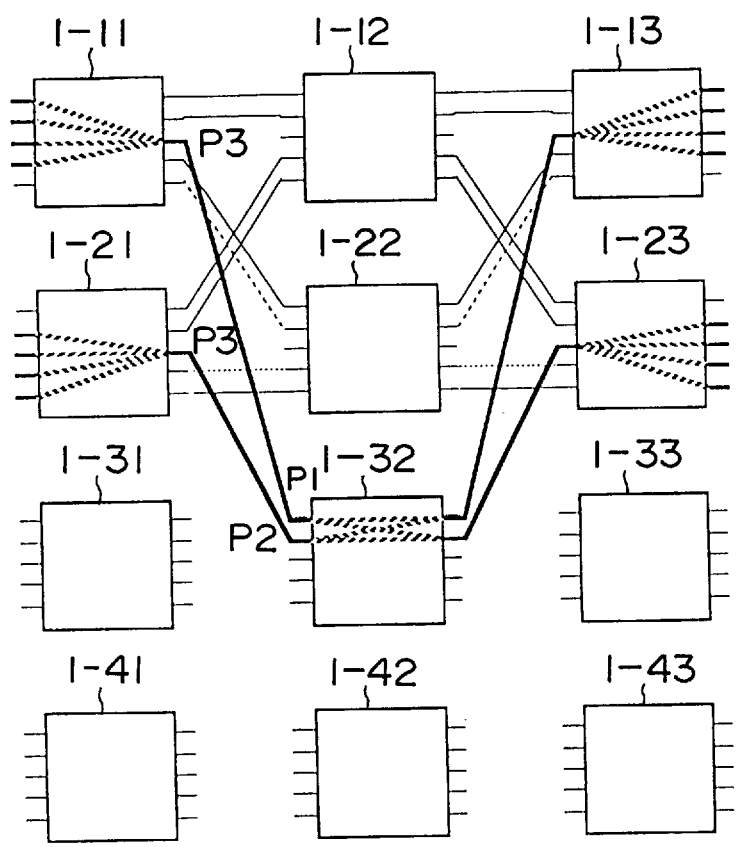
FIG. 49 is a constructive diagram illustrating the ATM switch in the second step after the SRM was expanded in the embodiment 6.

Next, FIGS. 47 through 49 illustrate examples where the SRMs are expanded from two stages to four stages. FIG. 47 shows a construction of a two-stage ATM switch before expanding the SRMs. The port P5 of the SRM 1-11 is connected to the port P2 of the SRM 1-22. The port P4 of the SRM 1-21 is connected to the port P4 of the SRM 1-22.

Referring next to FIG. 48, the port P3 of the SRM 1-11 is connected to the port P1 of the SRM 1-32. The port P3 of the SRM 1-21 is connected to the port P2 of the SRM 1-32.

Referring further to FIG. 49, the path to the SRM 1-22 becomes non-existent, and the cells are transmitted through the path of the SRM 1-32. In this way, the paths can be switched without disposing of the cells as well as without reversing the cell order.

An other method different from the above-mentioned method exists. According to this method, only the output of the intermediate-stage SRM to the new path is stopped, and the intra-buffer cells of the first- and intermediate-stage SRMs to the old paths are transmitted. This method is based on simple control. The first-stage buffer can not be, however, used for queuing. In any case, if the SRMs are expanded when the using quantity is small, making the cells wait in the cell buffer does not cause any problem.

The method of providing the path switching port is not required of a PSM switching speed because of extending the path beforehand. Accordingly, this method is applicable to a case here no PSM is provided.

<EMBODIMENT 6>

Figure 50:
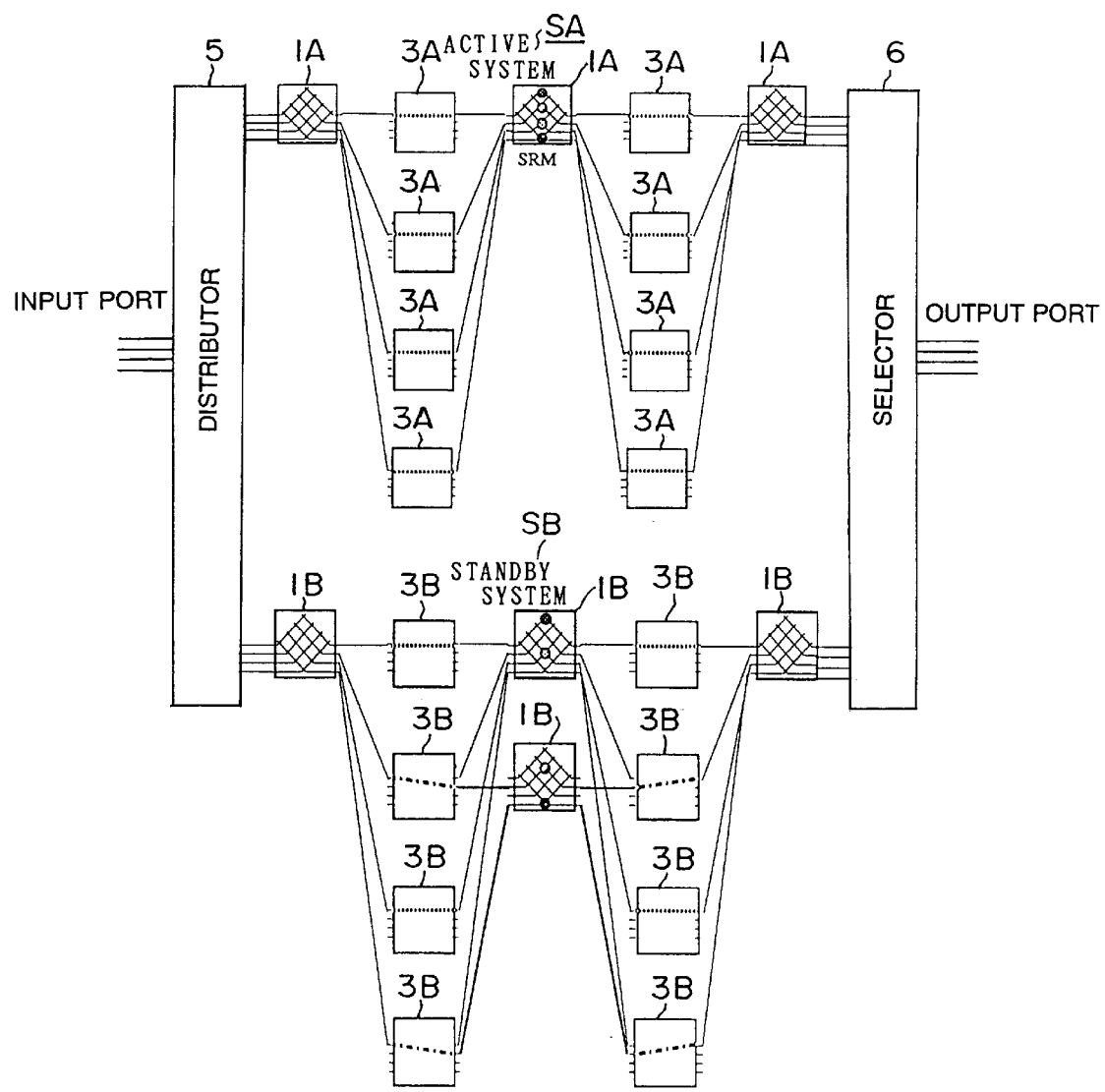
FIG. 50 is a diagram illustrating a dualized ATM switch when the SRM is expanded.

Next, an embodiment 6 of the present invention will be discussed. FIG. 50 is a diagram illustrating a dualized ATM switch when the SRMs are expanded. Referring to FIG. 50, the ATM switch includes an active system ATM switch SA, a standby system ATM switch SB, a distributor 5 for distributing the cells from a plurality of input ports to one of these two ATM switches and a selector 6 for selecting the ATM switch.

The active system ATM switch SA is constructed of three stages SRMs 1A and PSMs 3A of two stages each consisting of four PSMs 3A arranged in a side-by-side relationship. The standby system ATM switch SB is constructed of three stages SRMs 1B and PSMs 3B of two stages each consisting of four PSMs 3B arranged in the side-by-side relationship.

Herein, one intermediate-stage SRM 1B is added to the standby system ATM switch SB. At this time, as explained in the embodiment 1, the paths are evenly distributed to the two intermediate-stage SRMs.

That is, after the SRMs was expanded, the switch construction is equivalent both in the standby system and in the active system. Accordingly, two types of buffer using conditions can be equalized, and the active system can be switched to the standby system in the way of dual switching. In this case also, the SRMs in the standby system are expanded, and, hence, the invention is applicable to a case where no PSM is provided.

<EMBODIMENT 7>

Figure 51:
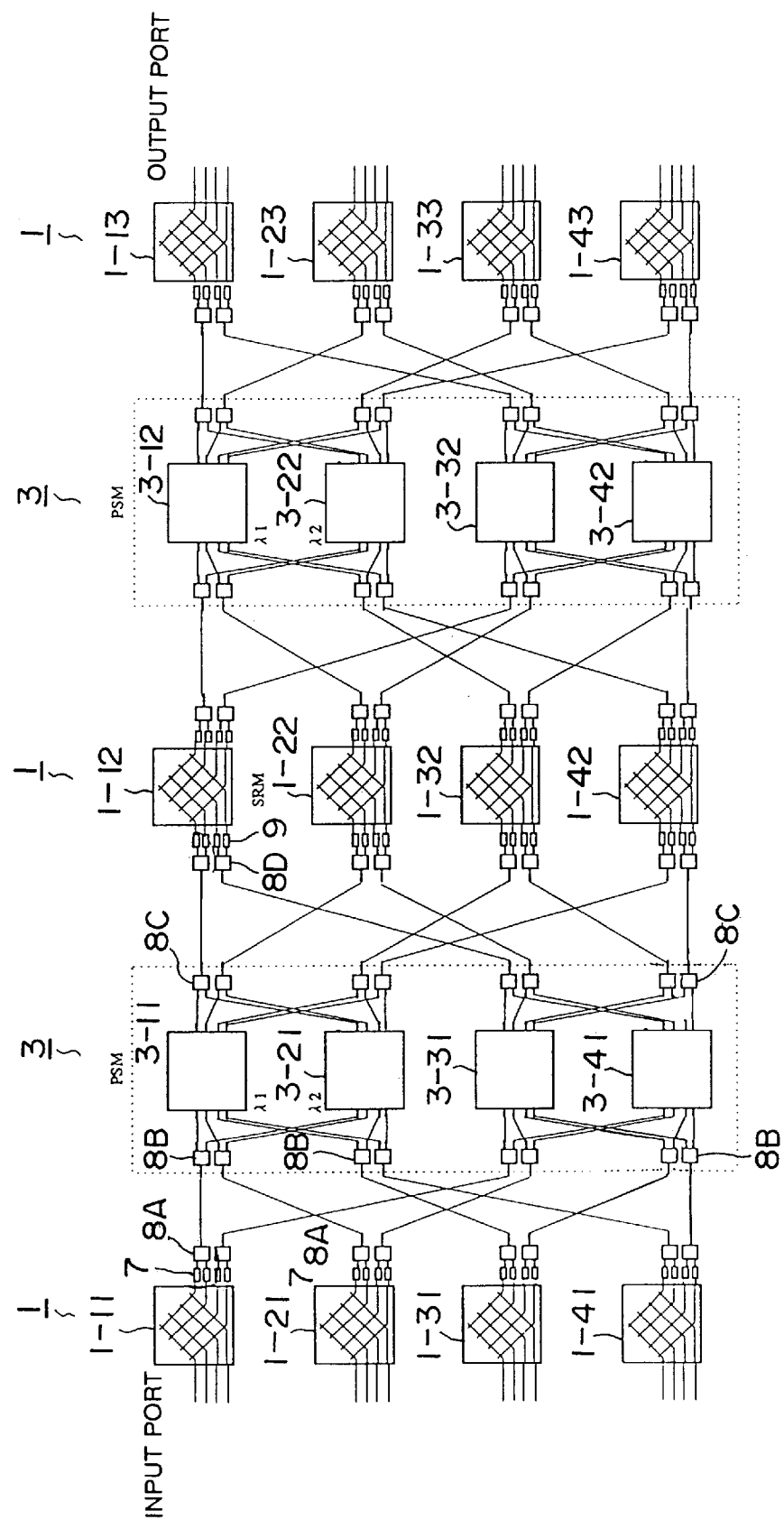
FIG. 51 is a diagram showing a cell transmission between the SRM and a PSM in an embodiment 7.
Figure 52:
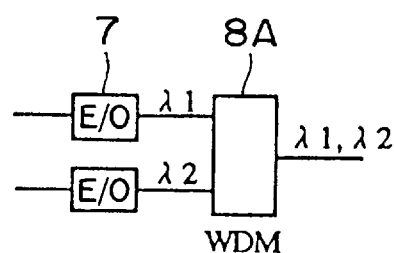
FIG. 52 is a constructive diagram illustrating a WDM coupler and an E/O.
Figure 53:
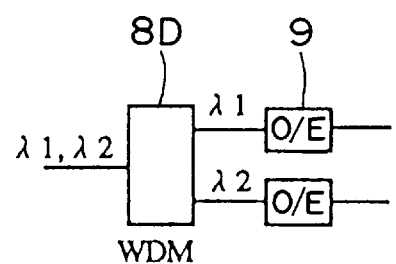
FIG. 53 is a constructive diagram illustrating the WDM coupler and an O/E.

Next, an embodiment 7 of the present invention will be explained. FIG. 51 is a diagram showing a transmission of the cells between the SRM and the PSM in the embodiment 7. FIG. 52 is a diagram illustrating configurations of a WDM coupler and of an E/O. FIG. 53 is a diagram illustrating configurations of the WDM coupler and of an O/E. When a PSM 3 is used, outputs from the respective SRMs 1 are concentrated, and, therefore, the number of transmission lines to be accommodated is quite large. The embodiment 7 obviates this problem.

Each SRM 1 electrically performs a switching process with respect to the cell. An E/O 7 connected to an output port of the SRM 1 converts the electrical output into the light. Wavelength demultiplexing/multiplexing (WDM) coupler 8A, as illustrated in FIG. 30, wavelength-multiplexes two cell outputs by use of two wavelengths $\lambda_1$, $\lambda_2$ corresponding to the two E/Os 7 and transmits them to the PSM 3.

A WDM coupler 8B is connected to the PSM 3. This WDM coupler 8B demultiplexes the two cell outputs and transmits them to the two PSMs. A WDM coupler 8C multiplexes the two cell outputs from the two PSMs adjacent to each other.

Then, a WDM coupler 8D demultiplexes it again into the two cell outputs, and an O/E 9 converts the photo signal back into the electric signal. Further, each cell composed of the electric signal is inputted to the intermediate-stage SRM.

Thus, the WDM coupler 8 multiplexes the cell, and therefore the number of links between the SRM 1 and the PSM 3 can be reduced by half.

Figure 54:
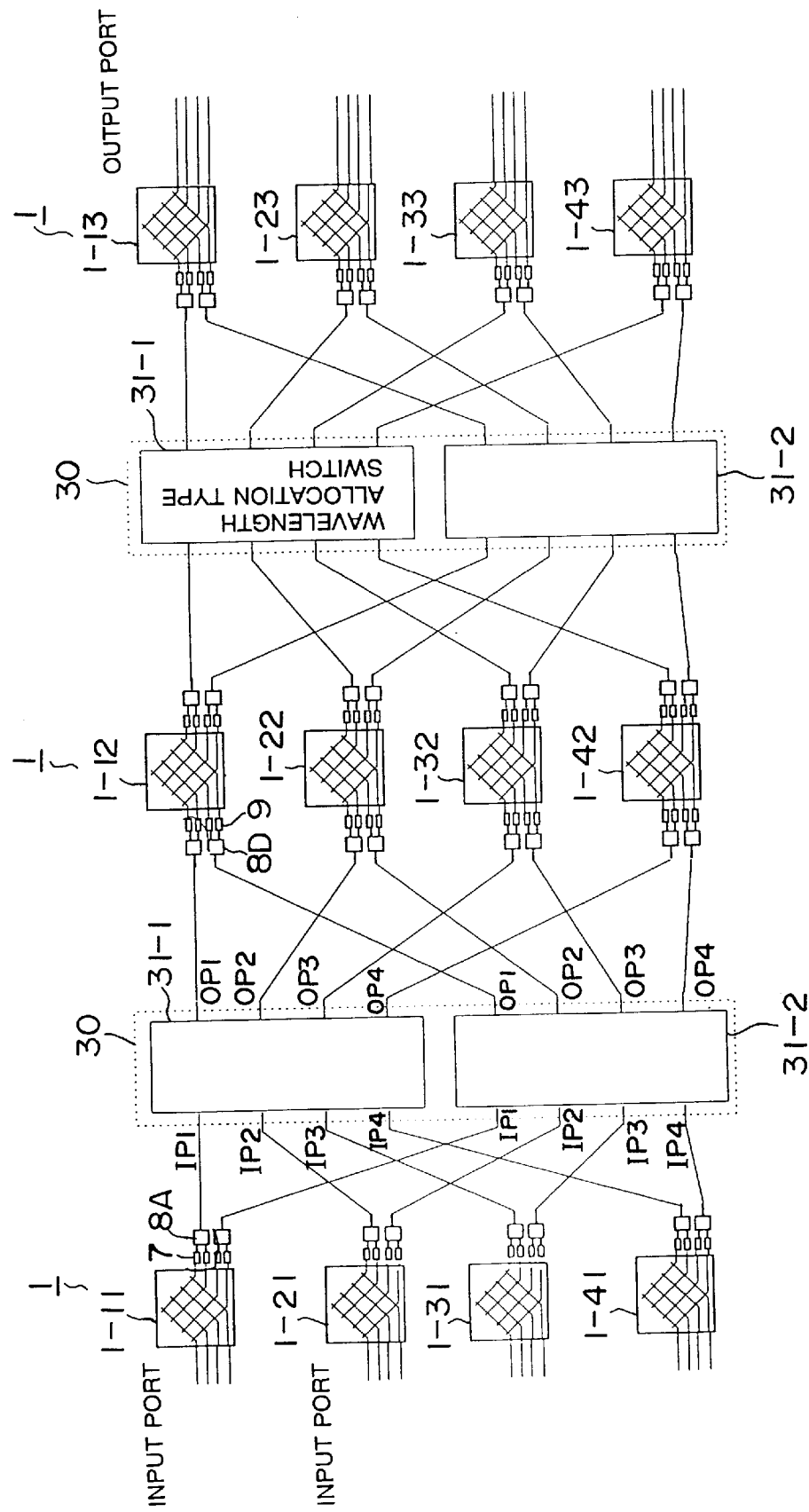
FIG. 54 is a diagram showing a modified example of the embodiment 7.
Figure 55:
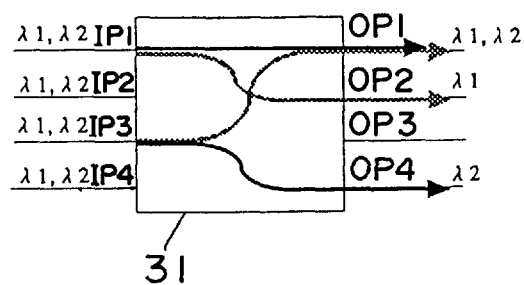
FIG. 55 is a constructive diagram showing a wavelength allocation type switch.

Next, a modified example of the embodiment 7 will be described. FIG. 54 is a diagram showing the modified example of the embodiment 7. In this modified example, a PSM 30 is provided between the SRM 1. This PSM 30 includes two wavelength allocation type switches 31-1, 31-2. Each of the wavelength allocation type switches 31-1, 31-2 has, as illustrated in FIG. 32, four input ports IP1–IP4 and four output ports OP1–OP4, and each port is connected to each SRM arranged in the vertical direction. As illustrated in FIG. 55, each of the wavelength allocation type switches 31-1, 31-2 inputs the cells each having the two wavelengths $\lambda_1$, $\lambda_2$ at the input ports from each SRM and changes the output ports (outward paths) by use of the wavelengths.

Herein, each of the wavelength allocation type switches 31-1, 31-2 allocates, to the output port OP1, the cell having the wavelength $\lambda_2$ among the cells having the wavelengths $\lambda_1$, $\lambda_2$ that are inputted to the input port IP1 and allocates the cell having the wavelength $\lambda_1$ to the output port OP2. Each of the wavelength allocation type switches 31-1, 31-2 allocates, to the output port OP4, the cell having the wavelength $\lambda_2$ among the cells having the wavelengths $\lambda_1$, $\lambda_2$ that are inputted to the input port IP3 and allocates the cell having the wavelength $\lambda_1$ to the output port OP1.

The above-described wavelength allocation type switch 31 can be replaced with the two WDM couplers 8B, 8C and two optical switches (e.g., the two SRMs 3-11, 3-21) shown in FIG. 51. Accordingly, the construction of the apparatus can be further simplified.

Note that the two wavelengths are used in the example shown in FIG. 51, but the cell can be multiplexed by use of, e.g., the same number wavelengths as the number of output ports at the maximum. In this case, the output comes from only one bundle of optical fibers extending out of one SRM. Therefore, the construction can be highly simplified.

Further, as illustrated in FIG. 54, the outward path can be changed for every plurality of wavelengths, and, when the wavelength allocation type switch is used, the PSM 30 can be replaced with one optical switch.

<EMBODIMENT 8>

Figure 56:
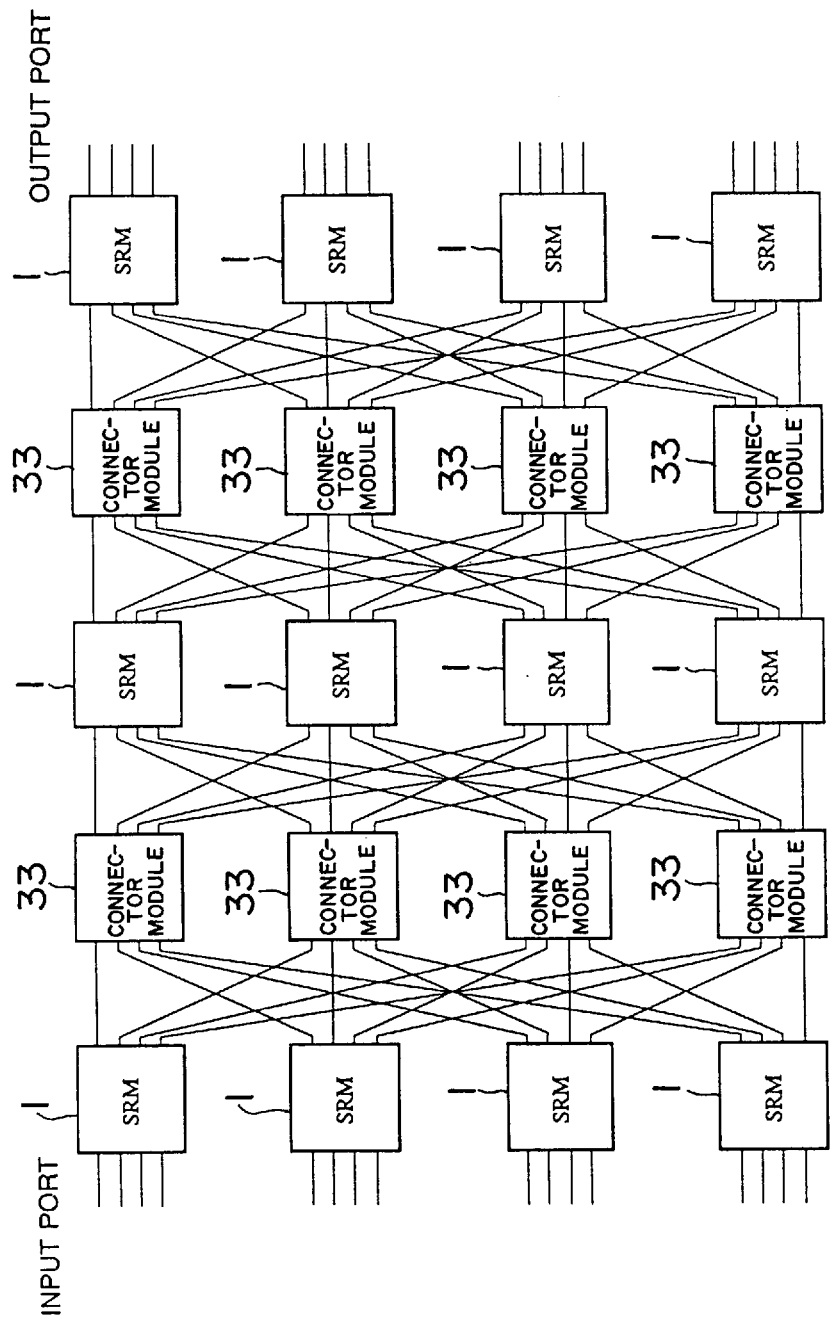
FIG. 56 is a diagram illustrating a construction of an embodiment 8 of the present invention.
Figure 57:
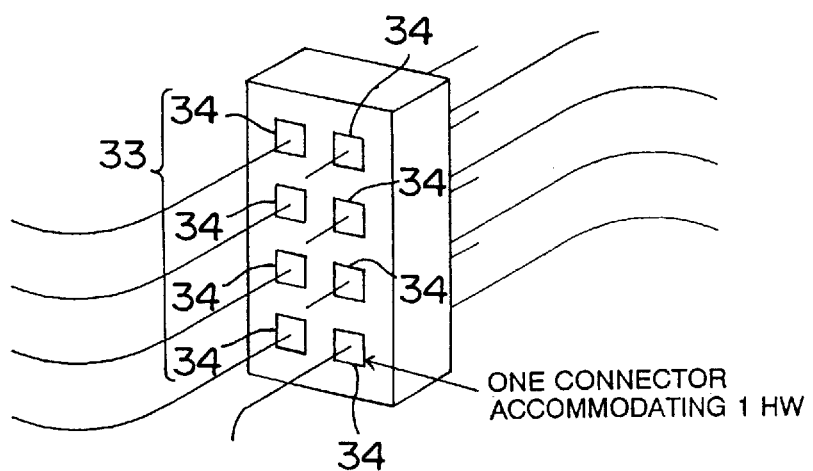
FIG. 57 is a diagram showing one example of a connector in the embodiment 8.

Next, an embodiment 8 of the present invention will be discussed. FIG. 56 is a diagram illustrating a construction of the embodiment 8. Referring to FIG. 56, a connector module 33 composed of a plurality of connectors 34 is provided between the SRMs 1. FIG. 57 shows one example of the connectors 34. One connector 34 accommodates one port (one highway HW) of the SRM 1, and one connector module 33 is composed of four connectors 34. Each of the four connectors 34 is connected to the SRM corresponding to this connector.

That is, the connector module 33 incorporates the same function as the PSM 3 employed in the embodiment 1. With this arrangement, when the path is switched manually, operator simply changes the connection of the connector module 33. Hence, the operation can be simplified.

<EMBODIMENT 9>

Figure 58:
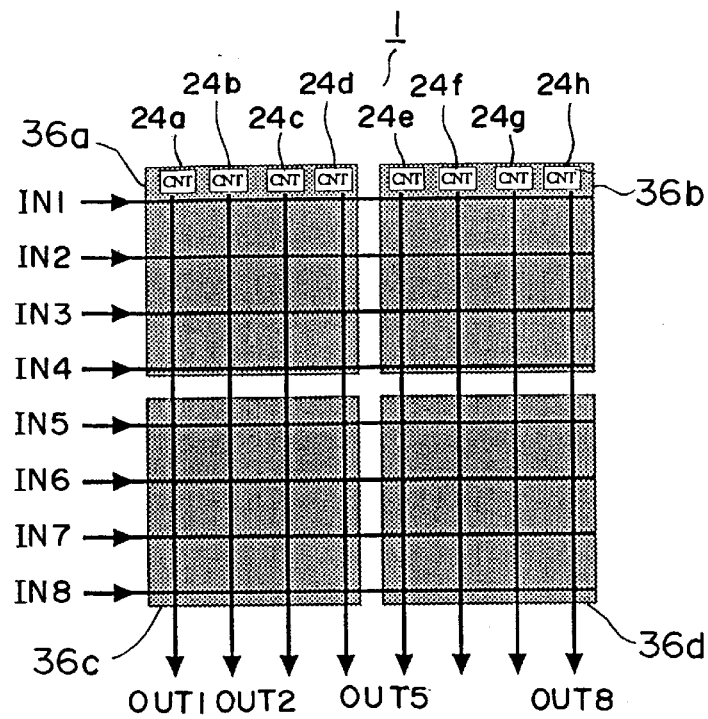
FIG. 58 is a diagram showing a constructive example of a conventional SRM cross point buffer.
Figure 59:
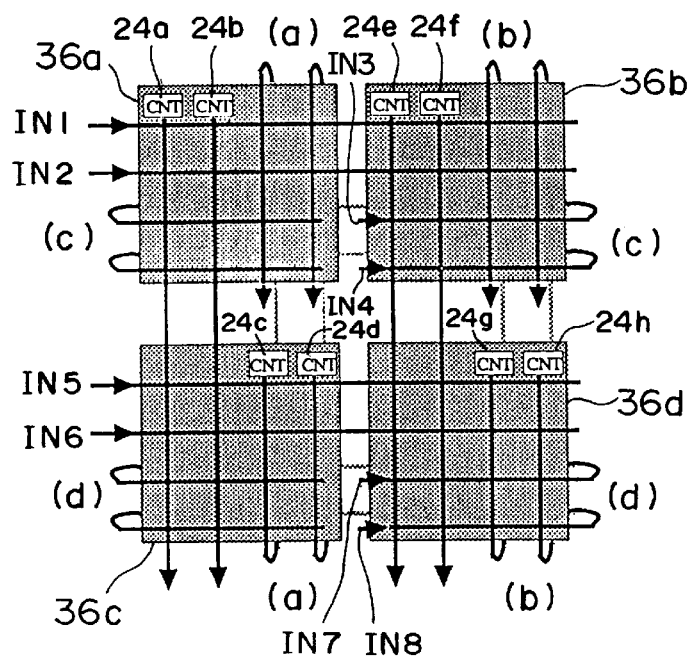
FIG. 59 is a diagram showing a constructive example of an even division type SRM cross point buffer in an embodiment 9.
Figure 60:
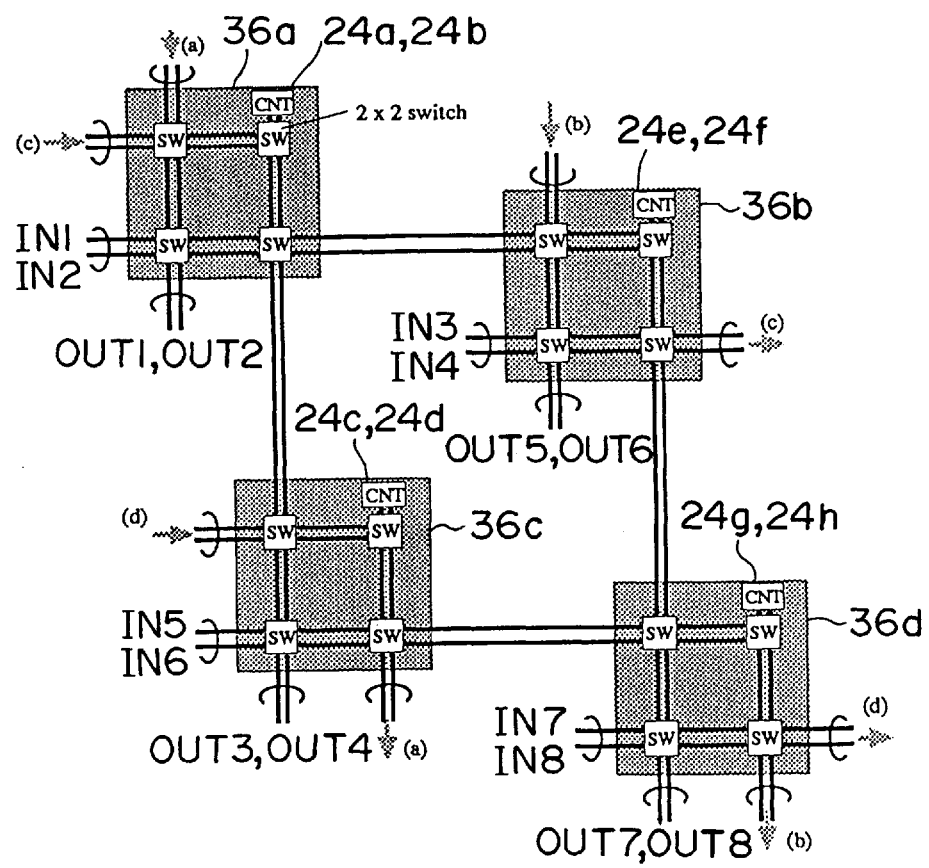
FIG. 60 is a constructive diagram showing connections of the same package in the embodiment 9.

Next, an embodiment 9 of the present invention will be described. FIG. 58 is a diagram showing an example of a configuration of the conventional SRM cross point buffer. FIG. 59 is a diagram illustrating an example of a configuration of the cross point buffer of an even division type SRM in the embodiment 9. FIG. 60 is a constructive diagram showing a connection of the same package in the embodiment 9.

Referring to FIG. 58, an (8×8) SRM 1 is divided into four packages 36a–36d. The packages 36a, 36b input input cells IN1–IN4. The packages 36c, 36d input input cells IN5–IN8.

The package 36a outputs output cells OUT1–OUT4 by use of four readout control units 24a–24d. The package 36b outputs output cells OUT5–OUT8 by use of four readout control units 24e–24h. If the SRM is simply divided in this way, an I/O configuration of each package differs.

The embodiment illustrated in FIG. 59 is constructed so that the inputs and outputs are evenly distributed to the respective packages 36a–36d. More specifically, referring to FIG. 59, the package 36a inputs the two input cells IN1, IN2 and outputs the two output cells OUT1, OUT2 by use of the readout control units 24a, 24b. The package 36b inputs the two input cells IN3, IN4 and outputs the two output cells OUT5, OUT6 by use of the readout control units 24e, 24f.

The package 36c inputs the two input cells IN5, IN6 and outputs the two output cells OUT3, OUT4 by use of the readout control units 24c, 24d. The package 36d inputs the two input cells IN7, IN8 and outputs the two output cells OUT7, OUT8 by use of the readout control units 24g, 24h.

Thus, each of the packages 36a–36d has the two inputs and two outputs, and therefore all these packages are constructed the same. FIG. 60 is a diagram depicting a connecting configuration in the same packages.

Referring to FIG. 60, the four cross points shown in FIG. 59 are replaced with a single piece of (2×2) switch SW. The two readout control units shown in FIG. 59 is replaced with one readout control unit provided by an intervals of two rows of the cross points. The switch construction in the package may not be based on the complete cross point. It may suffice that the I/O number in the package is the same.

<EMBODIMENT 10>

Figure 61:
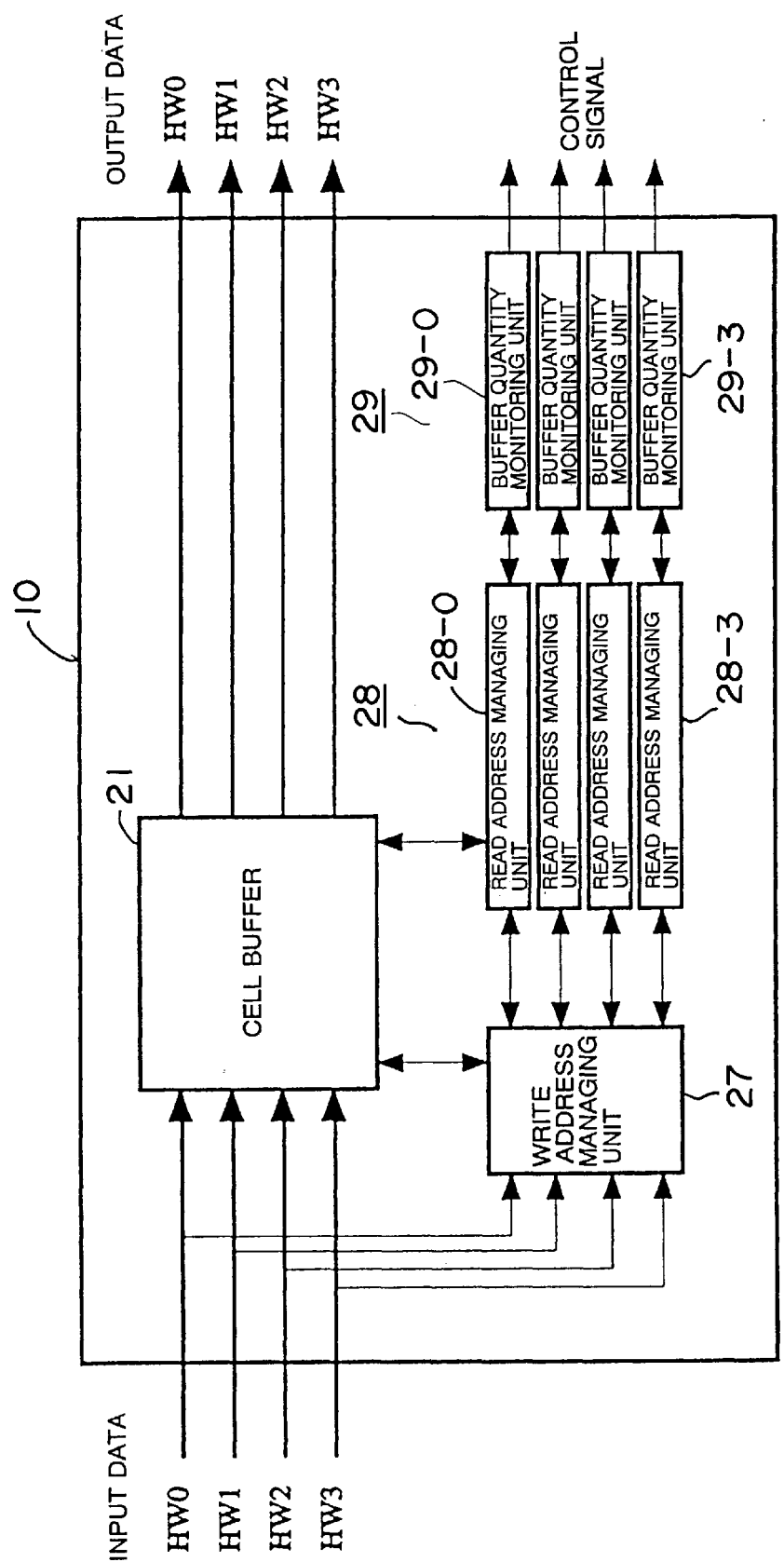
FIG. 61 is a constructive diagram showing a shared buffer type SRM in an embodiment 10.

An embodiment 10 will deals with an example of a shared buffer type SRM. FIG. 61 is a constructive diagram showing the shared buffer type SRM. The above-mentioned cross point type cell buffer has an individual buffer per cross point. If one cell buffer 21 is employed in the shared buffer type SRM, the individual buffer in the cross point type cell buffer can not be managed.

Therefore, an SRM 10 of the shared type buffer in the embodiment 10 includes one cell buffer 21, a write address management unit 27, a plurality of read address management units 28 and a plurality of buffer quantity monitoring units 29.

The single cell buffer 21 is connected to a plurality of input highways and a plurality of output highways. The write address management unit 27 is connected to the plurality of input highways and the cell buffer 21. The plurality of read address management units are connected to the write address management unit 27 and the cell buffer 21.

The write address management unit 27 manages a write address in which the cell from each input highway is written to the cell buffer 21. Each of the read address management units 28-0 to 28-3 is provided per output highway and manages a read address of the cell buffer 21. Each of buffer quantity monitoring units 29-1 to 29-3 monitors a cell free space in the cell buffer 21 per output highway.

According to such a construction, the cell is read to each output highway, and the cell free space can be detected per output highway. Accordingly, the path can be switched without depending on the buffer configuration of the unit switch constituting the SRM.

<EMBODIMENT 11>

Next, an embodiment 11 of the present invention will be described. Given in the embodiment 11 is an explanation of a method for making connections between SRMs in the case of using no PSM.

With an increased capacity of the switch, the path connections in the case of expanding the SRMs become tremendous and complicated.

Figure 62:
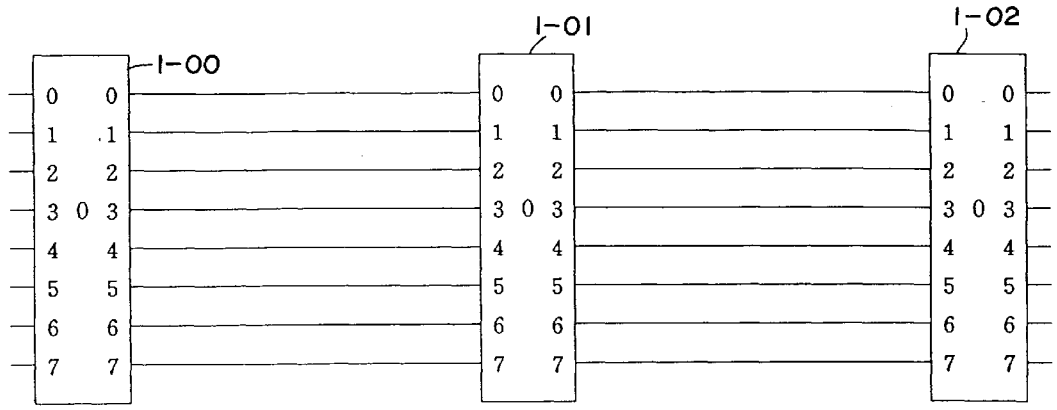
FIG. 62 is a diagram showing a connection example 1 of the SRM in an embodiment 11.
Figure 63:
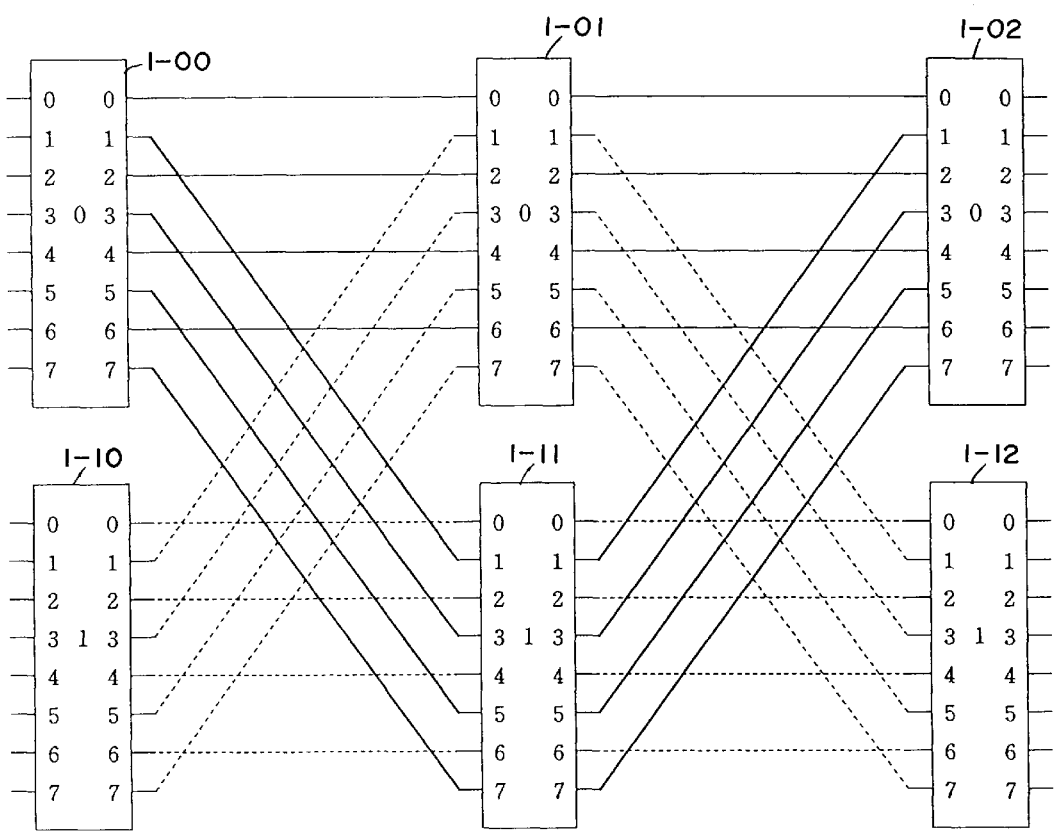
FIG. 63 is a diagram showing a connection example 2 of the SRM in the embodiment 11.
Figure 64:
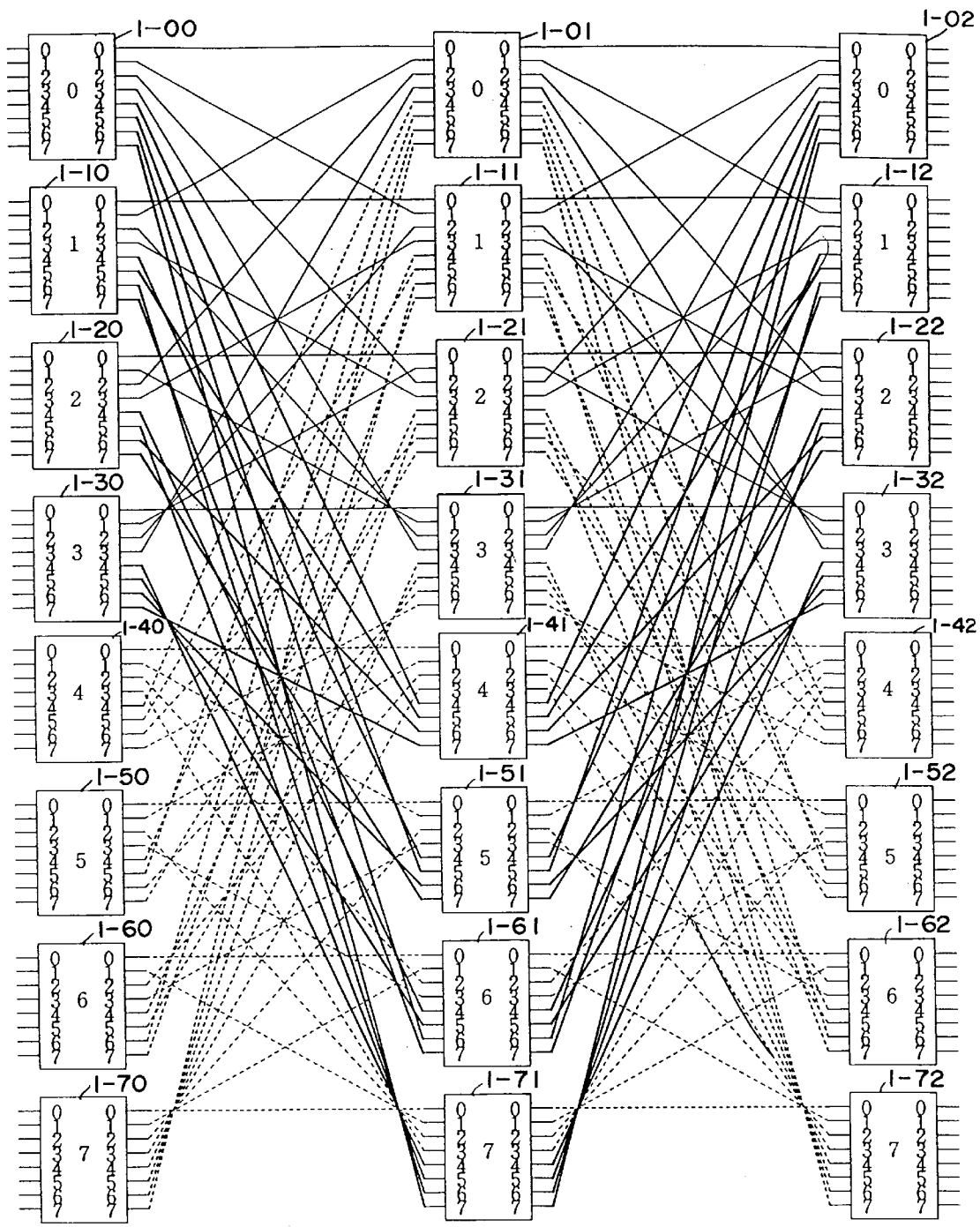
FIG. 64 is a diagram showing a connection example 3 of the SRM in the embodiment 11.
Figure 65:
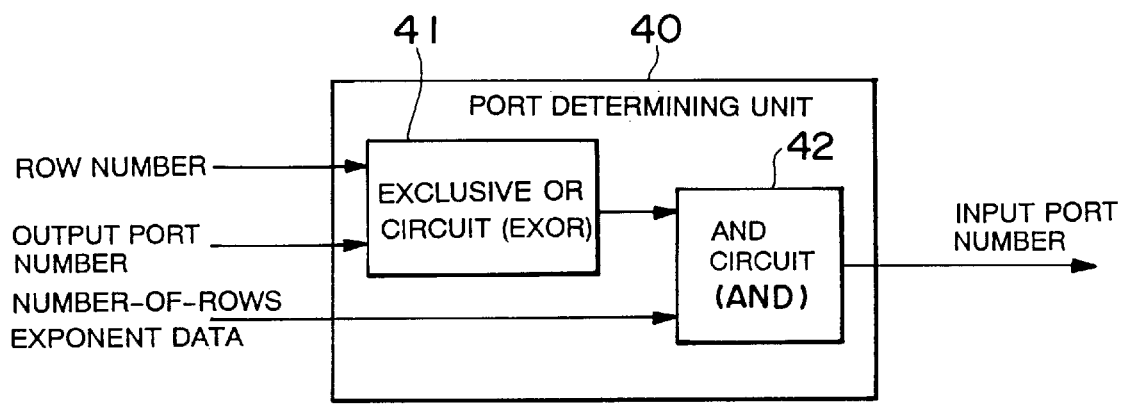
FIG. 65 is a constructive diagram illustrating a port connection determining unit in the embodiment 11.

FIGS. 62 through 64 are diagrams showing a process of expanding the SRMs by using the SRM connecting method. FIG. 65 is a constructive diagram showing a port connection determining unit. A port connection determining unit 40 determines which input port of the next stage to connect an output port of the previous stage. The port connection determining unit 40 is composed of an exclusive OR circuit 41 and an AND circuit 42.

The exclusive OR circuit 41 obtains the exclusive OR of a row number of the SRM with an output port number of the SRM. The AND circuit 42 obtains the AND of the output of the exclusive OR circuit 41 with exponent data about the number of rows of the SRMs as a next-stage input port number to be connected.

At first, each output port is certainly connected to the same next-stage input port. FIG. 62 illustrates the SRM 1-00 to 1-02 before the SRMs are expanded. Each SRM has eight input ports and eight output ports. In FIG. 62, the output port number is surely equal to the next-stage input port number. There is only one intermediate stage, and hence the connection can be easily performed.

Next, as illustrated in FIG. 63, the SRMs 1-10 to 1-12 for one row are expanded. What is done at this time is to consider which row of the next-stage SRM to connect, e.g., an output port "0" of the SRM 1-00 disposed in the 0th column and in 0th row.

In this case, the number of rows of the whole SRMs is 2, and therefore "2" is expressed as "$2^1$" with an exponent of "2". Next, the exclusive OR circuit 41 obtains the exclusive OR of a self SRM row number with an output port number. In this instance, an exclusive OR EXOR of a row number "000" with an output port number "000" becomes "000".

Then, the AND circuit 42 ANDs the obtained result with an exponent value "1" of "2". In this case, the AND of the EXOR value "000" with the exponent value "001" ("1") turns out "000". Hence, the output port "0" of the SRM 1-00 in the 0th column and 0th row is connected to the input port "0" of the SRM 1-01 disposed in 1th colum and 0th row.

What is done similarly is to consider which row of the next-stage input port to connect the output port "1" of the SRM 1-00 in the 0th column and 0th row. In this case also, the number of whole rows is 2, and therefore "2" is expressed as $2^1$ with an exponent of "2".

Next, the self SRM column number is exclusive-ORed with the output port number. In this instance, the exclusive OR of the row number "000" with the output port number "001" becomes "001". The thus obtained result is ANDed with a numerical value of the 2's exponent. In this case, the AND of the EXOR value "001" with the exponent value "001" ("1") is "001".

Accordingly, the output port "1" of the SRM 1-00 in the 0th column and 0th row is connected to the input port "1" of the SRM 1-11 in the 1st row and 1st column. The SRMs are expanded, and, when the path is switched, the next-stage SRM to be connected by the above connecting method can be easily known.

Similarly, as shown in FIG. 64, the SRMs are expanded at the maximum, what is done is to consider which row of the next-stage SRM to connect an output port 5 of the SRM in the 1st colum and 4th row. In this case, the number of whole rows is 8, and therefore "8" is expressed as "$2^3$" with an exponent of "2".

Next, the self SRM row number is exclusive-ORed with the output port number. In this case, the exclusive OR of the row number "100" with the output port number "101" becomes "001". Then, the thus obtained result is ANDed with a value of the 2's exponent. In this case, the AND of the EXOR value "001" with the exponent value "111" ("3") is "001".

Accordingly, it can be known that the output port "5" in the 1st colum and 4th row is connected to the input port "5" in the 2nd colum and 1st row.

Generally;

when one row of SRM is provided, 000 AND (i EXOR OP);

When two rows of SRMs are provided, 001 AND (i EXOR OP);

when four rows of SRMs are provided, 001 AND (i EXOR OP); and when eight rows of SRMs are provided, 111 AND (i EXOR OP), where i is the row number, and OP is the output port number.

Note that the port determining unit 40 is constructed of the hardware in the embodiment 11. For example, the port determining unit may be constructed of software.

<EMBODIMENT 12>

Figure 66:
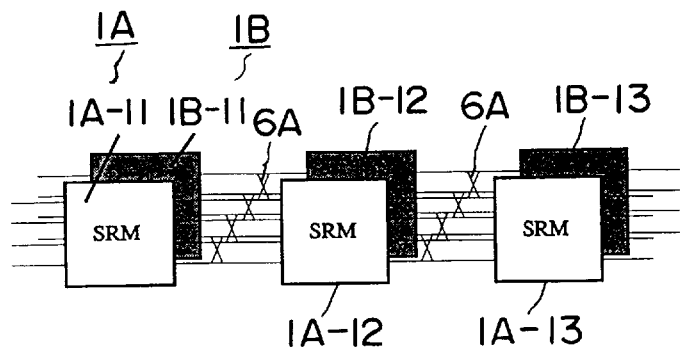
FIG. 66 is a constructive diagram illustrating the ATM switch having a selector at a stage anterior to the intermediate-stage SRM.

Next, an embodiment 12 of the present invention will be discussed. The embodiment 12 will deal with a method for expanding the SRMs wherein selectors exist anterior and posterior to the intermediate-stage SRM. Referring to FIG. 66, the switch includes active system SRMs 1A-11 through 1A-13, standby system SRMs 1B-11 through 1B-13 and a plurality of selectors 6A, disposed anterior and posterior to the intermediate-stage SRMs 1A-12 and 1B-12, for performing system switching between the active system 1A and the standby system 1B. This kind of connection mode requires taking synchronism between the active system 1A and the standby system 1B.

Further, the cells on the input highways of the respective SRMs are synchronized in the input units of the SRMs 1A-12, 1B-12 of the active and standby systems 1A, 1B. With this synchronization, the paths can be switched online without being instantaneously disconnected.

Next, the method for expanding the SRMs will be explained. Normally, the active system 1A and the standby system 1B are in the exactly in the same status. Herein, for making the description easier, the explanation will be given by taking out only the standby system 1B.

Figure 67:
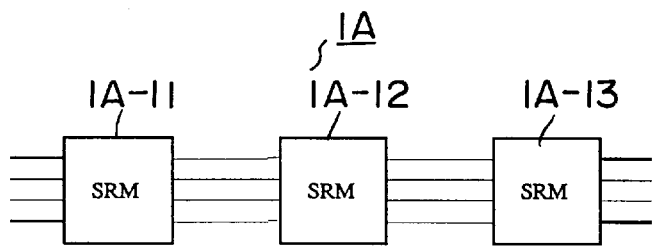
FIG. 67 is a constructive diagram showing an active system ATM switch before the SRM is expanded.
Figure 68:
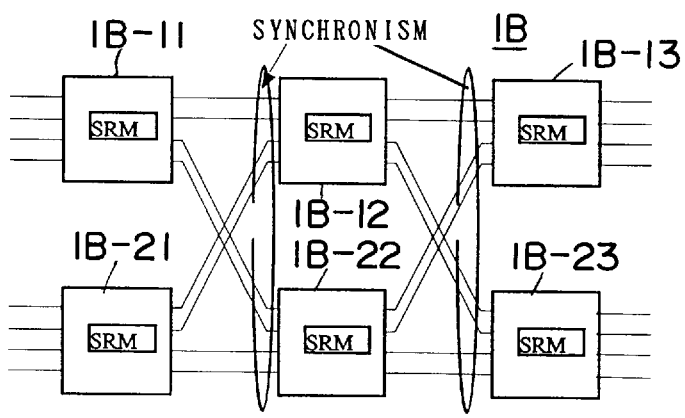
FIG. 68 is a constructive diagram illustrating a standby system ATM switch after the SRM was expanded.

FIG. 67 is a constructive diagram illustrating the ATM switch in the active system 1A before the SRMs are expanded. To begin with, the SRMs in the active system 1A shown in FIG. 67 operate. Next, as shown in FIG. 68, the standby system 1B consisting of the SRMs arranged in two rows and three columns are expanded, and the paths of the SRMs 1B-11 to 1B-23 are switched. Meanwhile, the active system 1A normally operates.

After the SRMs in the standby system 1B are expanded, the same cells as the cells in the active system 1A flow to the respective SRMs in the standby system 1B. At this time, the cells are synchronized with the input units of the respective second-stage SRMs 1A-12, 1B-12, 1B-22. Consequently, cell reversion due to the reading process does not arise.

Then, the cells are flowed on till the cell status in the active system 1A equals to the cell status in the standby system 1B. Thereafter, the standby system 1B is selected by a selector 6A switching the system. The SRMs can be thereby expanded without being instantaneously disconnected.

<EMBODIMENT 13>

Figure 69:
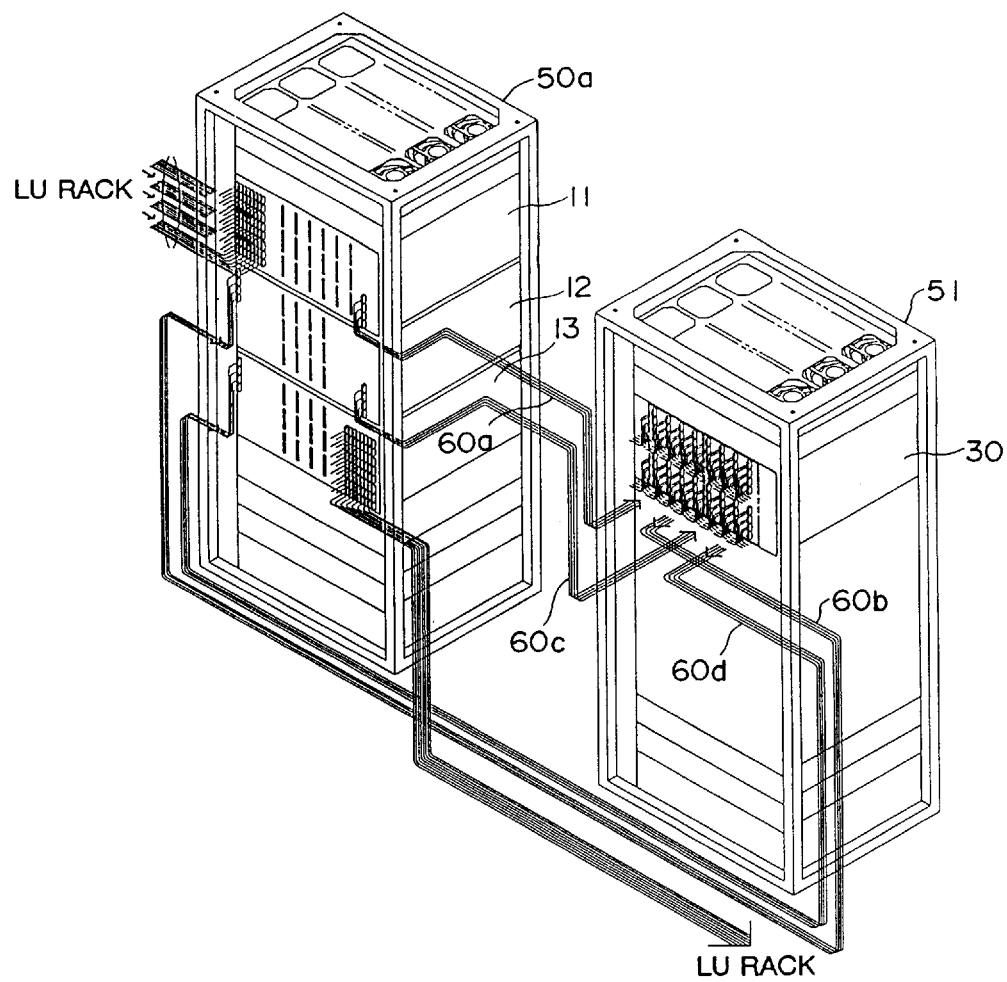
FIG. 69 is a view illustrating a packaging constructive example 1 of the ATM switch according to the present invention.

Next, an embodiment 13 of the present invention will be described. FIGS. 69 through 74 show packaging constructive examples of the ATM switch according to the present invention. FIG. 69 is a view showing a packaging constructive example 1 of the ATM switch of the present invention.

Referring to FIG. 69, one rack 50a houses first-through third-stage SRM units 11–13. Each of the SRM units 11–13 includes (8×8) SRMs 1. One other rack 51 houses one PSM unit 30 including PSMs 3. The respective SRM units 11–13 in the rack 50a are mutually connected via connecting lines 60a–60d to the PSM unit 30 in the rack 51.

In this way, the SRMs 1 and the PSMs 3 are housed in the separate racks, thus it is possible to constitute the ATM switch.

Figure 70:
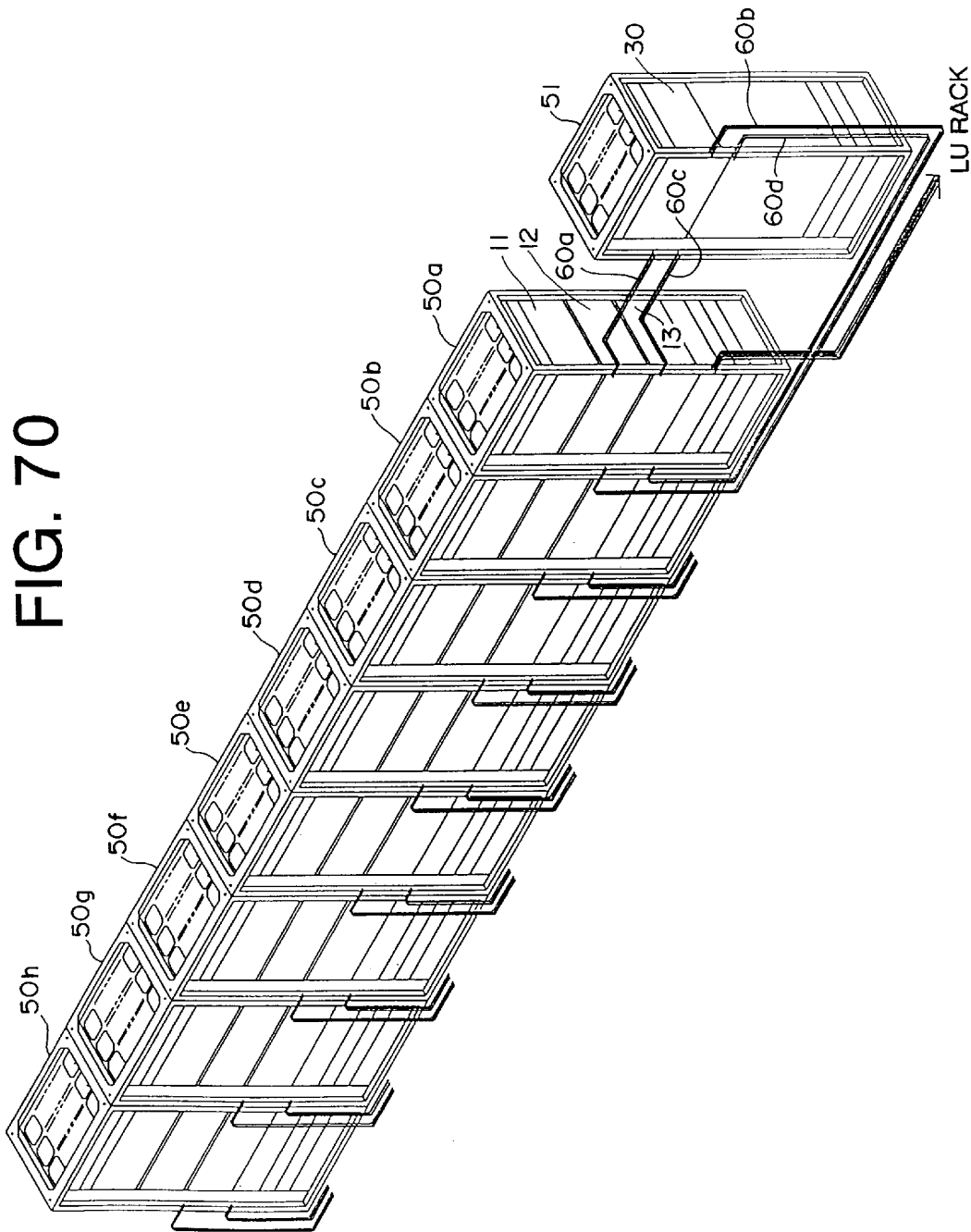
FIG. 70 is a view illustrating a packaging constructive example 2 of the ATM switch according to the present invention.

FIG. 70 is a view showing a packaging constructive example 2 of the ATM switch of the present invention. In the packaging constructive example 2 shown in FIG. 70, a plurality of racks having the same structure as the rack 50a housing the SRM units 11–13 are prepared. That is, one rack 51 an eight racks 50a–50h are prepared in the constructive example 2.

With this construction, the SRMs 1 can be arbitrarily expanded independently of the PSM 3. Further, the SRMs can be expanded per rack, and the rack for the SRMs 1 numbers 1 at the minimum but 8 at the maximum.

Figure 71:
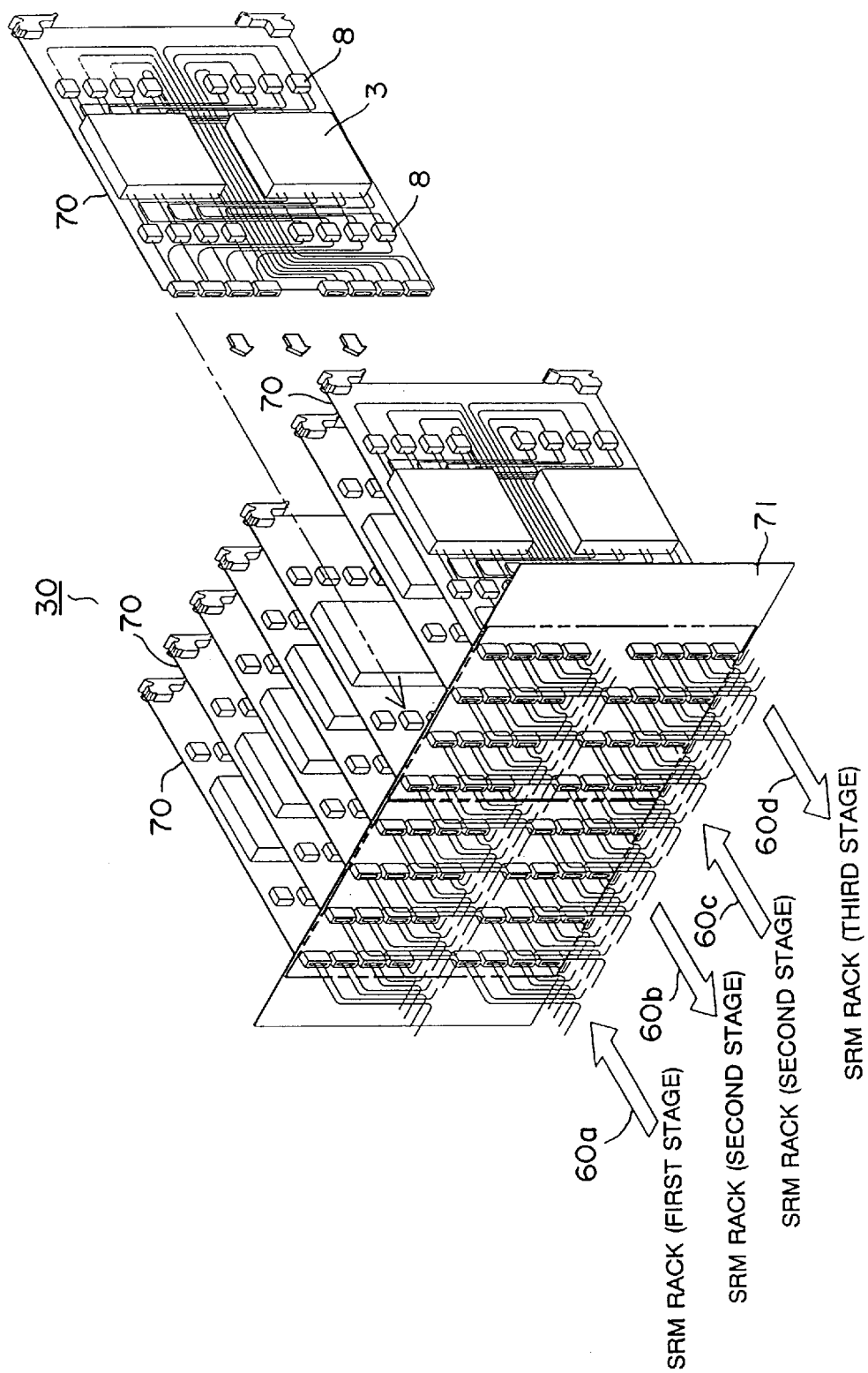
FIG. 71 is a constructive view showing a PSM unit in the packaging constructive example 1.

FIG. 71 is a constructive view illustrating the PSM unit in the packaging constructive example 1. Referring to FIG. 71, the PSM unit 30 is constructed by attaching a plurality of PSM packages 70 disposed in the side-by-by relationship to a backboard 71. Each PSM package 70 is composed of a plurality of WDM couplers 8 and two optical switches 3.

The first-stage SRM 1 is connected via a connecting line 60a to the PSM package 70. The PSM package 70 is connected via a connecting line 60b to the second-stage SRM 1. The second-stage SRM 1 is connected via a connecting line 60c to the PSM package 70. The PSM package 70 is connected via a connecting line 60d to the third-stage SRM 1.

Figure 72:
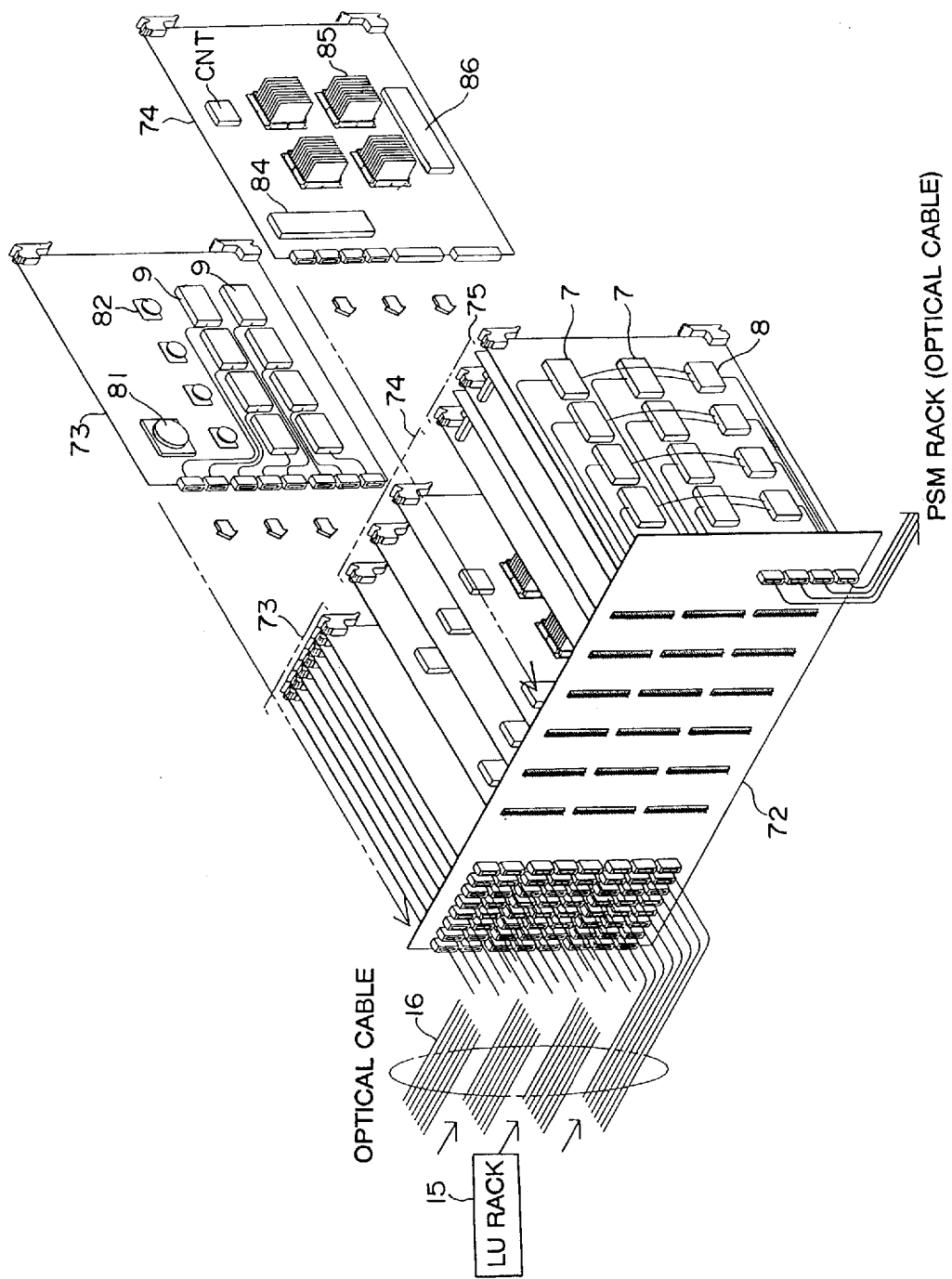
FIG. 72 is a constructive view illustrating a first-stage SRM unit in the packaging constructive example 1.

FIG. 72 is constructive view showing the first-stage SRM unit in the packaging constructive example 1. The first-stage SRM unit 11 is constructed by attaching a plurality of multiplex (MUX) packages 73, a plurality of switches (SW) packages 74 and a plurality of POW packages to the backboard 72. Each MUX package 73 is composed of a multiplex large-scale integrated circuit (MUXLSI) 81, a P/S (parallel-serial) LSI 82 and an O/E module consisting of O/Es 9. Each MUX package 73 is connected to a line unit (LU) 15 via an input line 16 formed of an optical cable.

Each SW package 74 is constructed of an input buffer 84, CNT, SW-MCMs 85 and an output buffer 86. Each POW package 75 is constructed of an E/O module consisting of E/Os 7 and WDM couplers 8.

Figure 73:
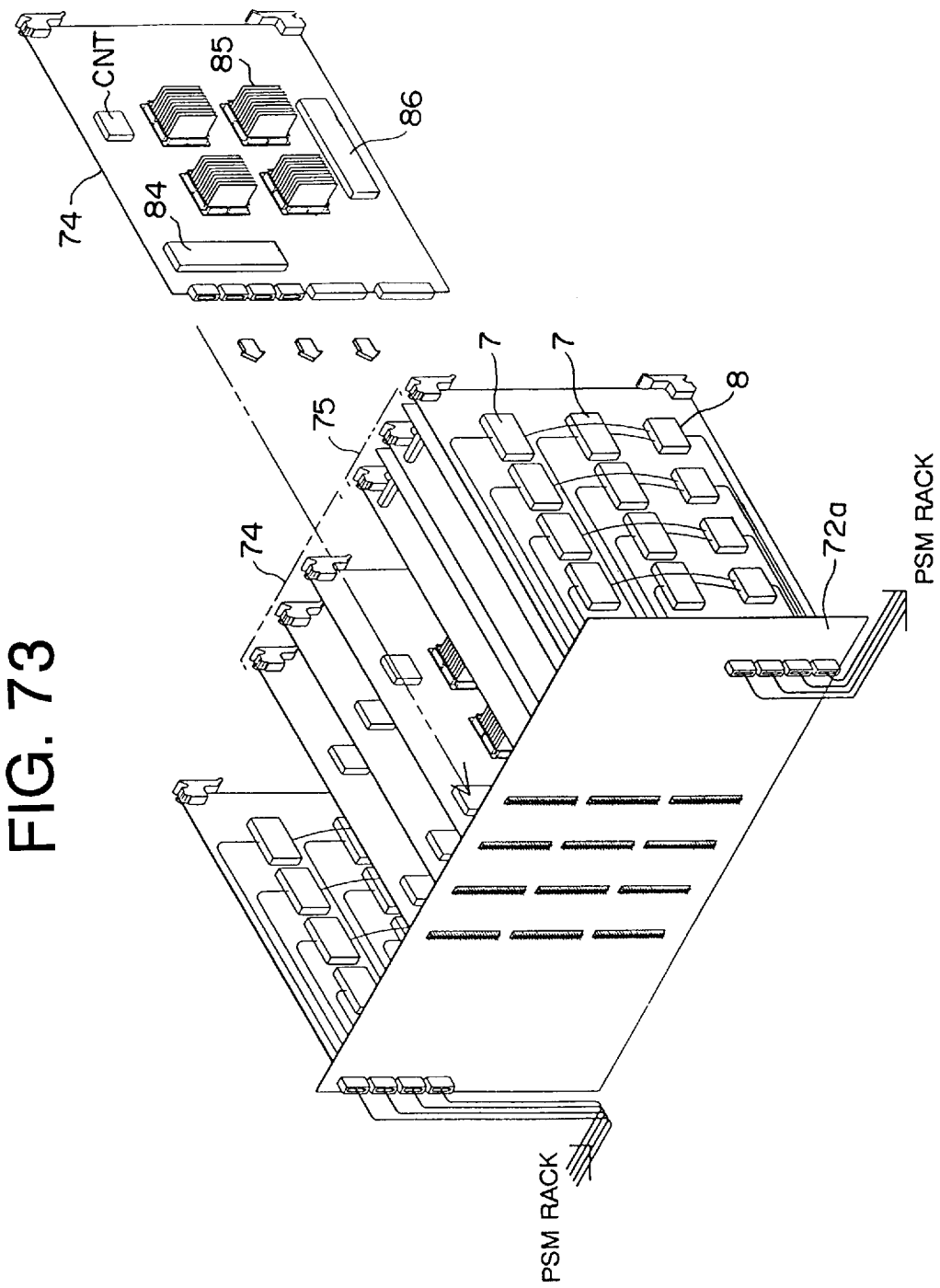
FIG. 73 is a constructive view showing a second-stage SRM unit in the packaging constructive example 1.

FIG. 73 is a constructive view of the second-stage SRM unit in the embodiment 1. The second-stage SRM unit 12 is constructed by attaching the plurality of switch (SW) packages 74 and the plurality of POW packages 75 to a backboard 72a.

Figure 74:
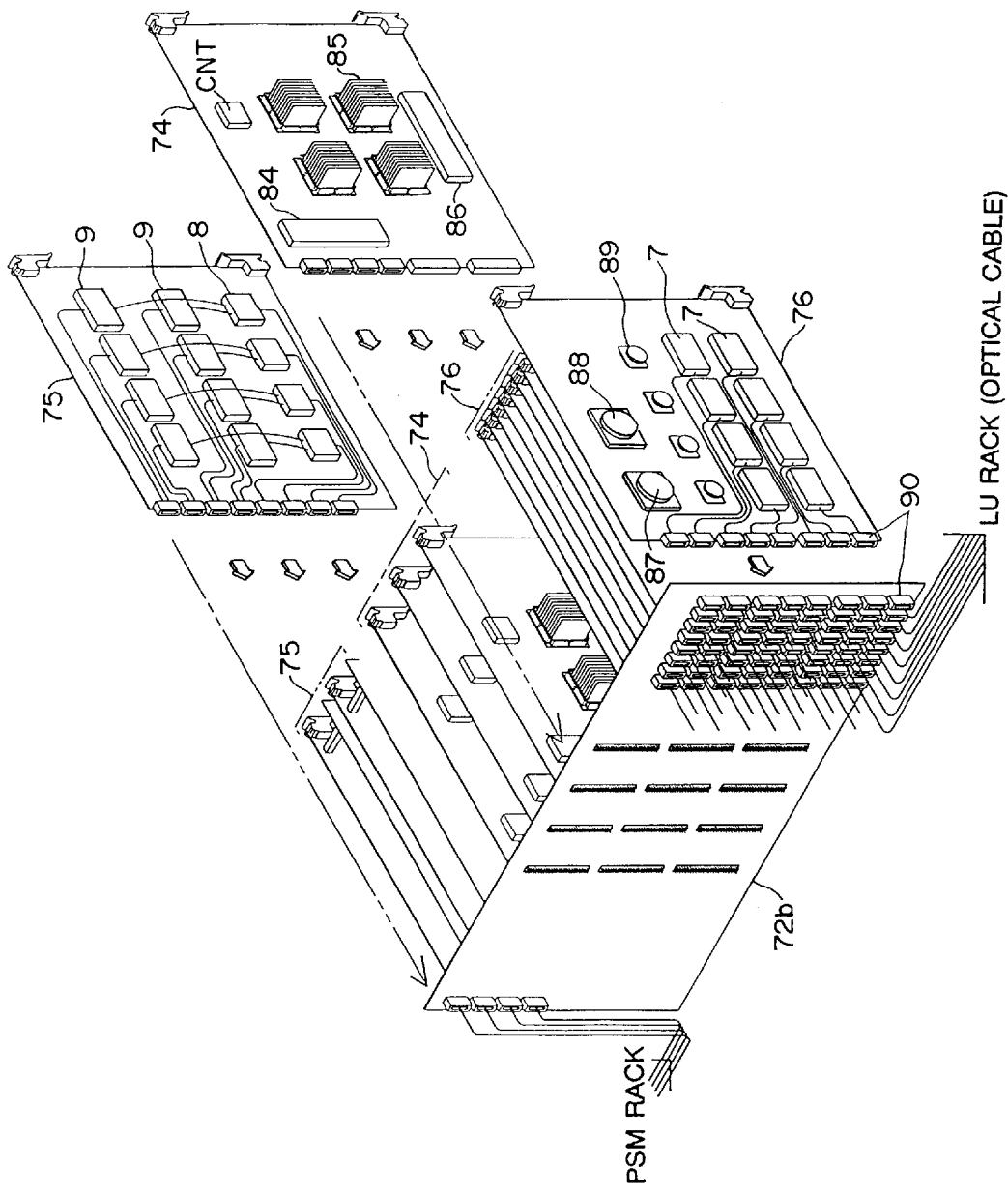
FIG. 74 is a constructive view showing a third-stage SRM unit in the packaging constructive example.
Figure 75:
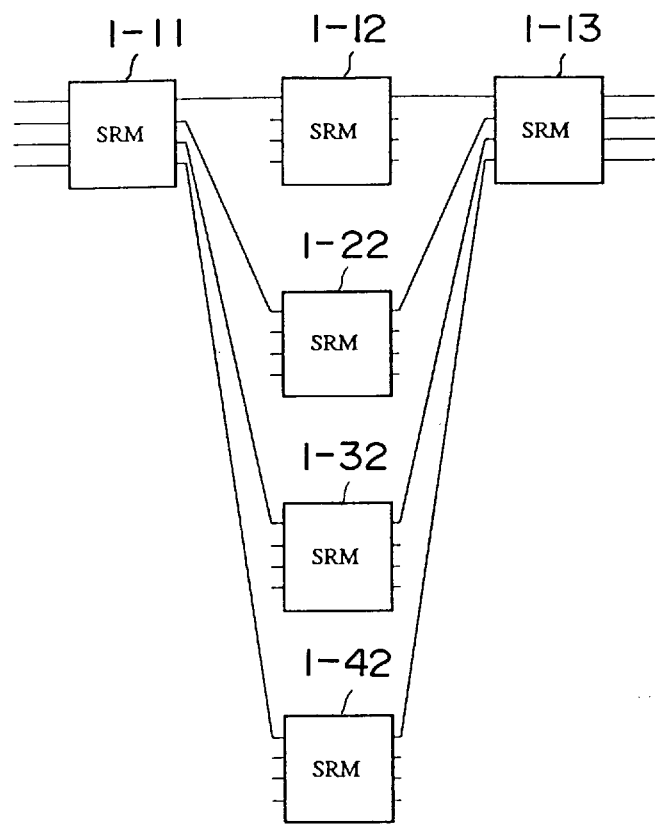
FIG. 75 a diagram showing a constructive example 1 of a conventional ATM switch in which all the intermediate-stage SRMs are prepared from the beginning.
Figure 76:
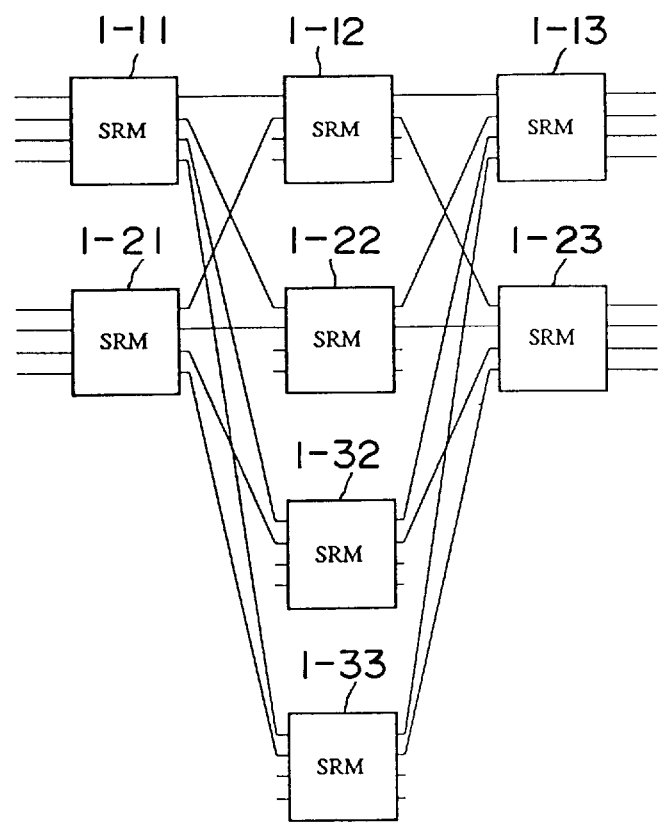
FIG. 76 is a diagram showing a constructive example 2 of the conventional ATM switch in which all the intermediate-stage SRMs are prepared from the beginning.
Figure 77:
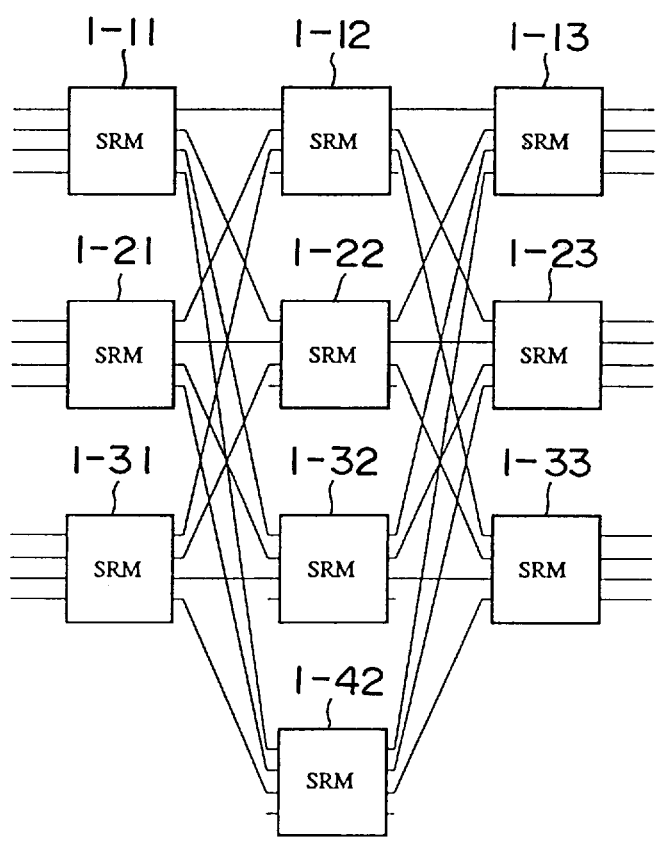
FIG. 77 is a diagram showing a constructive example 3 of the conventional ATM switch in which all the intermediate-stage SRMs are prepared from the beginning.
Figure 78:
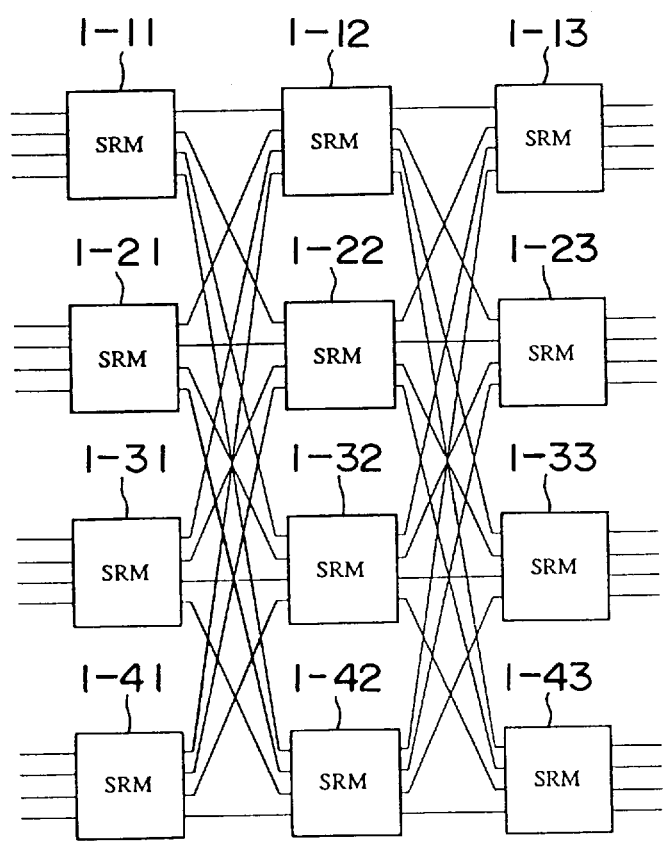
FIG. 78 is a diagram showing a constructive example 4 of the conventional ATM switch in which all the intermediate-stage SRMs are prepared from the beginning.
Figure 79:
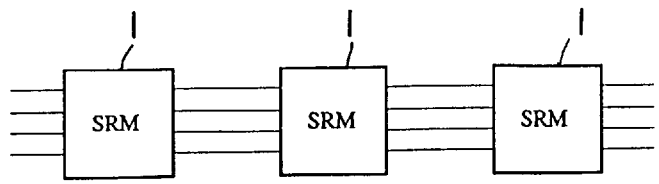
FIG. 79 is a diagram showing a constructive example 1 of the conventional ATM switch in which a necessary minimum number of SRMs of each stage are prepared.
Figure 80:
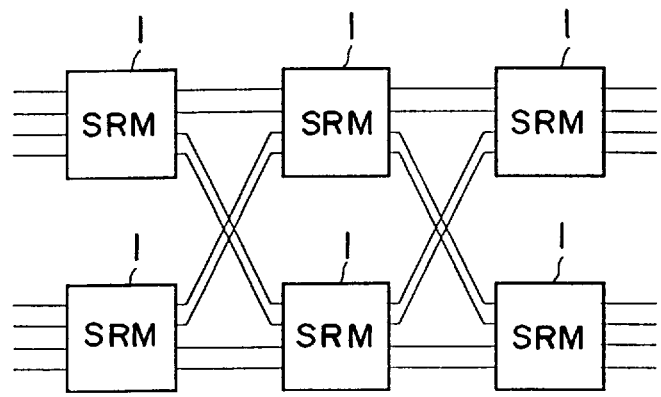
FIG. 80 is a diagram showing a constructive example 2 of the conventional ATM switch in which the necessary minimum number of SRMs of each stage are prepared.
Figure 81:
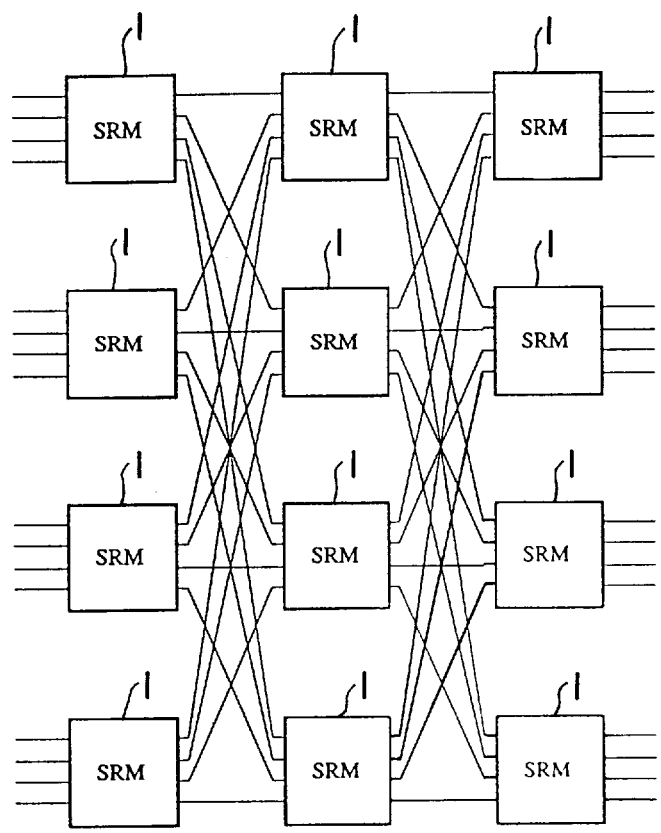
FIG. 81 is a diagram showing a constructive example 3 of the conventional ATM switch in which the necessary minimum number of SRMs of each stage are prepared.

FIG. 74 is a constructive view of the third-stage SRM unit in the embodiment 1. The third-stage SRM unit 13 is constructed by mounting the plurality of POW packages 75, the plurality of SW packages 74 and a plurality of demultiplex (DMUX) packages 76 on the backboard 72b. Each DMUX package 76 comprises an S/P (serial-parallel) LSI 87, a demultiplex control unit (DMUXCTL) 88, DMUXLSIs 89, parallel optical connectors 90 and an O/E module consisting of O/Es 7. Each DMUX package 76 is connected to other line unit LU through the optical cable.

In the thus constructed ATM switch, first, signals from the input line 16 are multiplexed by the MUXLSI 81 and inputted to the SRMs 1 within the first-stage SRM unit 11. The (8×8) SRM 1 is constructed of four pieces of SW packages 74 consisting of (2×2) SRMs.

Output of the first-stage SRMs 1 are converted into the light by the E/O module 7, and light beams on the two highways HW are multiplexed by the WDM couplers 8 and then outputted to the PSM unit 30.

In the PSM unit 30, two pieces of optical switches 3 are mounted on one package 70. The input signal is demultiplexed into two signals by the WDM coupler 8, and each signal is inputted to the optical switch 3.

An output from the optical switch 3 is again multiplexed by the WDM coupler 8 and, further, transmitted to the second-stage SRM unit 12. In the SRM unit 12, the input signal is demultiplexed into two signals by the WDM coupler 8 and then converted into electricity by the O/E module.

Outputs of the third-stage SRM unit 13 is inputted to the DMUXLSIs 89, and the cells multiplexed are demultiplexed by the DMUXLSI 89 and outputted to the line unit LU via the optical cable.

Thus, the SRMs 1 and the PSMs 3 of every stage are mounted in the separate racks, thus making it possible to constitute the ATM switch.

It is apparent that, in this invention, a wide range of different working modes can be formed based on the invention without deviating from the spirit and scope of the invention. This invention is not restricted by its specific working modes except being limited by the appended claims.

What is claimed is:

1. An ATM switch comprising:

a plurality of switching modules, arrayed in a plurality of rows, for switching over paths in accordance with path data contained in cells in order to transfer inputted data from an input line to a target output line on a cell-unit; and path switching means comprising path switching modules provided between at least one pair of adjacent columns of said switching modules among plural columns of said switching modules, said path switching modules each having input ports connected to said respective switching modules, disposed in a side-by-side relationship in row direction, of one column of said switching modules of the two adjacent columns of said switching modules and output ports connected to said respective switching modules, disposed in the side-by-side relationship in the row direction, of the other column of the two adjacent columns of said switching modules to switch paths between said respective switching modules, and said path switching means being constructed of the same number of path switching modules as the number of said switch modules arranged in the row direction, said path switching means switching a path from the input line to the target output line in response to an indication to switch over an old path to a new path when a switching module is expanded.

2. An ATM switch comprising:

a plurality of switching modules, arrayed in a plurality of columns and in a plurality of rows, for switching over paths in accordance with path data contained in cells in order to transfer data inputted from an input line to a target output line on a cell-unit; and path switching means comprising path switching modules provided between at least one pair of adjacent columns of said switching modules among plural columns of said switching modules, said path switching modules each having input ports connected to said respective switching modules, disposed in a side-by-side relationship in a row direction, of one column of said switching modules of the two adjacent columns of said switching modules and output ports connected to said respective switching modules, disposed in the side-by-side relationship in the row direction, of the other column of the two adjacent columns of said switching modules to switch paths between said respective switching modules, and said path switching means being constructed of the same number of path switching modules as the number of input lines or output lines connected to each of said switch modules, said path switching means switching a path from the input line to the target output line in response to an indication to switch over an old path to a new path when a switching module is expanded.

3. An ATM switch according to claim 2, wherein said plurality of switching modules are constructed of switching modules of a first-stage, an intermediate-stage and a rear-stage in the column direction, wherein the number of said intermediate-stage switching modules is incremented by a power of a predetermined value in the row direction, all the paths to said intermediate-stage switching modules being divided according to every path switching group having a corresponding number of paths to the number of said intermediate-stage switching modules, and wherein said each path switching means switches the paths according to the every path switching group so that the paths to all said switching modules of next stage are evenly switched from said respective switching modules.

4. An ATM switch according to claim 2, wherein said path switching means includes:

wavelength multiplexing means for demultiplexing a plurality of multiplexed photo signals into respective photo signals and transmitting to said switching modules the multiplexed photo signals obtained by multiplexing demultiplexed photo signals; and an optical switch for performing path switching with respect to the respective demultiplexed photo signals, said each switching module includes;

photoelectric converting means for converting a cell output of an electric signal into a photo signal and also converting the photo signal into the electric signal; and wavelength multiplexing means for multiplexing photo signals converted by said photoelectric converting means, outputting multiplexed photo signals to said path switching means and demultiplexing the multiplexed photo signals from said path switching means into respective photo signals.

5. An ATM switch according to claim 3, wherein said path switching means is constructed of a wavelength allocation type switch for changing an output destination per wavelength of the photo signal.

6. An ATM switch according to claim 3, wherein said each switching module includes:

a cell buffer, having a plurality of input ports and a plurality of output ports, for storing the cells inputted from the input ports;

buffer quantity monitoring means for monitoring the number of cells stored in said cell buffer per output port and determining whether or not said cell buffer is empty; and buffer control means for controlling a write and a read of the cells to and from said cell buffer and halting cell output when said cell buffer becomes empty, said path switching means performs the path switching after said buffer control means has halted the cell output.

7. An ATM switch according to claim 6, wherein said buffer control means of said first-stage switching module halts the cell output, said path switching means between said first-stage switching module and said intermediate-stage switching module switches over an old path to a new path after halting the cell output, said buffer control means of said intermediate-stage switching module halts the cell output by flowing the cells stored in said cell buffer of said first-stage switching module to the new path and storing said cell buffer with the cells, said buffer quantity monitoring means of said intermediate-stage switching module determines whether or not said cell buffer becomes empty by transmitting remaining cells flowed to the old path to said rear-stage switching module, and said path switching means between said intermediate-stage switch module and said rear-stage switching module switches the path after said cell buffer has become empty.

8. An ATM switch according to claim 7, wherein said switching module of each stage includes flag tacking means for tacking a flag indicating a last cell to the last cell after halting the cell output, said buffer control means of said each switching module determines whether or not the last cell containing the flag reaches from said flag tacking means within said switching module of the stage disposed one before and gives, when the last cell reaches, an indication to said path switching means to switch over the old path to the new path.

9. An ATM switch according to claim 7, wherein said switch module of each stage includes notifying cell inserting means for inserting a notifying cell indicating the last cell into an area posterior to the last cell after halting the cell output, and said buffer control means of said switching module of each stage determines whether or not the notifying cell reaches from said notifying cell inserting means within said switching module of the stage disposed one before and gives, when the notifying cell reaches, an indication to said path switching means to switch over the old path to the new path.

10. An ATM switch according to claim 9, wherein said notifying cell inserting means, when the notifying cell is inserted, adds the same number as an output port number of preceding-stage switching module to a cell header as route data of next-stage switching module and thereby equalizes a switching module route of the notifying cell between the first stage and the intermediate stage to a switching module route of the notifying cell between the intermediate stage and the rear stage, and said buffer control means of said each switching module does not dispose of the notifying cell even after switching the path.

11. An ATM switch according to claim 6, wherein said buffer control means of said switching module of each stage determines whether or not a predetermined number of empty cells indicating the arrival of the last cell consecutively reach from said switching module of the stage disposed one before and gives, when the empty cells consecutively reach, an indication to said path switching means to switch over the old path to the new path.

12. An ATM switch according to claim 3, wherein said each switching module includes:

a cell buffer connected to a plurality of input highways and a plurality of output highways;

write address managing means for managing a write address in which the cell from the each input highway is written to said cell buffer;

a plurality of read address managing means, each provided per the output highway, for managing a read address of said cell buffer; and a plurality of buffer quantity monitoring means for monitoring emptying of the cells of said cell buffer per the output highway.

13. An ATM switch according to claim 3, further comprising a cell buffer having a plurality of input ports and a plurality of output ports for storing the cells inputted from the input ports, wherein said intermediate-stage switching module is expanded, and, when said path switching means switches the path, the construction of said cell buffer is the same before and after switching the path.

14. An ATM switch according to claim 2, wherein a first rack houses said plurality of switching modules arranged in a side-by-side relationship in a column direction, there are provided a corresponding number of said first racks to a plural number of said switching modules arranged in the side-by-side relationship in a row direction, and said one or more path switching means are mounted in a second rack which differs from said first rack.

15. An ATM switch comprising:

a plurality of switching modules, arrayed in a plurality of columns and in at least one row, for switching over paths in accordance with path data contained in cells in order to transfer inputted data to a target line on a cell-unit, wherein said plurality of switching modules are constructed of switching modules of a first stage, an intermediate stage and a rear stage in the column direction, wherein the number of said intermediate-stage switching modules is incremented by a power of a predetermined value in the row direction, all the paths to said intermediate-stage switching modules being divided according to every path switching group having a corresponding number of paths to the number of said intermediate-stage switching modules, wherein the paths are switched according to every path switching group so that the paths to all said switching modules of the next stage are evenly switched from said respective switching modules, wherein said of said first-stage and rear-stage switching modules includes a cell buffer, said cell buffer having a plurality of I/O ports allocated with different items of tag data and a path switching port, for storing the cells inputted from the input ports, and wherein said intermediate-stage switching module includes:

buffer control means for controlling a write and a read of the cells, previously switching a new path to said switching module multiplexed from the path switching port, switching over an old path to the new path with a switchover of the allocated tag data and thereby halting reading the cells stored in said cell buffer; and buffer quantity monitoring means for determining whether or not said cell buffer becomes empty after transmitting all the cells remaining in said cell buffer of said switching module to the old path, said buffer control means transmitting the cells to said cell buffer of said switching module expanded with respect to the new path in case said cell buffer to the old path becomes empty.

16. An ATM switch according to claim 15, further comprising a connector module in which there are disposed the same number of connectors as the number of output ports, said connectors each having a plurality of input ports and a plurality of output ports and also accommodating one highway.

17. An ATM switch according to claim 15, wherein the allocated tag data is switched over by changing the setting of a switch.

18. An ATM switch according to claim 15, wherein the allocated tag data is switched over by changing cell path data.

19. An ATM switch according to claim 15, wherein said buffer quantity monitoring means determines whether or not all the cells of said first-stage switching module to the old path are transmitted when the old path is switched over to the new path, said buffer control means transmits the cells of said first-stage switching module to the new path when all the cells of said first-stage switching module to the old path are transmitted, said buffer quantity monitoring means determines whether or not all the cells of said intermediate-stage switching module to the old path are transmitted, and said buffer control means transmits, when all the cells of said intermediate-stage switching module to the old path are transmitted, the cells of said intermediate-stage switching module to the new path.

20. An ATM switch according to claim 19, wherein said switching module of each stage includes flag tacking means for tacking a flag indicating the last cell to the last cell before switching over the old path to the new path, and said buffer control means of said each switching module determines whether or not the last cell containing the flag reaches from said flag tacking means within said switching module of the stage disposed one before and switches over the old path to the new path when the last cell reaches.

21. An ATM switch according to claim 19, wherein said switching module of each stage includes notifying cell inserting means for inserting a notifying cell indicating the last cell into an area posterior to the last cell before switching over the old path to the new path, and said buffer control means of said switching module of each stage determines whether or not the notifying cell reaches from said notifying cell inserting means within said switching module of the stage disposed one before and switches over, when the notifying cell reaches, the old path to the new path.

22. An ATM switch according to claim 21, wherein said notifying cell inserting means, when the notifying cell is inserted, adds the same number as an output port number of preceding-stage switching module to a cell header as route data of next-stage switching module and thereby equalizes a switching module route of the notifying cell between the first stage and the intermediate stage to a switching module route of the notifying cell between the intermediate stage and the rear stage, and said buffer control means of said each switching module does not dispose of the notifying cell even after switching the path.

23. An ATM switch according to claim 19, wherein said buffer control means of said switching module of each stage determines whether or not a predetermined number of empty cells indicating the arrival of the last cell consecutively reach from said switching module of the stage disposed one before and switches over, when the empty cells consecutively reach, the old path to the new path.

24. An ATM switch according to claim 15, wherein said each switching module includes:

a cell buffer connected to a plurality of input highways and a plurality of output highways;

write address managing means for managing a write address in which the cell from the each input highway is written to said cell buffer;

a plurality of read address managing means, each provided per the output highway, for managing a read address of said cell buffer; and a plurality of buffer quantity monitoring means for monitoring emptying of the cells of said cell buffer per the output highway.

25. An ATM switch according to claim 15, the ATM switch further comprising a cell buffer having a plurality of input ports and a plurality of output ports for storing the cells inputted from the input ports, wherein said intermediate-stage switching module is expanded, and, in case an old path is switched over to a new path, the construction of said cell buffer is the same before and after switching the path.

26. An ATM switch according to claim 15, wherein said plurality of switching modules constitutes an active ATM switch, said ATM switch further comprising:

a standby ATM switch having said switching modules that are more expanded than said plurality of switching modules of said active ATM switch; and switchover means, connected to said active ATM switch and said standby ATM switch, for performing a switchover from said active ATM switch to said standby ATM switch.

27. An ATM switch according to claim 15, further comprising:

port connection determining means for determining which an input port of next-stage switching module to connect output port of preceding-stage switching module with respect to mutual connections between said switching modules having a plurality of input ports and a plurality of output ports, said port connection determining means including:
exclusive OR means for obtaining an exclusive OR of a row number of said switching module with an output port number of said switching module; and
AND means for obtaining an AND of an output of said exclusive OR means with exponent data about the number of rows of said switching modules as a next-stage input port number to be connected.

28. A structure for packaging a switching module, comprising:

a switching module having a plurality of input terminals, a plurality of output terminals and a cross point buffer for storing cells; and a plurality of packages into which said switching module is divided, wherein the input terminals and the output terminals are so laid out as to be evenly allocated to said respective packages.

29. A method for switching a path by an ATM switch, comprising:

a switchover step of switching over paths in accordance with path data contained in cells by a plurality of switching modules arrayed in a plurality of columns and in a plurality of rows in order to transfer inputted data from an input line to a target output line on a cell-unit; and a path switching step of switching the paths between said respective switching modules, disposed in a side-by-side relationship in a row direction, of one column of said switching modules of the two adjacent columns of said switching modules and said respective switching modules, disposed in the side-by-side relationship in the row direction, of the other column of the two adjacent columns of said switching modules, said path switching step being conducted with path switching modules provided between at least one pair of two adjacent columns of said switching modules among plural columns of said switching modules, said path switching modules each having input ports connected to said respective switching modules of one column of said switching modules of the two adjacent columns of said switching modules and output ports connected to said respective switching modules of the other column of the two adjacent columns of said switching modules, said path switching means being constructed of the same number of the path switching modules as the number of said switch modules arranged in the row direction, said path switching means switching a path from the input line to the target output line in response to an indication to switch over an old path to a new path when a switching module is expanded.

30. A method for switching a path by an ATM switch, comprising:

a switchover step of switching over paths in accordance with path data contained in cells by a plurality of switching modules arrayed in a plurality of columns and in a plurality of rows in order to transfer data inputted from an input line to a target output line on a cell-unit; and a path switching step of switching the paths between said respective switching modules, disposed in a side-by-side relationship in a row direction, of one column of said switching modules of two adjacent columns of said switching modules and said respective switching modules, disposed in the side-by-side relationship in the row direction, of the other column of the two adjacent columns of said switching modules, said path switching step being conducted with path switching means comprising path switching modules provided between at least one pair of two adjacent columns of said switching modules among plural columns of said switching modules, said path switching modules each having input ports connected to said respective switching modules of one column of said switching modules of the two adjacent columns of said switching modules and output ports connected to said respective switching modules of the other column of the two adjacent columns of said switching modules, said path switching means being constructed of the same number of the path switching modules as the number of input lines or output lines connected to each of said switch modules, said path switching means switching a path from the input line to the target output line in response to an indication to switch over an old path to a new path when a switching module is expanded.

31. A method for switching a path by an ATM switch according to claim 30, wherein said plurality of switching modules are constructed of switching modules of a first-stage, an intermediate-stage and a rear-stage in the column direction, wherein the number of said intermediate-stage switching modules is incremented by a power of a predetermined value in the row direction, all the paths to said intermediate-stage switching modules being divided according to every path switching group having a corresponding number of paths to the number of said intermediate-stage switching modules, and wherein said path switching step is to switch the paths according to the every path switching group so that the path to all said switching modules of next stage are evenly switched from said respective switching modules.

32. A method for switching a path by an ATM switch according to claim 31, further comprising:

a storing step of storing a cell buffer with the cells inputted from input ports;

a monitoring step of monitoring the number of cells stored in said cell buffer per output port and determining whether or not said cell buffer is empty; and a control step of controlling a write and a read of the cells to and from said cell buffer and halting cell output when said cell buffer becomes empty, said path switching step is to perform the path switching after halting the cell output.

33. A method for switching a path by an ATM switch according to claim 32, wherein said control step is to halt the cell output of said first-stage switching module, said path switching step is to switch over an old path to a new path after halting the cell output between said first-stage switching module and said intermediate-stage switching module, said control step is to halt the cell output by flowing the cells stored in said cell buffer of said first-stage switching module to the new path and to cause said cell buffer of said intermediate-stage switching module to store the cells, said monitoring step is to determine whether or not said cell buffer of said intermediate-stage switching module becomes empty by transmitting remaining cells in the old path that are flowed to said intermediate-stage switching module to said rear-stage switching module, and said path switching step is to switch the paths after said cell buffer has become empty between said intermediate-stage switch module and said rear-stage switching module.

34. A method for switching a path by an ATM switch according to claim 33, further comprising a flag tacking step of tacking a flag indicating a last cell to the last cell after halting the cell output, wherein said control step is to determine whether or not the last cell containing the flag reaches from said switching module of the stage disposed one before, and said path switching step is to switch over the old path to the new path when the last cell reaches.

35. A method for switching a path by an ATM switch according to claim 33, further comprising:

a notifying cell inserting step of inserting a notifying cell indicating the last cell into an area posterior to the last cell after halting the cell output, said control step is to determine whether or not the notifying cell reaches from said switching module of the stage disposed one before, and said path switching step is to switch over the old path to the new path when the notifying cell reaches.

36. A method for switching a path by an ATM switch according to claim 35, wherein said notifying cell inserting step is, when the notifying cell is inserted, to add the same number as an output port number of preceding-stage switching module to a cell header as route data of next-stage switching module and thereby equalize a switching module route of the notifying cell between the first stage and the intermediate stage to a switching module route of the notifying cell between the intermediate stage and the rear stage, and said control step is to dispose of no notifying cell even after switching the path.

37. A method for switching a path by an ATM switch according to claim 33, wherein said control step is to determine whether or not a predetermined number of empty cells indicating the arrival of the last cell consecutively reach from said switching module of the stage disposed one before, and said path switching step is to switch over, when the empty cells consecutively reach, the old path to the new path.

38. A method for switching a path by an ATM switch according to claim 31, the ATM switch further comprising a cell buffer having a plurality of input ports and a plurality of output ports for storing the cells inputted from the input ports, and the method further comprising:

a storing step of storing said cell buffer with the cells inputted from a plurality of input highways;

a write address managing step of managing a write address in which the cell from the each input highway is written to said cell buffer;

a read address managing step of managing a read address of said cell buffer per output highway; and a buffer quantity monitoring step of monitoring emptying of the cells of said cell buffer per the output highway.

39. A method for switching a path by an ATM switch according to claim 31, the ATM switch further comprising a cell buffer having a plurality of input ports and a plurality of output ports for storing the cells inputted from the input ports, wherein said intermediate-stage switching module is expanded, and, when said path switching means switches the path, the construction of said cell buffer is the same before and after switching the path.

40. A method for switching a path by an ATM switch according to claim 30, wherein further in the ATM switch said plurality of switching modules are constructed of switching modules of a first-stage, an intermediate-stage and a rear-stage in the column direction, the method further comprising:

a determining step of determining which input port of next-stage switching module to connect an output port of preceding-stage switching module with respect to mutual connections between said switching modules having a plurality of input ports and a plurality of output ports, said determining step including:

an exclusive OR step of obtaining an exclusive OR of a row number of said switching module with an output port number of said switching module; and an AND step of obtaining an AND of an output said exclusive OR with exponent data about the number of rows of said switching modules as a next-stage input port number to be connected.

41. A method for switching a path by an ATM switch, comprising:

a switchover step of switching over the paths in accordance with path data contained in cells by a plurality of switching modules arrayed in a plurality of columns and in at least one row in order to transfer inputted data to a target line on a cell-unit, wherein said plurality of switching modules are constructed of switching modules of a first stage, an intermediate stage and a rear stage in the column direction, wherein the number of said intermediate-stage switching modules is incremented by a power of a predetermined value in the row direction, all the paths to said intermediate-stage switching modules being divided according to every path switching group having a corresponding number of paths to the number of said intermediate-stage switching modules, wherein said switchover step is to switch the paths according to every path switching group so that the path to all said switching modules of the next stage are evenly switched from said respective switching modules, wherein each of said first-stage and rear-stage switching modules includes a cell buffer, said cell buffer having a plurality of I/O ports allocated with different items of tag data and a path switching port, for storing the cells inputted from the input ports, wherein said intermediate-stage switching module includes:

buffer control means for controlling a write and a read of the cells, previously switching a new path to said switching module multiplexed from the path switching port, switching over an old path to the new path with a switchover of the allocated tag data and thereby halting reading the cells stored in said cell buffer; and buffer quantity monitoring means for determining whether or not said cell buffer becomes empty after transmitting all the cells remaining in said cell buffer of said switching module to the old path, said buffer control means transmitting the cells to said cell buffer of said switching module expanded with respect to the new path in case said cell buffer to the old path becomes empty, and wherein the method further comprising:

a storing step of storing said cell buffer with the cells inputted from input ports by allocating different items of tag data to a plurality of I/O ports and a path switching port;

a control step of controlling a write and a read of the cells, previously switching a new path to said switching module multiplexed from the path switching port, switching over an old path to the new path with a switchover of the allocated tag data and thereby halting reading the cells stored in said cell buffer; and a monitoring step of determining whether or not said cell buffer becomes empty after transmitting all the cells remaining in said cell buffer of said switching module to the old path, said control step further transmitting the cells to said cell buffer of said switching module expanded with respect to the new path in case said cell buffer to the old path becomes empty.

42. A method for switching a path by an ATM switch according to claim 41, wherein the allocated tag data is switched over by changing the setting of a switch.

43. A method for switching a path by an ATM switch according to claim 41, wherein the allocated tag data is switched over by changing cell path data.

44. A method for switching a path by an ATM switch according to claim 42, wherein said monitoring step is to determine whether or not all the cells of said first-stage switching module to the old path are transmitted when the old path is switched over to the new path, said control step is to transmit the cells of said first-stage switching module to the new path when all the cells of said first-stage switching module to the old path are transmitted, said monitoring step is to determine whether or not all the cells of said intermediate-stage switching module to the old path are transmitted, and said control step is to transmit, when all the cells of said intermediate-stage switching module to the old path are transmitted, the cells of said intermediate-stage switching module to the new path.

45. A method for switching a path by an ATM switch according to claim 44, further comprising a flag tacking step of tacking a flag indicating the last cell to the last cell before switching over the old path to the new path, wherein said control step is to determine whether or not the last cell containing the flag reaches from said switching module of the stage disposed one before and to switch over the old path to the new path when the last cell reaches.

46. A method for switching a path by an ATM switch according to claim 44, further comprising a notifying cell inserting step of inserting a notifying cell indicating the last cell into an area posterior to the last cell before switching over the old path to the new path, wherein said control step is to determine whether or not the notifying cell reaches from said switching module of the stage disposed one before and to switch over, when the notifying cell reaches, the old path to the new path.

47. A method for switching a path by an ATM switch according to claim 46, wherein said notifying cell inserting step is to, when the notifying cell is inserted, add the same number as an output port number of preceding-stage switching module to a cell header as route data of next-stage switching module and thereby equalize a switching module route of the notifying cell between the first stage and the intermediate stage to a switching module route of the notifying cell between the intermediate stage and the rear stage, and said control step is to dispose of no notifying cell even after switching the path.

48. A method for switching a path by an ATM switch according to claim 44, wherein said control step is to determine whether or not a predetermined number of empty cells indicating the arrival of the last cell consecutively reach from said switching module of the stage disposed one before and to switch over, when the empty cells consecutively reach, the old path to the new path.

49. A method for switching a path by an ATM switch according to claim 41, the ATM switch further comprising a cell buffer connected to a plurality of input highways and a plurality of output highways for storing the cells inputted from the input highways, and the method further comprising:

a storing step of storing said cell buffer with the cells inputted from the plurality of input highways;

a write address managing step of managing a write address in which the cell from each of the input highways is written to said cell buffer;

a read address managing step of managing a read address of said cell buffer per output highway; and a monitoring step of monitoring emptying of the cells of said cell buffer per the output highway.

50. A method for switching a path by an ATM switch according to claim 41, wherein said intermediate-stage switching module is expanded, and, when the old path is switched over to the new path, the construction of said cell buffer is the same before and after switching the path.

* * * * *